US012665187B2

(12) United States Patent
Narita et al.

(10) Patent No.: US 12,665,187 B2
(45) Date of Patent: Jun. 23, 2026

(54) SECONDARY BATTERY, ELECTRONIC DEVICE, VEHICLE, AND METHOD FOR MANUFACTURING SECONDARY BATTERY

(71) Applicant: SEMICONDUCTOR ENERGY LABORATORY CO., LTD., Atsugi (JP)

(72) Inventors: Kazuhei Narita, Tokyo (JP); Yohei Momma, Isehara (JP); Shunpei Yamazaki, Tokyo (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 952 days.

(21) Appl. No.: 17/906,450

(22) PCT Filed: Mar. 17, 2021

(86) PCT No.: PCT/IB2021/052196
§ 371 (c)(1),
(2) Date: Sep. 15, 2022

(87) PCT Pub. No.: WO2021/191733
PCT Pub. Date: Sep. 30, 2021

(65) Prior Publication Data
US 2023/0135556 A1     May 4, 2023

(30) Foreign Application Priority Data

Mar. 27, 2020     (JP) ................................. 2020-057119

(51) Int. Cl.
*H01M 4/36*          (2006.01)
*C01G 51/42*         (2025.01)
(Continued)

(52) U.S. Cl.
CPC ............ *H01M 4/366* (2013.01); *C01G 51/42* (2013.01); *C01G 53/50* (2013.01); *H01M 4/485* (2013.01); *H01M 4/505* (2013.01); *H01M 4/525* (2013.01)

(58) Field of Classification Search
CPC ...... H01M 4/366; H01M 4/485; H01M 4/505; H01M 4/525; H01M 2220/20;
(Continued)

(56) References Cited

U.S. PATENT DOCUMENTS 8,785,045 B2     7/2014   Suzuki
9,843,041 B2 *  12/2017   Lopez ............... H01M 10/0525
(Continued)

FOREIGN PATENT DOCUMENTS

CN       102598372 A        7/2012
CN       103459352 A   *  12/2013   ........... C01G 23/005
(Continued)

OTHER PUBLICATIONS

International Search Report (Application No. PCT/IB2021/052196) Dated Jun. 1, 2021.
(Continued)

*Primary Examiner* — Kaity V Chandler
(74) *Attorney, Agent, or Firm* — Fish & Richardson P.C.

(57) ABSTRACT

A method for manufacturing a positive electrode active material with high charge and discharge capacity is provided. Alternatively, a method for manufacturing a positive electrode active material with high charge and discharge voltage is provided. Alternatively, a method for manufacturing a power storage device with little deterioration is provided. Alternatively, a method for manufacturing a highly safe power storage device is provided. Alternatively, a method for manufacturing a novel power storage device is provided. A method for manufacturing a secondary battery
(Continued)

including a positive electrode active material is provided. A method for manufacturing the positive electrode active material includes a first step of synthesizing a first lithium source and a first transition metal source to form a first composite oxide; a second step of synthesizing an impurity source to provide an impurity layer for the first composite oxide after the first step; and a third step of synthesizing a second lithium source and a second transition metal source to form a second composite oxide after the second step and providing the second composite oxide over the first composite oxide provided with the impurity layer.

4 Claims, 20 Drawing Sheets

(51) Int. Cl.

| | | |
|---|---|---|
| *C01G 53/50* | (2025.01) | |
| *H01M 4/485* | (2010.01) | |
| *H01M 4/505* | (2010.01) | |
| *H01M 4/525* | (2010.01) | |

(58) Field of Classification Search
    CPC ........ H01M 10/0525; H01M 2004/028; C01G 51/42; C01G 53/50; C01G 51/00; C01G 53/00; Y02E 60/10
    See application file for complete search history.

(56) References Cited

U.S. PATENT DOCUMENTS

| | | | | |
|---|---|---|---|---|
| 9,923,244 | B2 | 3/2018 | Takanashi et al. | |
| 10,305,095 | B2* | 5/2019 | Miyashita | H01M 4/0471 |
| 10,305,101 | B2* | 5/2019 | Son | C01G 51/00 |
| 10,559,810 | B2 | 2/2020 | Yanagihara et al. | |
| 10,665,856 | B2 | 5/2020 | Yanagihara et al. | |
| 10,741,828 | B2 | 8/2020 | Ochiai et al. | |
| 10,741,834 | B2 | 8/2020 | Zhang et al. | |
| 10,804,537 | B2* | 10/2020 | Zhamu | H01M 4/366 |
| 10,985,373 | B2* | 4/2021 | Pan | H01M 4/366 |
| 11,043,660 | B2 | 6/2021 | Ochiai et al. | |
| 2002/0110736 | A1 | 8/2002 | Kweon et al. | |
| 2003/0104279 | A1 | 6/2003 | Miyazaki et al. | |
| 2004/0142241 | A1 | 7/2004 | Nagayama | |
| 2004/0191628 | A1 | 9/2004 | Inoue et al. | |
| 2006/0263690 | A1 | 11/2006 | Suhara et al. | |
| 2007/0117014 | A1 | 5/2007 | Saito et al. | |
| 2008/0193841 | A1* | 8/2008 | Sun | C01G 53/54 429/231.95 |
| 2008/0241693 | A1 | 10/2008 | Fukuchi et al. | |
| 2009/0087362 | A1 | 4/2009 | Sun et al. | |
| 2009/0104532 | A1 | 4/2009 | Hosoya | |
| 2009/0148772 | A1 | 6/2009 | Kawasato et al. | |
| 2010/0086854 | A1 | 4/2010 | Kumar et al. | |
| 2010/0173199 | A1* | 7/2010 | Hiraki | C01G 23/003 429/231.95 |
| 2010/0247986 | A1 | 9/2010 | Toyama et al. | |
| 2011/0059367 | A1* | 3/2011 | Morita | H01M 10/052 429/231.95 |
| 2011/0111298 | A1 | 5/2011 | Lopez et al. | |
| 2012/0129052 | A1* | 5/2012 | Bauer | H01M 4/364 977/734 |
| 2013/0052534 | A1 | 2/2013 | Fujiki et al. | |
| 2013/0230775 | A1 | 9/2013 | Endo | |
| 2013/0323596 | A1 | 12/2013 | Morita et al. | |
| 2014/0212759 | A1 | 7/2014 | Blangero et al. | |
| 2015/0008364 | A1 | 1/2015 | Endo | |
| 2015/0147655 | A1* | 5/2015 | Park | H01M 4/505 429/231.1 |
| 2015/0214543 | A1* | 7/2015 | Kim | H01M 4/525 429/223 |
| 2015/0228975 | A1* | 8/2015 | Lee | H01M 4/366 429/188 |

| | | | | |
|---|---|---|---|---|
| 2015/0243971 | A1* | 8/2015 | Cho | H01M 4/0471 429/231.1 |
| 2016/0006032 | A1 | 1/2016 | Paulsen et al. | |
| 2016/0013478 | A1 | 1/2016 | Satow et al. | |
| 2016/0049648 | A1 | 2/2016 | Noh et al. | |
| 2016/0156032 | A1 | 6/2016 | Lee et al. | |
| 2016/0268601 | A1 | 9/2016 | Paulsen et al. | |
| 2016/0276659 | A1 | 9/2016 | Choi et al. | |
| 2016/0322627 | A1* | 11/2016 | Yoshida | C30B 29/68 |
| 2017/0117545 | A1* | 4/2017 | Fujihara | H01M 4/525 |
| 2017/0187035 | A1 | 6/2017 | Yanagihara et al. | |
| 2017/0207444 | A1 | 7/2017 | Yanagihara et al. | |
| 2018/0013130 | A1* | 1/2018 | Ochiai | H01M 4/131 |
| 2018/0062170 | A1 | 3/2018 | Lopez et al. | |
| 2018/0145317 | A1 | 5/2018 | Momma et al. | |
| 2018/0145368 | A1 | 5/2018 | Ochiai et al. | |
| 2018/0183046 | A1 | 6/2018 | Jin et al. | |
| 2019/0067689 | A1* | 2/2019 | Hong | H01M 10/0525 |
| 2019/0245199 | A1 | 8/2019 | Zeng et al. | |
| 2020/0106097 | A1* | 4/2020 | Kawasaki | H01M 4/525 |
| 2020/0136126 | A1* | 4/2020 | Hong | H01M 4/364 |
| 2020/0176770 | A1 | 6/2020 | Takahashi et al. | |
| 2020/0220173 | A1 | 7/2020 | Jo et al. | |
| 2020/0259177 | A1* | 8/2020 | Nakamura | H01M 4/1391 |
| 2020/0266424 | A1* | 8/2020 | Choi | H01M 4/134 |
| 2020/0266441 | A1* | 8/2020 | Yoshihara | H01M 4/131 |
| 2020/0295349 | A1 | 9/2020 | Ochiai et al. | |
| 2020/0321610 | A1* | 10/2020 | Lee | C01G 53/00 |
| 2020/0328402 | A1 | 10/2020 | Ochiai et al. | |
| 2020/0343529 | A1 | 10/2020 | Ochiai et al. | |
| 2021/0005874 | A1* | 1/2021 | Park | C01G 53/82 |
| 2021/0020910 | A1 | 1/2021 | Ochiai et al. | |
| 2021/0083281 | A1 | 3/2021 | Mikami et al. | |
| 2021/0313571 | A1 | 10/2021 | Momma et al. | |
| 2022/0115637 | A1 | 4/2022 | Ochiai et al. | |
| 2022/0131146 | A1 | 4/2022 | Saito et al. | |
| 2022/0190313 | A1 | 6/2022 | Ochiai et al. | |
| 2022/0359870 | A1 | 11/2022 | Mikami et al. | |
| 2023/0129659 | A1 | 4/2023 | Abe et al. | |
| 2023/0130812 | A1 | 4/2023 | Yamazaki et al. | |
| 2025/0105282 | A1 | 3/2025 | Liu et al. | |

FOREIGN PATENT DOCUMENTS

| | | | | | |
|---|---|---|---|---|---|
| CN | 105655554 | A | | 6/2016 | |
| CN | 106575755 | A | | 4/2017 | |
| CN | 106663794 | A | | 5/2017 | |
| CN | 110890522 | A | | 3/2020 | |
| CN | 113140726 | A | | 7/2021 | |
| JP | 2000-203842 | A | | 7/2000 | |
| JP | 2002-216760 | A | | 8/2002 | |
| JP | 2010-080407 | A | | 4/2010 | |
| JP | 2013-511129 | | | 3/2013 | |
| JP | 2015-099722 | A | | 5/2015 | |
| JP | 2016534527 | A | * | 11/2016 | H01M 10/0525 |
| JP | 2017-033641 | A | | 2/2017 | |
| JP | 2017-210395 | A | | 11/2017 | |
| JP | 2018-206747 | A | | 12/2018 | |
| JP | 2019-021456 | A | | 2/2019 | |
| KR | 2012-0097513 | A | | 9/2012 | |
| KR | 20160044730 | A | * | 4/2016 | H01M 4/505 |
| KR | 20160149162 | A | * | 12/2016 | H01M 4/505 |
| KR | 2017-0038787 | A | | 4/2017 | |
| KR | 2017-0039648 | A | | 4/2017 | |
| KR | 2019-0025632 | A | | 3/2019 | |
| KR | 20190141639 | A | * | 12/2019 | H01M 4/1391 |
| KR | 20190141640 | A | * | 12/2019 | H01M 10/0525 |
| WO | WO-2011/059693 | | | 5/2011 | |
| WO | WO-2016/017077 | | | 2/2016 | |
| WO | WO-2016/017079 | | | 2/2016 | |
| WO | WO-2018/007908 | | | 1/2018 | |
| WO | WO-2019003025 | A1 | * | 1/2019 | H01M 4/1391 |
| WO | WO-2020065441 | A1 | * | 4/2020 | C01G 53/50 |
| WO | WO-2020099978 | A1 | * | 5/2020 | H01M 10/0525 |
| WO | WO-2020099991 | A1 | * | 5/2020 | H01M 4/525 |

(56)  References Cited

FOREIGN PATENT DOCUMENTS

WO      WO-2020121109 A1 *    6/2020    ........ H01M 10/0525
WO      WO-2020201916 A1 *   10/2020    ............ C01G 53/42

OTHER PUBLICATIONS

Written Opinion (Application No. PCT/IB2021/052196) Dated Jun. 1, 2021.

Sun.Y et al., "Role of AlF3 Coating on LiCoO2 Particles during Cycling to Cutoff Voltage above 4.5 V", J. Electrochem. Soc. (Journal of the Electrochemical Society), Oct. 9, 2009, vol. 156, No. 12, pp. A1005-A1010.

Sun. Y et al., "High-energy cathode material for long-life and safe lithium batteries", Nature Materials, Mar. 22, 2009, vol. 8, pp. 320-324.

Ding. Y et al., "Recent progresses on nickel-rich layered oxide positive electrode materials used in lithium-ion batteries for electric vehicles", Applied Energy, Jun. 1, 2017, vol. 195, pp. 586-599, Elsevier.

Zeng.X et al., "Stabilization of a High-Capacity and High-Power Nickel-Based Cathode for Li-Ion Batteries", Chem, Apr. 12, 2018, vol. 4, No. 4, pp. 690-704, Cell Press.

Zhang.J et al., "Trace doping of multiple elements enables stable battery cycling of LiCoO2 at 4.6 V", Nature Energy, Jun. 17, 2019, vol. 4, pp. 594-603.

Hirooka.M et al., "Improvement of float charge durability for LiCoO2 electrodes under high voltage and storage temperature by suppressing O1-Phase transition", Journal of Power Sources, Jul. 1, 2020, vol. 463, pp. 228127-1-228127-8, Elsevier.

Wang.L et al., "A Novel Bifunctional Self-Stabilized Strategy Enabling 4.6 V LiCoO2 with Excellent Long-Term Cyclability and High-Rate Capability", Adv. Sci. (Advanced Science), Apr. 24, 2019, vol. 6, No. 12, pp. 1900355-1-1900355-11.

Okumura.T et al., "Correlation of lithium ion distribution and X-ray absorption near-edge structure in O3- and O2-lithium cobalt oxides from first-principle calculation", J. Mater. Chem. (Journal of Materials Chemistry), 2012, vol. 22, pp. 17340-17348.

Yano.A et al., "LiCoO2 Degradation Behavior in the High-Voltage Phase Transition Region and Improved Reversibility with Surface Coating", J. Electrochem. Soc. (Journal of the Electrochemical Society), Nov. 12, 2016, vol. 164, No. 1, pp. A6116-A6122.

Wang.Z et al., "EELS analysis of cation valence states and oxygen vacancies in magnetic oxides", Micron, Oct. 1, 2000, vol. 31, No. 5, pp. 571-580, Elsevier.

Chung.K et al., "Structural Studies on the Effects of ZrO2 Coating on LiCoO2 during Cycling Using In Situ X-Ray Diffraction Technique", J. Electrochem. Soc. (Journal of the Electrochemical Society), Sep. 20, 2006, vol. 153, No. 11, pp. A2152-A2157.

Chen.Z et al., "Staging Phase Transitions in LixCoO2", J. Electrochem. Soc. (Journal of the Electrochemical Society), Oct. 29, 2002, vol. 149, No. 12, pp. A1604-A1609.

Ohzuku.T et al., "Solid-State Redox Reactions of LiCoO2 (R-3m) for 4 Volt Secondary Lithium Cells", J. Electrochem. Soc. (Journal of the Electrochemical Society), Nov. 1, 1994, vol. 141, No. 11, pp. 2972-2977.

Zou.M et al., "Synthesis and Electrochemical Performance of High Voltage Cycling LiM0.05Co0.95O2 as Cathode Material for Lithium Rechargeable Cells", Electrochemical and Solid-State Letters, Apr. 26, 2004, vol. 7, No. 7, pp. A176-A179.

Kim.Y et al., "Suppression of Cobalt Dissolution from the LiCoO2 Cathodes with Various Metal-Oxide Coatings", J. Electrochem. Soc. (Journal of the Electrochemical Society), Nov. 5, 2003, vol. 150, No. 12, pp. A1723-A1725.

Liu.A et al., "Synthesis of Mg and Mn Doped LiCoO2 and Effects on High Voltage Cycling", J. Electrochem. Soc. (Journal of the Electrochemical Society), Jun. 2, 2017, vol. 164, No. 7, pp. A1655-A1664.

Shim.J et al., "Effects of MgO Coating on the Structural and Electrochemical Characteristics of LiCoO2 as Cathode Materials for Lithium Ion Battery", Chem. Mater. (Chemistry of Materials), Mar. 24, 2014, vol. 26, No. 8, pp. 2537-2543.

Wang.Z et al., "Mg doping and zirconium oxyfluoride coating co-modification to enhance the high-voltage performance of LiCoO2 for lithium ion battery", Journal of Alloys and Compounds, Oct. 5, 2014, vol. 621, pp. 212-219.

Shim.J et al., "Synergistic effects of coating and doping for lithium ion battery cathode materials: synthesis and characterization of lithium titanate-coated LiCoO2 with Mg doping", Electrochimica Acta, Nov. 11, 2015, vol. 186, pp. 201-208, Elsevier.

Taguchi.N et al., "Characterization of MgO-coated-LiCoO2 particles by analytical transmission electron microscopy", Journal of Power Sources, Aug. 10, 2016, vol. 328, pp. 161-166, Elsevier.

Amatucci.G et al., "CoO2, The End Member of the LixCoO2 Solid Solution", J. Electrochem. Soc. (Journal of the Electrochemical Society), Mar. 1, 1996, vol. 143, No. 3, pp. 1114-1123.

Qian.J et al., "Electrochemical surface passivation of LiCoO2 particles at ultrahigh voltage and its applications in lithium-based batteries", Nature Communications, Nov. 21, 2018, vol. 9, pp. 4918-1-4918-11.

Yin.R et al., "In Situ XRD Investigation and Thermal Properties of Mg Doped LiCoO2 for Lithium Ion Batteries", J. Electrochem. Soc. (Journal of the Electrochemical Society), Jan. 3, 2012, vol. 159, No. 3, pp. A253-A258.

Shao-horn.Y et al., "Probing Lithium and Vacancy Ordering in O3 Layered Lix CoO2 (x=0.5) : An Electron Diffraction Study", J. Electrochem. Soc. (Journal of the Electrochemical Society), Feb. 6, 2003, vol. 150, No. 3, pp. A366-A373.

Kalluri.S et al., "Surface Engineering Strategies of Layered LiCoO2 Cathode Material to Realize High-Energy and High-Voltage Li-Ion Cells", Advanced Energy Materials, Oct. 12, 2016, vol. 7, No. 1, pp. 1601507-1-1601507-21.

* cited by examiner

190

193

192

191

190

194

193

192

191

616

601

610

602

613 601
610
608 611
606 605
605 604 603
602
607
609

615

623 624
620
625
626 616

615

628 627 621
620
616
622
614

FIG. 7A 950a
931 931a
932a 932 933
FIG. 7B
913
911a 911b
951 952
950a 930
FIG. 7C
913
930
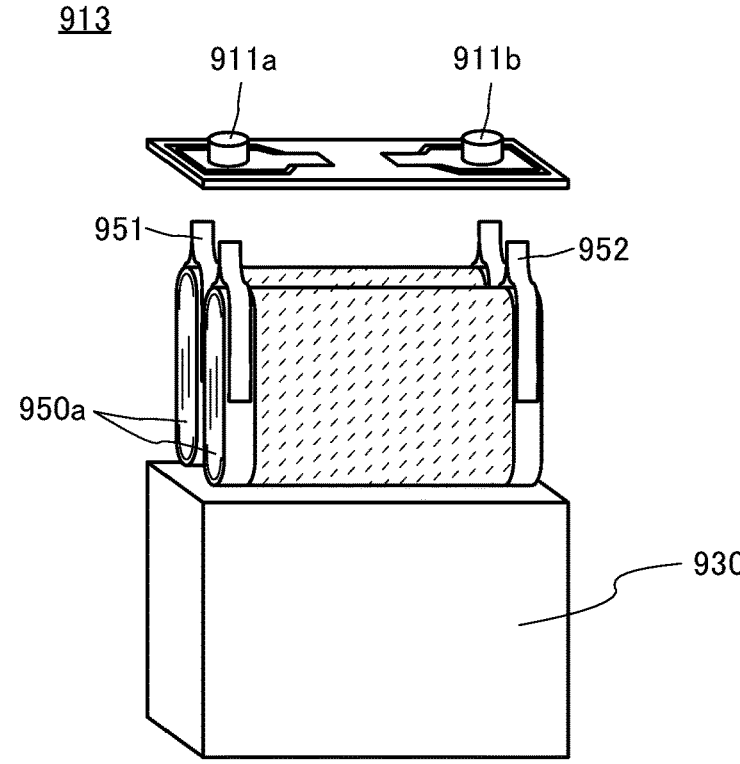
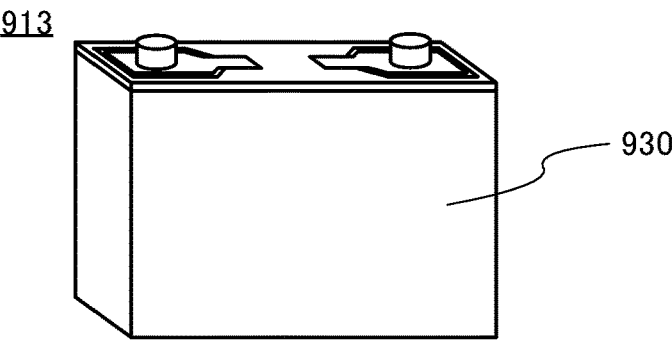

SECONDARY BATTERY, ELECTRONIC DEVICE, VEHICLE, AND METHOD FOR MANUFACTURING SECONDARY BATTERY

CROSS REFERENCE TO RELATED APPLICATIONS

This application is a U.S. National Phase Application under 35 U.S.C. § 371 of International Application PCT/IB2021/052196, filed on Mar. 17, 2021, which is incorporated by reference and claims the benefit of a foreign priority application filed in Japan on Mar. 27, 2020, as Application No. 2020-057119.

TECHNICAL FIELD

One embodiment of the present invention relates to a secondary battery including a positive electrode active material and a manufacturing method thereof. Furthermore, one embodiment of the present invention relates to a portable information terminal, a vehicle, and the like each including a secondary battery.

One embodiment of the present invention relates to an object, a method, or a manufacturing method. The present invention relates to a process, a machine, manufacture, or a composition of matter. One embodiment of the present invention relates to a semiconductor device, a display device, a light-emitting device, a power storage device, a lighting device, an electronic device, or a manufacturing method thereof.

Note that electronic devices in this specification mean all devices including power storage devices, and electro-optical devices including power storage devices, information terminal devices including power storage devices, and the like are all electronic devices.

Note that in this specification, a power storage device refers to every element and device having a function of storing power. For example, a power storage device (also referred to as a secondary battery) such as a lithium-ion secondary battery, a lithium-ion capacitor, and an electric double layer capacitor are included.

BACKGROUND ART

In recent years, a variety of power storage devices such as lithium-ion secondary batteries, lithium-ion capacitors, and air batteries have been actively developed. In particular, demand for lithium-ion secondary batteries with high output and high energy density has rapidly grown with the development of the semiconductor industry, for portable information terminals such as mobile phones, smartphones, and laptop computers, portable music players, digital cameras, medical equipment, next-generation clean energy vehicles such as hybrid electric vehicles (HVs), electric vehicles (EVs), and plug-in hybrid electric vehicles (PHVs), and the like, and the lithium-ion secondary batteries are essential as rechargeable energy supply sources for today's information society.

Thus, improvement of a positive electrode active material has been studied to increase the cycle performance and the capacity of the lithium-ion secondary battery (for example, Patent Document 1 and Non-Patent Document 1).

The performances required for power storage devices are safe operation and longer-term reliability under various environments, for example.

REFERENCE

Patent Document

[Patent Document 1] Japanese Published Patent Application No. 2019-021456

Non-Patent Document

[Non-Patent Document 1] Yang-Kook Sun et. al., High-energy cathode material for long-life and safe lithium batteries, NATURE MATERIALS VOL 8 Apr. 2009

SUMMARY OF THE INVENTION

Problems to be Solved by the Invention

One object of one embodiment of the present invention is to provide a method for manufacturing a positive electrode active material with high charge and discharge capacity. Another object is to provide a method for manufacturing a positive electrode active material with high charge and discharge voltage. Another object is to provide a method for manufacturing a positive electrode active material with little deterioration. Another object is to provide a method for manufacturing a novel positive electrode active material. Another object is to provide a method for manufacturing a secondary battery with high charge and discharge capacity. Another object is to provide a method for manufacturing a secondary battery with high charge and discharge voltage. Another object is to provide a method for manufacturing a highly safe or reliable secondary battery. Another object is to provide a method for manufacturing a secondary battery with little deterioration. Another object is to provide a method for manufacturing a secondary battery with a long lifetime. Another object is to provide a method for manufacturing a novel secondary battery.

Another object of one embodiment of the present invention is to provide a novel material, a novel active material, a novel power storage device, or a manufacturing method thereof.

Note that the description of these objects does not preclude the existence of other objects. One embodiment of the present invention does not have to achieve all these objects. Other objects can be derived from the description of the specification, the drawings, and the claims.

Another object is to provide a vehicle that includes a secondary battery of one embodiment of the present invention and has a long driving range, specifically a driving range per charge of 300 km or longer, preferably 500 km or longer. Note that a driving range per charge refers to a driving range where a vehicle actually runs after an in-vehicle secondary battery is charged using an external power source such as a charging station, until charging using an external power source is performed again. That is, a driving range per charge corresponds to the longest range where a vehicle can run after a secondary battery is fully charged by one charging using an external power source, and can be referred to as a driving range after one charging.

Means for Solving the Problems

One embodiment of the present invention is a method for manufacturing a secondary battery including a positive electrode active material. A method for manufacturing the positive electrode active material includes a first step of synthesizing a first lithium source and a first transition metal source to form a first composite oxide; a second step of synthesizing an impurity source to provide an impurity layer for the first composite oxide after the first step; and a third step of synthesizing a second lithium source and a second transition metal source to form a second composite oxide after the second step and providing the second composite oxide over the first composite oxide provided with the impurity layer.

In the above, it is preferable that the first transition metal source be at least one of a cobalt source, a nickel source, a manganese source, and an iron source; the impurity source be at least one of a titanium source, a magnesium source, and a fluorine source; and the second transition metal source be at least one of a cobalt source, a nickel source, a manganese source, and an iron source.

In the above, it is preferable that a heating temperature of the synthesis in the third step be lower than a heating temperature of the synthesis in the first step.

In the above, it is preferable that a radius of a cation of an impurity element contained in the impurity layer be larger than a radius of an ion of a transition metal contained in the first composite oxide.

Another embodiment of the present invention is a method for manufacturing a secondary battery including a positive electrode active material. A method for manufacturing the positive electrode active material includes a first step of synthesizing a first lithium source and a first transition metal source to form a first composite oxide; a second step of synthesizing a first impurity source to provide a first impurity layer for the first composite oxide after the first step; a third step of synthesizing a second lithium source and a second transition metal source to form a second composite oxide after the second step and providing the second composite oxide over the first composite oxide provided with the impurity layer; and a fourth step of synthesizing a second impurity source after the third step and providing a second impurity layer for the first composite oxide provided with the second composite oxide and the first impurity layer. The first transition metal source and the second transition metal source are each at least one of a cobalt source, a nickel source, a manganese source, and an iron source. The first impurity source and the second impurity source are each at least one of a titanium source, a magnesium source, and a fluorine source.

Another embodiment of the present invention is a secondary battery including a positive electrode active material including a first region and a second region, and the first region and the second region are formed by different synthesis methods.

Since the resource of cobalt is limited, a reduction in the usage of cobalt can lower the material price of an active material. The resource of nickel is more abundant than that of cobalt and nickel can be regarded as an eco-friendly transition metal. In the case of manufacturing an inexpensive secondary battery, the usage of nickel is preferably larger than that of cobalt.

In the above, it is preferable that the secondary battery include a carbon material, and the carbon material be at least one of fibrous carbon, graphene, and particulate carbon. These carbon materials are used as conductive materials (also referred to as conductivity-imparting agents or conductive additives). A conductive material is attached between a plurality of active materials, whereby the plurality of active materials are electrically connected to each other, and the conductivity increases. Note that the term "attach" refers not only to a state where an active material and a conductive material are physically in close contact with each other, and includes, for example, the following concepts: the case where covalent bonding occurs, the case where bonding with the Van der Waals force occurs, the case where a conductive material covers part of the surface of an active material, the case where a conductive material is embedded in surface roughness of an active material, and the case where an active material and a conductive material are electrically connected to each other without being in contact with each other. Note that fibrous carbon refers to carbon nanotube (also referred to as CNT) and the like. Graphene has a shape like a thin plane, and thus allows a conductive path to be formed efficiently with a smaller amount than those of other carbon materials and allows the proportion of an active material to be increased, leading to an increase in the capacity of an electrode per volume. Thus, a small secondary battery with high capacity can be achieved. Moreover, the use of graphene can suppress a decrease in capacity due to fast charging and discharging. Graphene in this specification and the like includes not only a single layer but also multi graphene and multilayer graphene. Multilayer graphene refers to, for example, two or more and one hundred or less carbon sheets. Particulate carbon refers to carbon black (e.g., furnace black, acetylene black (also referred to as AB), and graphite). Note that a structure including graphene as a conductive material is preferable. The use of graphene as a conductive material may suppress deterioration of a positive electrode active material due to charging and discharging. For example, in charging and discharging, a positive electrode active material may be affected by cation mixing and deteriorate from its surface portion. In this case, a structure including graphene as a conductive material may suppress the deterioration. Note that a variety of combinations can be used as a conductive material. Typical combinations that are suitably used as a conductive material are a combination of graphene and particulate carbon (e.g., acetylene black), a combination of fibrous carbon (e.g., carbon nanotube) and particulate carbon (e.g., acetylene black), and the like. A material used in formation of graphene may be mixed with graphene. For example, particles used as a catalyst in formation of graphene may be mixed together. As an example of the catalyst in formation of graphene, particles containing any of silicon oxide ($SiO_2$ or $SiO_x$ ($x<2$)), aluminum oxide, iron, nickel, ruthenium, iridium, platinum, copper, germanium, and the like can be given. The D50 of the particles is preferably less than or equal to 1 μm, further preferably less than or equal to 100 nm.

Another embodiment of the present invention is an electronic device including the above-described secondary battery. The use of the above-described positive electrode active material can achieve a highly safe or reliable secondary battery with high energy density, and thus is preferable for next-generation clean energy vehicles including large batteries in which a plurality of secondary batteries are stored, e.g., hybrid vehicles, electric vehicles, and plug-in hybrid vehicles.

Effect of the Invention

According to one embodiment of the present invention, a method for manufacturing a positive electrode active material with high energy density and high charge and discharge capacity can be provided. A method for manufacturing a positive electrode active material with high energy density and high charge and discharge voltage can be provided. A method for manufacturing a positive electrode active material with little deterioration can be provided. A method for manufacturing a novel positive electrode active material can be provided. A method for manufacturing a secondary battery with high charge and discharge capacity can be provided. A method for manufacturing a secondary battery with high charge and discharge voltage can be provided. A method for manufacturing a highly safe or reliable secondary battery can be provided. A method for manufacturing a secondary battery with little deterioration can be provided. A method for manufacturing a secondary battery with a long lifetime can be provided. A method for manufacturing a novel secondary battery can be provided.

When capacity is intended to be increased by increasing the number of secondary batteries in order to lengthen a driving range per charge, the total weight of a vehicle is increased and more energy is consumed to move the vehicle, which might shorten a driving range per charge. With the use of a high-energy-density secondary battery disclosed in one embodiment of the present invention, a driving range per charge can be lengthened with almost no increase in the total weight of a vehicle including a secondary battery having the same weight.

Thus, according to one embodiment of the present invention, a vehicle including a novel power storage device can be provided.

According to one embodiment of the present invention, a novel material, a novel active material, a novel power storage device, or a manufacturing method thereof can be provided.

Note that the description of these effects does not preclude the existence of other effects. One embodiment of the present invention does not have to have all of these effects. Other effects will be apparent from the descriptions of the specification, the drawings, the claims, and the like, and other effects can be derived from the descriptions of the specification, the drawings, the claims, and the like.

BRIEF DESCRIPTION OF THE DRAWINGS

FIG. 7A to FIG. 7C are diagrams showing examples of secondary batteries.

FIG. 11A and FIG. 11B are diagrams showing examples of a secondary battery.

FIG. 18A to FIG. 18D are diagrams showing examples of electronic devices.

MODE FOR CARRYING OUT THE INVENTION

Figure 1A:
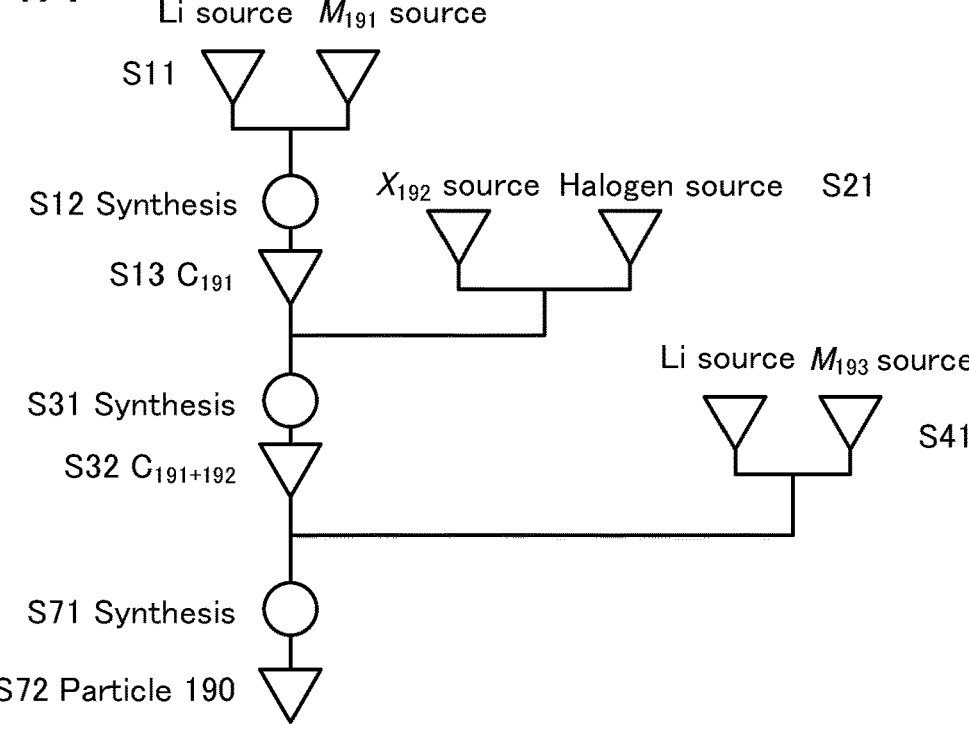
FIG. 1A and FIG. 1B are examples of a method for manufacturing a positive electrode active material.

Embodiments of the present invention will be described in detail below with reference to the drawings. Note that the present invention is not limited to the following description, and it is readily understood by those skilled in the art that modes and details of the present invention can be modified in various ways. In addition, the present invention should not be construed as being limited to the description of the following embodiments.

The ordinal numbers such as "first" and "second" in this specification and the like are used for convenience and do not denote the order of steps or the stacking order of layers. Therefore, for example, the term "first" can be replaced with the term "second", "third", or the like as appropriate. In addition, the ordinal numbers in this specification and the like do not sometimes correspond to the ordinal numbers that are used to specify one embodiment of the present invention.

Moreover, in this specification and the like, terms for describing arrangement, such as "over" and "under", are used for convenience to describe the positional relationship between components with reference to drawings. The positional relationship between components is changed as appropriate in accordance with the direction from which each component is described. Thus, without limitation to terms described in this specification, the description can be changed appropriately depending on the situation.

In this specification and the like, crystal planes and orientations are indicated by the Miller index. In the crystallography, a bar is placed over a number in the expression of crystal planes and orientations; however, in this specification and the like, because of application format limitations, crystal planes and orientations may be expressed by placing a minus sign (−) at the front of a number instead of placing a bar over the number. Furthermore, an individual direction that shows an orientation in a crystal is denoted by "[ ]", a set direction that shows all of the equivalent orientations is denoted by "< >", an individual plane that shows a crystal plane is denoted by "( )", and a set plane having equivalent symmetry is denoted by "{ }".

In this specification and the like, segregation refers to a phenomenon in which, in a solid made of a plurality of elements (e.g., A, B, and C), a certain element (e.g., B) is spatially non-uniformly distributed.

In this specification and the like, a superficial portion of a particle of an active material and the like is, for example, a region of 50 nm or less, preferably 35 nm or less, further preferably 20 nm or less, and most preferably 10 nm or less in depth from the surface. A plane generated by a split or a crack may also be referred to as a surface. In addition, a region whose position is deeper than that of the superficial portion is referred to as an inner portion. In this specification and the like, particles are not necessarily spherical (with a circular cross section). Other examples of the cross-sectional shapes of particles include an ellipse, a rectangle, a trapezoid, a pyramid, a quadrilateral with rounded corners, and an asymmetrical shape, and a particle may have an indefinite shape.

In this specification and the like, a layered rock-salt crystal structure of a composite oxide containing lithium and a transition metal refers to a crystal structure in which a rock-salt ion arrangement where cations and anions are alternately arranged is included and lithium and the transition metal are regularly arranged to form a two-dimensional plane, so that lithium can be diffused two-dimensionally. Note that a defect such as a cation or anion vacancy may exist. In the layered rock-salt crystal structure, strictly, a lattice of a rock-salt crystal is distorted in some cases.

In this specification and the like, a rock-salt crystal structure refers to a structure in which cations and anions are alternately arranged. Note that a cation or anion vacancy may exist.

In this specification and the like, an O3' type crystal structure of a composite oxide containing lithium and a transition metal belongs to a space group R-3m, and an ion of cobalt, magnesium, or the like is coordinated to six oxygen atoms. Furthermore, the symmetry of $CoO_2$ layers of this structure is the same as that in the O3 type structure. This structure is thus referred to as the O3' type crystal structure in this specification and the like. Note that in the O3' type crystal structure, a light element such as lithium sometimes occupies a site coordinated to four oxygen atoms.

The O3' type crystal structure can be regarded as a crystal structure that contains lithium between layers randomly and is similar to a $CdCl_2$ type crystal structure. The crystal structure similar to the $CdCl_2$ type crystal structure is close to a crystal structure of lithium nickel oxide when charged up to a charge depth of 0.94 ($Li_{0.06}NiO_2$); however, simple and pure lithium cobalt oxide or a layered rock-salt positive electrode active material including a large amount of cobalt is known not to have this crystal structure generally.

Anions of a layered rock-salt crystal and anions of a rock-salt crystal have a cubic close-packed structure (face-centered cubic lattice structure). Anions of an O3' type crystal are also presumed to form a cubic close-packed structure. In addition, actual crystals always have a defect and thus, analysis results are not necessarily consistent with the theory. For example, in an electron diffraction pattern or an FFT (fast Fourier transform) pattern of a TEM image or the like, a spot may appear in a position slightly different from a theoretical position.

When a layered rock-salt crystal and a rock-salt crystal are in contact with each other, there is a crystal plane at which directions of cubic closest packed structures formed of anions are aligned with each other. The above phenomenon can also be described as follows. Anions on the (111) plane of a cubic crystal structure are aligned in a triangular shape. A layered rock-salt structure, which belongs to a space group R-3m and is a rhombohedral structure, is generally represented by a composite hexagonal lattice for easy understanding of the structure, and the (0001) plane of the layered rock-salt structure has a hexagonal lattice. The triangle lattice on the (111) plane of the cubic crystal has atomic arrangement similar to that of the hexagonal lattice on the (0001) plane of the layered rock-salt structure. These lattices being consistent with each other can be expressed as "orientations of the cubic close-packed structures are aligned with each other". Note that the space group of the layered rock-salt crystal and the O3' type crystal is R-3m, which is different from the space groups Fm-3m (the space group of a general rock-salt crystal) and Fd-3m of rock-salt crystals; thus, the Miller index of the crystal plane satisfying the above conditions in the layered rock-salt crystal and the O3' type crystal is different from that in the rock-salt crystal. In this specification, in the layered rock-salt crystal, the O3' type crystal, and the rock-salt crystal, a state where the orientations of the cubic close-packed structures formed of anions are aligned with each other may be referred to as a state where crystal orientations are substantially aligned with each other.

The orientations of crystals in two regions being substantially aligned with each other can be judged, for example, from a TEM (Transmission Electron Microscope) image, a STEM (Scanning Transmission Electron Microscope) image, a HAADF-STEM (High-Angle Annular Dark Field Scanning TEM) image, an ABF-STEM (Annular Bright-Field Scanning Transmission Electron Microscopy) image, or the like. XRD (X-ray diffraction), electron diffraction, neutron diffraction, and the like can also be used for judging. In a TEM image and the like, alignment of cations and anions can be observed as repetition of bright lines and dark lines. When the orientations of cubic close-packed structures in the layered rock-salt crystal and the rock-salt crystal are aligned, a state where an angle made by the repetition of bright lines and dark lines in the crystals is less than or equal to 5°, preferably less than or equal to 2.5° can be observed. Note that in a TEM image and the like, a light element typified by oxygen or fluorine cannot be clearly observed in some cases; in such a case, alignment of orientations can be judged by arrangement of metal elements.

In this specification and the like, a theoretical capacity of a positive electrode active material refers to the amount of electricity obtained when all lithium that can be inserted and extracted and is contained in the positive electrode active material is extracted. For example, the theoretical capacity of $LiCoO_2$ is 274 mAh/g, the theoretical capacity of $LiNiO_2$ is 274 mAh/g, and the theoretical capacity of $LiMn_2O_4$ is 148 mAh/g.

In this specification and the like, the charge depth obtained when all lithium that can be inserted and extracted is inserted is 0, and the charge depth obtained when all lithium that can be inserted and extracted and is contained in a positive electrode active material is extracted is 1.

In this specification and the like, charging refers to transfer of lithium ions from a positive electrode to a negative electrode in a battery and transfer of electrons from a positive electrode to a negative electrode in an external circuit. For a positive electrode active material, extraction of lithium ions is called charging. A positive electrode active material with a charge depth of greater than or equal to 0.7 and less than or equal to 0.9 may be referred to as a positive electrode active material charged with high voltage.

Similarly, discharging refers to transfer of lithium ions from a negative electrode to a positive electrode in a battery and transfer of electrons from a negative electrode to a positive electrode in an external circuit. For a positive electrode active material, insertion of lithium ions is called discharging. A positive electrode active material with a charge depth of less than or equal to 0.06 or a positive electrode active material from which more than or equal to 90% of the charge capacity is discharged from a high-voltage charged state is referred to as a sufficiently discharged positive electrode active material.

In this specification and the like, an unbalanced phase change refers to a phenomenon that causes a nonlinear change in physical quantity. For example, an unbalanced phase change is presumed to occur around a peak in a dQ/dV curve obtained by differentiating capacitance (Q) with voltage (V) (dQ/dV), resulting in a large change in the crystal structure.

A secondary battery includes a positive electrode and a negative electrode, for example. A positive electrode active material is a material included in the positive electrode. The positive electrode active material is a substance that performs a reaction contributing to the charge and discharge capacity, for example. Note that the positive electrode active material may partly contain a substance that does not contribute to the charge and discharge capacity.

In this specification and the like, the positive electrode active material of one embodiment of the present invention is expressed as a positive electrode material, a secondary battery positive electrode material, or the like in some cases. In this specification and the like, the positive electrode active material of one embodiment of the present invention preferably contains a compound. In this specification and the like, the positive electrode active material of one embodiment of the present invention preferably contains a composition. In this specification and the like, the positive electrode active material of one embodiment of the present invention preferably contains a composite.

The discharging rate refers to the relative ratio of current at the time of discharging to battery capacity and is expressed in a unit C. A current corresponding to 1 C in a battery with a rated capacity X (Ah) is X (A). The case where discharging is performed at a current of 2X (A) is rephrased as to perform discharging at 2 C, and the case where discharging is performed at a current of X/5 (A) is rephrased as to perform discharging at 0.2 C. The same applies to the charging rate; the case where charging is performed at a current of 2X (A) is rephrased as to perform charging at 2 C, and the case where charging is performed at a current of X/5 (A) is rephrased as to perform charging at 0.2 C.

Constant-current charging refers to, for example, a method for performing charging at a constant charging rate. Constant voltage charging refers to a charging method in which voltage is fixed when reaching the upper voltage limit, for example. Constant-current discharging refers to, for example, a method for performing discharging at a constant discharging rate.

In this specification and the like, an approximate value of a given value A refers to a value greater than or equal to 0.9A and less than or equal to 1.1A.

Embodiment 1

Figures 2A, 2B:
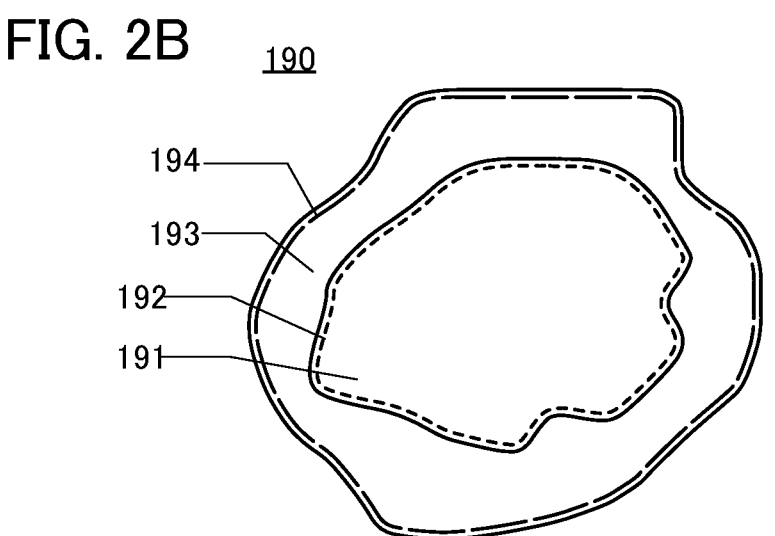
FIG. 2A and FIG. 2B are examples of cross-sectional views of a positive electrode active material.

FIG. 2A and FIG. 2B are examples of cross sections of a particle 190 which can be manufactured by a method for manufacturing a positive electrode active material of one embodiment of the present invention.

A particle of one embodiment of the present invention can be used as a material of an electrode of a secondary battery. The particle of one embodiment of the present invention functions as an active material. The active material is a substance that performs a reaction contributing to charge and discharge capacity, for example. Note that the active material may partly contain a substance that does not contribute to the charge and discharge capacity.

In particular, the particle of one embodiment of the present invention can be used as a positive electrode material of a secondary battery. In particular, the particle of one embodiment of the present invention functions as a positive electrode active material. The positive electrode active material is, for example, a substance that performs a reaction contributing to the charge and discharge capacity, and is a substance used as a positive electrode material. Note that the positive electrode active material may partly contain a substance that does not contribute to the charge and discharge capacity. A particle, active material, positive electrode material, or positive electrode active material that contains at least lithium, a transition metal, and oxygen may be referred to as a composite oxide.

The particle 190 illustrated in FIG. 2A includes a region 191, a region 192, and a region 193. The region 191, the region 192, and the region 193 are each a composite oxide containing oxygen and a plurality of metal atoms.

The region 191 is provided on the inner side than the region 193. The region 192 is provided between the region 191 and the region 193.

The region 193 is a region including a surface portion of the particle 190. The region 192 is a region positioned inside the region 193. The region 191 is a region positioned inside the region 192. The region 191 is an inner portion of the particle 190 and is, for example, a region including the center of the particle. The center of the particle refers to the centroid of the particle, and its position can be specified in an electron microscope image or the like. For example, the center refers to, when the particle is cut and a cross section is observed, the center of a circle that is the minimum circumcircle drawn on a cross section with the maximum cross-sectional area or a cross section with a cross-sectional area that is 90% or more of the maximum cross-sectional area.

The region 191 may be referred to as a "core" and the region 193 may be referred to as a "shell". Alternatively, the region 191 and the region 192 may be collectively referred to as a "core" and the region 193 may be referred to as a "shell". In such a case, the region 192 may be expressed as a surface portion of the "core". The region 192 may be expressed as an impurity layer.

An expression may be used that the particle 190 has a core-shell structure (also referred to as a core-shell-type structure).

The particle diameter (median diameter, also referred to as D50) of the particle 190 is preferably greater than or equal to 0.1 μm and less than or equal to 50 μm, further preferably greater than or equal to 1 μm and less than or equal to 30 μm.

The region 191 has a particulate form. The ratio of the region 191 occupying the area of the cross section of the particle 190, i.e., $S_{191}/S_{190}$ is preferably greater than or equal to 0.04% and less than or equal to 96.0%, further preferably greater than or equal to 30% and less than or equal to 90%, still further preferably greater than or equal to 64% and less than or equal to 90%. The area of the region 191, the area of the region 192, the area of the region 193, and the cross-sectional area of the particle 190 are represented by $S_{191}$, $S_{192}$, $S_{193}$, and $S_{190}$ ($S_{190} = S_{191} + S_{192} + S_{193}$), respectively.

At least part of the region 192 is preferably in contact with a particulate surface of the region 191. Alternatively, the region 192 is preferably provided to cover at least part of the particulate surface of the region 191. At least part of the region 192 is preferably provided in a position that is farther from the center of the particle 190 than the region 191.

The region 192 is preferably a layer covering at least part of the particulate surface of the region 191. For example, the region 192 is preferably a layer with a thickness of greater than or equal to 0.5 nm and less than or equal to 100 nm, further preferably greater than or equal to 1 nm and less than or equal to 30 nm. Note that the thickness of the region 192 is not necessarily uniform.

The region 192 preferably has a function of inhibiting interdiffusion between elements contained in the region 191 and the region 193 in synthesis. In addition, the region 192 preferably has a function of not inhibiting interdiffusion of lithium or a function of promoting interdiffusion of lithium in charging and discharging.

At least part of the region 193 is preferably provided in a position that is farther from the center of the particle 190 than the region 191 and the region 192. The region 193 preferably overlaps with at least one of the region 191 and the region 192. The region 193 preferably has a layered shape. The ratio of the region 193 occupying the area of the cross section of the particle 190 is preferably greater than or equal to 4% and less than or equal to 99.96%, further preferably greater than or equal to 10% and less than or equal to 70%, still further preferably greater than or equal to 10% and less than or equal to 36%. Note that the thickness of the region 193 is not necessarily uniform.

The region 193 preferably has a function of promoting diffusion of lithium due to charging and discharging to contribute to stabilization of the positive electrode active material. In addition, the region 193 preferably has a function of suppressing deterioration of the positive electrode active material due to charging and discharging. For example, in charging and discharging, the positive electrode active material may be affected by cation mixing and deteriorate from its surface portion. In this case, the region 193 preferably has a structure that is less likely to be affected by the cation mixing. The region 193 is not limited to one region and may include two or more regions. For example, the region 193 can include two regions: a region 193b provided on the inner side and a region 193a provided outside the region 193b.

As illustrated in FIG. 2B, the particle 190 may include a region 194. The region 194 is also a composite oxide containing oxygen and a plurality of metal atoms. The region 194 is provided outside the region 193. In this case, the region 193 and the region 194 may be collectively referred to as a "shell". An expression may be used that the region 194 includes a surface portion of the "shell", a surface portion of the particle 190, or a surface of the particle 190. The region 194 may be expressed as an impurity layer. The area of the region 194 is represented by $S_{194}$, and the area of the particle 190 including the region 194 is represented by $S_{190}$ ($S_{190} = S_{191} + S_{192} + S_{193} + S_{194}$).

At least part of the region 194 is preferably provided in a position that is farther from the center of the particle 190 than the region 193. The region 194 preferably overlaps with at least one of the region 191, the region 192, and the region 193. At least part of the region 194 overlaps with the region 193. For example, the region 194 is preferably a layer with a thickness of greater than or equal to 0.5 nm and less than or equal to 100 nm, further preferably greater than or equal to 1 nm and less than or equal to 30 nm. Note that the thickness of the region 194 is not necessarily uniform.

Also the region 194 preferably has a structure that is less likely to be affected by cation mixing. Since the region 194 is the outermost region of the particle 190 when included therein, there is a possibility that suppression of cation mixing in the region 194 and suppression of breakage of a crystal structure highly effectively suppress deterioration of, in particular, charge and discharge characteristics or the like.

The particle diameter of the particle can be evaluated with a particle size analyzer, for example. The area ratio on the cross section of the region 191, the region 193, or the like can be evaluated by cross-sectional observation after the cross section of the particle 190 is exposed by processing and various linear analyses, surface analyses, or the like. In the case of evaluating the area ratio, a cross section that efficiently reflects the inner structure of the particle 190 is preferably used. For example, a cross section whose maximum width is 80% or more of the average particle diameter (D50) is preferably used.

The thickness or the like of each region can also be evaluated by cross-sectional observation after the cross section is exposed by processing and various linear analyses, surface analyses, or the like.

The particle 190 can be manufactured by, for example, a solid phase method, a coprecipitation method, a hydrothermal method, a spray dry method, and a combination thereof <<Manufacturing Method 1>>

An example of manufacturing the particle 190 including the region 191 to the region 193 by a solid phase method is described with reference to FIG. 1A.

<Step S11>

First, in Step S11, a lithium (Li) source and a source of a transition metal $M_{191}$ contained in the region 191 are prepared.

As the lithium source, for example, lithium carbonate, lithium fluoride, lithium nitrate, or lithium hydroxide can be used.

The transition metal $M_{191}$ contained in the region 191 is preferably at least one of cobalt, nickel, manganese, iron, and vanadium, for example. As the transition metal $M_{191}$ contained in the region 191, it is particularly preferable to use a metal which together with lithium can form a layered rock-salt composite oxide that belongs to the space group R-3m. When metals that can form a layered rock-salt composite oxide are used, cobalt, manganese, and nickel are preferably mixed at the ratio at which the composite oxide can have a layered rock-salt crystal structure. A compound having a layered-rock salt crystal structure includes a so-called lithium-excess compound in which the atomic ratio of lithium to the transition metal $M_{191}$ is greater than 1. In addition, aluminum may be added to the transition metal $M_{191}$ as long as the composite oxide can have a layered rock-salt crystal structure. The region 191 is not limited to a composite oxide having a layered rock-salt crystal structure and may be a composite oxide having an olivine crystal structure, for example. The olivine crystal structure is preferred because a polyanionic skeleton containing phosphorus and oxygen is stable even in a state where all lithium is released and thus the crystal structure is less likely to be broken.

In the case where one of the transition metals $M_{191}$ contained in the region 191 is cobalt, cobalt oxide, cobalt hydroxide, or the like can be used as a cobalt source, for example. In the case where one of the transition metals $M_{191}$ contained in the region 191 is manganese, manganese oxide, manganese hydroxide, or the like can be used as a manganese source. In the case where one of the transition metals $M_{191}$ contained in the region 191 is nickel, nickel oxide, nickel hydroxide, or the like can be used as a nickel source. In the case where one of the transition metals $M_{191}$ contained in the region 191 is iron, iron oxide, iron hydroxide, or the like can be used as an iron source. In the case where one of the transition metals $M_{191}$ contained in the region 191 is vanadium, vanadium oxide, vanadium hydroxide, or the like can be used as a vanadium source.

Note that a material prepared in Step S11 is not limited thereto. Another element can be added as appropriate when needed to synthesize the region 191. For example, an aluminum source, a phosphorus source, a phosphoric acid source, or the like can be added.

<Step S12>

Next, in Step S12, the lithium source and the source of the transition metal $M_{191}$ contained in the region 191 are synthesized. As a synthesis method, for example, a method is given in which the lithium source and the source of the transition metal $M_{191}$ contained in the region 191 are mixed by a solid phase method and then heated.

The mixing can be performed by a dry process or a wet process. For example, a ball mill, a bead mill, or the like can be used for the mixing. When the ball mill is used, a zirconia ball is preferably used as grinding media, for example.

The heating in the synthesis in Step S12 is sometimes referred to as baking or first heating to distinguish this step from a heating step performed later. The first heating is preferably performed at higher than or equal to 800° C. and lower than 1100° C., further preferably at higher than or equal to 900° C. and lower than or equal to 1000° C., still further preferably at approximately 950° C. Alternatively, the heating is preferably performed at higher than or equal to 800° C. and lower than or equal to 1000° C. Alternatively, the heating is preferably performed at higher than or equal to 900° C. and lower than or equal to 1100° C. An excessively low temperature might lead to insufficient decomposition and melting of the lithium source and the source of the transition metal $M_{191}$ contained in the region 191. An excessively high temperature, on the other hand, might cause a defect due to excessive reduction of the transition metal $M_{191}$ taking part in an oxidation-reduction reaction, evaporation of lithium, or the like. The use of cobalt as the transition metal $M_{191}$, for example, may lead to a defect in which cobalt has divalence.

The heating time can be longer than or equal to 1 hour and shorter than or equal to 100 hours, for example, and is preferably longer than or equal to 2 hours and shorter than or equal to 20 hours. Alternatively, the heating time is preferably longer than or equal to 1 hour and shorter than or equal to 20 hours. Alternatively, the heating time is preferably longer than or equal to 2 hours and shorter than or equal to 100 hours. Baking is preferably performed in an atmosphere with few moisture, such as dry air (e.g., the dew point is lower than or equal to −50° C., further preferably lower than or equal to −100° C.). For example, it is preferable that the heating be performed at 1000° C. for 10 hours, the temperature rise be 200° C./h, and the flow rate of a dry atmosphere be 10 L/min. After that, the heated materials can be cooled to room temperature (25° C.). The temperature decreasing time from the specified temperature to room temperature is preferably longer than or equal to 10 hours and shorter than or equal to 50 hours, for example.

Note that the cooling to room temperature in Step S12 is not essential. As long as a later step is performed without problems, it is possible to perform cooling to a temperature higher than room temperature.

<Step S13>

Next, in Step S13, the materials baked in the above manner are collected, whereby a composite oxide $C_{191}$, which contains lithium, the transition metal, and oxygen and is contained in the region 191, is obtained. Specifically, lithium cobalt oxide, lithium manganese oxide, lithium nickel oxide, lithium cobalt oxide in which manganese is substituted for part of cobalt, lithium cobalt oxide in which nickel is substituted for part of cobalt, lithium nickel-manganese oxide, lithium nickel-manganese-cobalt oxide, or the like is obtained.

Alternatively, in Step S13, a composite oxide containing lithium, the transition metal, and oxygen that is synthesized in advance may be used as the composite oxide contained in the region 191. In that case, Step S11 and Step S12 can be omitted.

For example, as a composite oxide synthesized in advance, a lithium cobalt oxide particle (product name: CELLSEED C-10N) manufactured by NIPPON CHEMICAL INDUSTRIAL CO., LTD. can be used. This is lithium cobalt oxide in which the average particle diameter (D50) is approximately 12 μm, and in the impurity analysis by a glow discharge mass spectroscopy method (GD-MS), the magnesium concentration and the fluorine concentration are less than or equal to 50 ppm wt, the calcium concentration, the aluminum concentration, and the silicon concentration are less than or equal to 100 ppm wt, the nickel concentration is less than or equal to 150 ppm wt, the sulfur concentration is less than or equal to 500 ppm wt, the arsenic concentration is less than or equal to 1100 ppm wt, and the concentrations of elements other than lithium, cobalt, and oxygen are less than or equal to 150 ppm wt.

Alternatively, a lithium cobalt oxide particle (product name: CELLSEED C-5H) manufactured by NIPPON CHEMICAL INDUSTRIAL CO., LTD. can be used. This is lithium cobalt oxide in which the median diameter (D50) is approximately 6.5 μm, and the concentrations of elements other than lithium, cobalt, and oxygen are approximately equal to or less than those of C-10N in the impurity analysis by GD-MS.

<Step S21>

Next, in Step S21, a source of an element $X_{192}$ contained in the region 192 and a halogen source are prepared. The element $X_{192}$ source and the halogen source are collectively referred to as an impurity source in some cases. In addition, although not illustrated, a lithium source is preferably prepared as well.

As the halogen source, a fluorine source, a chlorine source, or the like can be used.

As the fluorine source, for example, lithium fluoride (LiF), magnesium fluoride ($MgF_2$), aluminum fluoride ($AlF_3$), titanium fluoride ($TiF_4$), cobalt fluoride ($CoF_2$ and $CoF_3$), nickel fluoride ($NiF_2$), zirconium fluoride ($ZrF_4$), vanadium fluoride ($VF_5$), manganese fluoride, iron fluoride, chromium fluoride, niobium fluoride, zinc fluoride ($ZnF_2$), calcium fluoride ($CaF_2$), sodium fluoride (NaF), potassium fluoride (KF), barium fluoride ($BaF_2$), cerium fluoride ($CeF_2$), lanthanum fluoride ($LaF_3$), or sodium aluminum hexafluoride ($Na_3AlF_6$) can be used. The fluorine source is not limited to a solid, and for example, fluorine ($F_2$), carbon fluoride, sulfur fluoride, oxygen fluoride (e.g., $OF_2$, $O_2F_2$, $O_3F_2$, $O_4F_2$, and $O_2F$), or the like may be used and mixed in the atmosphere in a heating step described later. A plurality of fluorine sources may be mixed to be used. Among them, lithium fluoride, which has a relatively low melting point of 848° C., is preferable because it is easily melted in an annealing process described later.

As the chlorine source, for example, lithium chloride or magnesium chloride can be used.

As the element $X_{192}$ source, a titanium source, a magnesium source, an aluminum source, a zirconium source, a calcium source, a gallium source, a niobium source, a phosphorus source, a boron source, a silicon source, or the like can be used.

As the titanium source, for example, titanium oxide, titanium hydroxide, titanium fluoride, lithium titanium oxide, or titanium alkoxide (for example, $[(CH_3)_2CHO]_4Ti$) can be used.

As the magnesium source, for example, magnesium fluoride, magnesium oxide, magnesium hydroxide, or magnesium carbonate can be used.

As the aluminum source, for example, aluminum oxide, aluminum hydroxide, aluminum fluoride, or aluminum alkoxide (for example, $Al[OCH(CH_3)_2]_3$) can be used.

Similarly, an oxide, hydroxide, fluoride, alkoxide, or the like can be used as each of the zirconium source, the calcium source, the gallium source, the niobium source, the phosphorus source, the boron source, and the silicon source.

As the lithium source, for example, lithium fluoride or lithium carbonate can be used. That is, lithium fluoride can be used as both the lithium source and the fluorine source. In addition, magnesium fluoride can be used as both the fluorine source and the magnesium source.

The element $X_{192}$ source and the halogen source may be synthesized together or separately synthesized a plurality of times. In the case where a plurality of elements $X_{192}$ are used, they may be separately synthesized a plurality of times in a similar manner. Alternatively, different synthesis methods may be employed.

For example, the halogen source may be synthesized by a solid phase method, and the titanium source may be synthesized by being attached by a sol-gel method and then heated.

The ion radius of the cation of the element $X_{192}$ contained in the region 192 is preferably larger than the ion radius of the cation contained in the region 191. Due to such a difference in an ion radius, the element $X_{192}$ is likely to be unevenly distributed as the region 192. In addition, the region 192 is likely to be allowed to have a function of inhibiting interdiffusion between elements of the region 191 and the region 193.

The radius of the cation contained in each region can be calculated by, for example, nanobeam electron diffraction or a TEM-FFT pattern. For example, a cation-cation distance is measured by these analyses and a crystal structure is estimated, whereby the radius of the cation can be calculated.

There is a correlation between ease of diffusion of ions in a solid and a melting point of a material. Furthermore, since a large oxidation number induces a cation vacancy, a diffusion coefficient tends to be large. Therefore, as the element X, an element having a high melting point as an oxide and having a small valence is preferably contained. For example, magnesium is more preferable.

Table 1 lists melting points and crystal structures of oxides.

TABLE 1

|  | Melting point (° C.) | Crystal structure |
|---|---|---|
| MgO | 2852 | Rock-salt |
| Al₂O₃ | 2072 | Corundum |

TABLE 1-continued

|  | Melting point (° C.) | Crystal structure |
|---|---|---|
| TiO₂ | 1843 | Rutile |
| CaO | 2572 | Rock-salt |

The bond distance between a cation and an anion can also be used as a reference of a diffusion coefficient. Table 2 lists bond distances and crystal structures.

TABLE 2

|  | Bond distance d between cation and anion (Å) | Crystal structure |
|---|---|---|
| MgO | 2.1056 | Rock-salt |
| LiF | 2.02 | Rock-salt |
| Al₂O₃ | 1.854 | Corundum |
| TiO₂ | 1.945 | Rutile |
| Co—O in LiCoO₂ | 2.092 | Layered rock-salt (R-3 m) |
| Li—O in LiCoO₂ | 1.922 | Layered rock-salt (R-3 m) |

Alternatively, by comparing stabilization energies through first-principles calculation, an element that tends to be unevenly distributed as the region 192 can be found.

In this embodiment, lithium fluoride LiF is prepared as the fluorine source, and magnesium fluoride $MgF_2$ is prepared as the fluorine source and the magnesium source. When lithium fluoride LiF and magnesium fluoride $MgF_2$ are mixed at approximately $LiF:MgF_2=65:35$ (molar ratio) and heated, both of them become liquids at the lowest temperature. On the other hand, when the amount of lithium fluoride increases, cycle performance might deteriorate because of a too large amount of lithium. Therefore, the molar ratio of lithium fluoride LiF to magnesium fluoride $MgF_2$ is preferably $LiF:MgF_2=x:1$ ($0\le x\le1.9$), further preferably $LiF:MgF_2=x:1$ ($0.1\le x\le0.5$), still further preferably $LiF:MgF_2=x:1$ (x=the vicinity of 0.33). Note that in this specification and the like, the vicinity means a value greater than 0.9 times and smaller than 1.1 times a certain value.

In addition, the element $X_{192}$ source and the halogen source are preferably mixed. When the mixing is performed by a wet method, a solvent is prepared. As the solvent, ketone such as acetone; alcohol such as ethanol or isopropanol; ether such as diethyl ether; dioxane; acetonitrile; N-methyl-2-pyrrolidone (NMP); or the like can be used. An aprotic solvent that hardly reacts with lithium is further preferably used. In this embodiment, acetone is used.

In the mixing, the element $X_{192}$ source and the halogen source are preferably pulverized. The pulverization allows the region 192 containing the element $X_{192}$ and the halogen to be provided over the region 191 more uniformly in a later step. The D50 (median diameter) of each of the element $X_{192}$ source and the halogen source is preferably greater than or equal to 10 nm and less than or equal to 20 μm, further preferably greater than or equal to 100 nm and less than or equal to 5 μm. Alternatively, the D50 is preferably greater than or equal to 10 nm and less than or equal to 5 μm. Alternatively, the D50 is preferably greater than or equal to 100 nm and less than or equal to 20 μm.

<Step S31>

Next, in Step S31, the composite oxide $C_{191}$ contained in the region 191, the element $X_{192}$ source, and the halogen source are synthesized. As a synthesis method, for example, a method is given in which the composite oxide $C_{191}$ contained in the region 191, the element $X_{192}$ source, and the halogen source are mixed and then heated.

The mixing can be performed by a dry process or a wet process. For example, a ball mill, a bead mill, or the like can be used for the mixing. When the ball mill is used, a zirconia ball is preferably used as grinding media, for example.

The heating in the synthesis in Step S31 is referred to as annealing or second heating in some cases to distinguish this step from another heating step. The second heating is preferably performed in an oxygen-containing atmosphere. The heating further preferably has the adhesion preventing effect to prevent particles of the composite oxide $C_{191}$ contained in the region 191 from adhering to one another. Examples of the heating having the adhesion preventing effect are heating while stirring is performed and heating while a container is being vibrated.

The temperature of the second heating needs to be higher than or equal to the temperature at which a reaction between the composite oxide $C_{191}$ contained in the region 191, the element $X_{192}$ source, and the halogen source proceeds. Here, the temperature at which the reaction proceeds is a temperature at which interdiffusion between elements contained in them occurs. Thus, the heating temperature may be lower than the melting temperatures of these materials. For example, in an oxide, solid-phase diffusion occurs at a temperature that is 0.757 times (Tamman temperature $T_d$) the melting temperature $T_m$. Accordingly, the heating temperature is higher than or equal to 500° C., for example.

Note that a temperature higher than or equal to the temperature at which at least part of the composite oxide $C_{191}$ contained in the region 191, the element $X_{192}$ source, and the halogen source is melted is preferable because the reaction proceeds more easily. Therefore, the annealing temperature is preferably higher than or equal to the eutectic point of at least one pair of these materials. In the case where LiF and $MgF_2$ are included as the element $X_{192}$ source and the halogen source, the temperature of the second heating is preferably higher than or equal to 742° C. because the eutectic point of LiF and $MgF_2$ is around 742° C.

The mixture obtained by mixing such that $LiCoO_2$:LiF: $MgF_2$=100:0.33:1 (molar ratio) exhibits an endothermic peak at around 830° C. in differential scanning calorimetry measurement (DSC measurement). Thus, the annealing temperature is further preferably higher than or equal to 830° C.

A higher annealing temperature is preferable because it facilitates the reaction, shortens the annealing time, and enables high productivity.

Note that the annealing temperature needs to be lower than or equal to a decomposition temperature of the composite oxide $C_{191}$ contained in the region 191 (1130° C. in the case of $LiCoO_2$). At around the decomposition temperature, a slight amount of the composite oxide $C_{191}$ contained in the region 191 might be decomposed. Thus, the annealing temperature is preferably lower than or equal to 1130° C., further preferably lower than or equal to 1000° C., further preferably lower than or equal to 950° C., and further preferably lower than or equal to 900° C.

In view of the above, the annealing temperature is preferably higher than or equal to 500° C. and lower than or equal to 1130° C., further preferably higher than or equal to 500° C. and lower than or equal to 1000° C., still further preferably higher than or equal to 500° C. and lower than or equal to 950° C., yet still further preferably higher than or equal to 500° C. and lower than or equal to 900° C. Furthermore, the annealing temperature is preferably higher than or equal to 742° C. and lower than or equal to 1130° C., further preferably higher than or equal to 742° C. and lower than or equal to 1000° C., still further preferably higher than or equal to 742° C. and lower than or equal to 950° C., yet still further preferably higher than or equal to 742° C. and lower than or equal to 900° C. Furthermore, the annealing temperature is preferably higher than or equal to 830° C. and lower than or equal to 1130° C., further preferably higher than or equal to 830° C. and lower than or equal to 1000° C., still further preferably higher than or equal to 830° C. and lower than or equal to 950° C., yet still further preferably higher than or equal to 830° C. and lower than or equal to 900° C.

In addition, at the time of the second heating, the partial pressure of fluorine or a fluoride in the atmosphere is preferably controlled to be within an appropriate range.

In the manufacturing method described in this embodiment, some of the materials, e.g., LiF as the fluorine source, function as a flux. Owing to this function, the annealing temperature can be lower than or equal to the decomposition temperature of the composite oxide $C_{191}$ contained in the region 191, e.g., a temperature higher than or equal to 742° C. and lower than or equal to 950° C., which allows distribution of the additive such as magnesium in a region in the vicinity of the surface and manufacture of the positive electrode active material having favorable performance.

However, LiF is lighter than oxygen, so that when LiF is volatilized by heating, the function of a flux deteriorates. Therefore, heating needs to be performed while volatilization of LiF is inhibited. Note that even when LiF is not used as the fluorine source or the like, there is a possibility in that Li and F of the composite oxide $C_{191}$ contained in the region 191 react with each other to generate LiF and vaporize. Therefore, the volatilization needs to be inhibited also when a fluoride having a higher melting point than LiF is used.

In view of this, the second heating is preferably performed in an atmosphere containing LiF, i.e., the second heating is preferably performed in a state where the partial pressure of LiF in a heating furnace is high. Such heating can inhibit volatilization of LiF.

The annealing is preferably performed for an appropriate time. The appropriate annealing time is changed depending on conditions, such as the annealing temperature, and the size and composition of the composite oxide $C_{191}$ contained in the region 191. In the case where the particle size is small, the annealing is preferably performed at a lower temperature or for a shorter time than the case where the particle size is large, in some cases.

When the average particle diameter (D50) of the particle of the composite oxide $C_{191}$ contained in the region 191 is approximately 12 μm, for example, the annealing temperature is preferably higher than or equal to 600° C. and lower than or equal to 950° C., for example. The annealing time is preferably longer than or equal to 3 hours, further preferably longer than or equal to 10 hours, still further preferably longer than or equal to 60 hours, for example.

On the other hand, when the average particle diameter (D50) of the particle of the composite oxide $C_{191}$ contained in the region 191 is approximately 5 μm, the annealing temperature is preferably higher than or equal to 600° C. and lower than or equal to 950° C., for example. The annealing time is preferably longer than or equal to 1 hour and shorter than or equal to 10 hours, further preferably approximately 2 hours, for example.

The temperature decreasing time after the annealing is, for example, preferably longer than or equal to 10 hours and shorter than or equal to 50 hours.

<Step S32>

Next, in Step S32, the material annealed in the above manner is collected, whereby a composite oxide $C_{191+192}$ in which the region 192 is provided for the composite oxide $C_{191}$ contained in the region 191 is obtained.

<Step S41>

Next, in Step S41, a lithium source and a source of a transition metal $M_{193}$ contained in the region 193 are prepared.

The transition metal $M_{193}$ contained in the region 193 is preferably at least one of cobalt, nickel, manganese, iron, and vanadium. As the transition metal $M_{193}$ contained in the region 193, it is particularly preferable to use a metal which together with lithium can form a layered rock-salt composite oxide that belongs to the space group R-3m. When metals that can form a layered rock-salt composite oxide are used, cobalt, manganese, and nickel are preferably mixed at the ratio at which the composite oxide can have a layered rock-salt crystal structure. In addition, aluminum may be added to the transition metal as long as the composite oxide can have a layered rock-salt crystal structure.

For the lithium source and the source of the transition metal $M_{193}$ contained in the region 193, the description of Step S11 can be referred to.

<Step S71>

Next, in Step S71, the composite oxide $C_{191+192}$ in which the region 192 is provided for the composite oxide contained in the region 191, the lithium source, and the source of the transition metal $M_{193}$ contained in the region 193 are synthesized. As a synthesis method, for example, a method is given in which they are mixed by a solid phase method and then heated.

The mixing can be performed by a dry process or a wet process. For example, a ball mill, a bead mill, or the like can be used for the mixing. When the ball mill is used, a zirconia ball is preferably used as grinding media, for example.

The heating in the synthesis in Step S71 is referred to as third heating in some cases to distinguish this step from another heating step. Preferably, the third heating is performed at a temperature lower than that of the first heating. For example, the third heating is preferably performed at a temperature lower than that of the first heating by 100° C. or more.

The composite oxide $C_{191}$ contained in the region 191 is preferably a material having a higher melting point than the composite oxide $C_{193}$ contained in the region 193. Alternatively, the composite oxide $C_{191}$ contained in the region 191 is preferably a material having a higher melting peak temperature than the composite oxide $C_{193}$ contained in the region 193. Alternatively, the composite oxide $C_{191}$ contained in the region 191 is preferably a material having a higher crystallization temperature than the composite oxide $C_{193}$ contained in the region 193. Alternatively, the composite oxide $C_{191}$ contained in the region 191 is preferably a material having higher thermal stability than the composite oxide $C_{193}$ contained in the region 193.

Owing to such a difference in a melting point, a melting peak temperature, a crystallization temperature, or thermal stability, the temperature and time of the heating in the synthesis in Step S71 can be set so that interdiffusion of the composite oxide $C_{193}$ contained in the region 193 sufficiently occurs while the composite oxide $C_{191}$ contained in the region 191 is stable, for example.

In the case of a layered rock-salt composite oxide, as the concentration of nickel in the transition metal increases, the melting point, melting peak temperature, and crystallization temperature tend to be lowered. Thus, the composite oxide $C_{191}$ contained in the region 191 preferably has a lower concentration of nickel in the transition metal than the composite oxide $C_{193}$ contained in the region 193.

For example, in the case where lithium cobalt oxide and lithium nickel-manganese-cobalt oxide are used as the region 191 and the region 193, respectively, the third heating is preferably performed at a temperature higher than or equal to 700° C. and lower than or equal to 900° C.

<Step S72>

In such a manner, the composite oxide $C_{193}$ contained in the region 193 is provided over the composite oxide $C_{191+192}$ in which the region 192 is provided for the composite oxide contained in the region 191, whereby the particle 190 can be formed (Step S72).

Figure 1B:
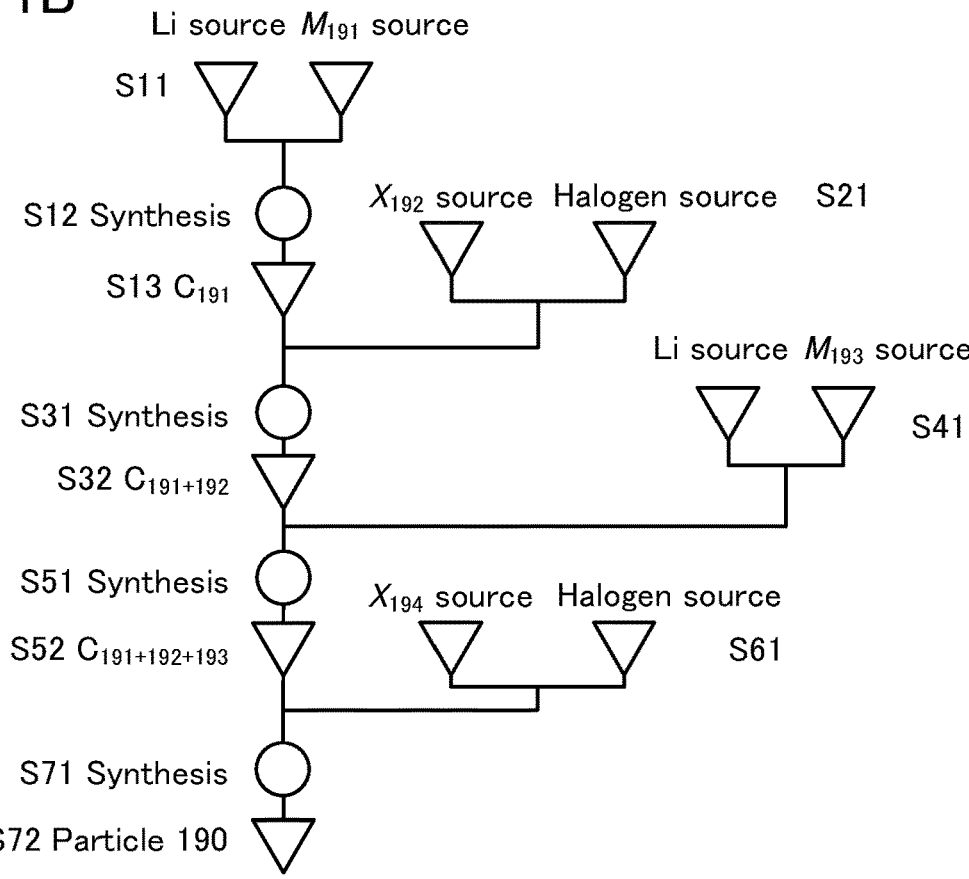

The particle 190 including the region 191 to the region 194 can be formed as shown in FIG. 1B, for example.

Steps S11 to Step S41 can be performed in a manner similar to that shown in FIG. 1A.

<Step S51>

Next, in Step S51, the composite oxide $C_{191+192}$ contained in the region 191 and the region 192, the lithium source, and the source of the transition metal $M_{193}$ contained in the region 193 are synthesized. As a synthesis method, for example, a method is given in which they are mixed by a solid phase method and then heated. The description of Step S31 can be referred to for the heating conditions.

<Step S52>

In such a manner, a composite oxide $C_{191+192+193}$ including the region 191 to the region 193 is formed (Step S52).

<Step S61>

Next, in Step S61, a source of an element $X_{194}$ contained in the region 194 and a source of halogen contained in the region 194 are prepared.

Next, in Step S71, the composite oxide $C_{191+192+193}$ including the region 191 to the region 193, the source of $X_{194}$ contained in the region 194, and the source of the halogen contained in the region 194 are synthesized. As a synthesis method, for example, a method is given in which they are mixed by a solid phase method and then heated.

In such a manner, a second impurity layer is provided for the composite oxide $C_{191+192+193}$ including the region 191 to the region 193, whereby the particle 190 is formed (Step S72).

The ion radius of the cation of the element $X_{194}$ contained in the region 194 is preferably larger than the ion radius of the cation contained in the region 193. Due to such a difference in an ion radius, the element $X_{194}$ is likely to be unevenly distributed as the region 194.

This embodiment can be used in combination with the other embodiments.

Embodiment 2

In this embodiment, a lithium-ion secondary battery including a positive electrode active material manufactured by the manufacturing method of one embodiment of the present invention will be described. The secondary battery at least includes an exterior body, a current collector, an active material (a positive electrode active material or a negative electrode active material), a conductive material, and a binder. An electrolyte solution in which a lithium salt or the like is dissolved is also included. In the secondary battery using an electrolyte solution, a positive electrode, a negative electrode, and a separator between the positive electrode and the negative electrode are provided.

[Positive Electrode]

The positive electrode includes a positive electrode active material layer and a positive electrode current collector, and the positive electrode active material is preferably manufactured by the manufacturing method described in Embodiment 1.

Figure 3A:
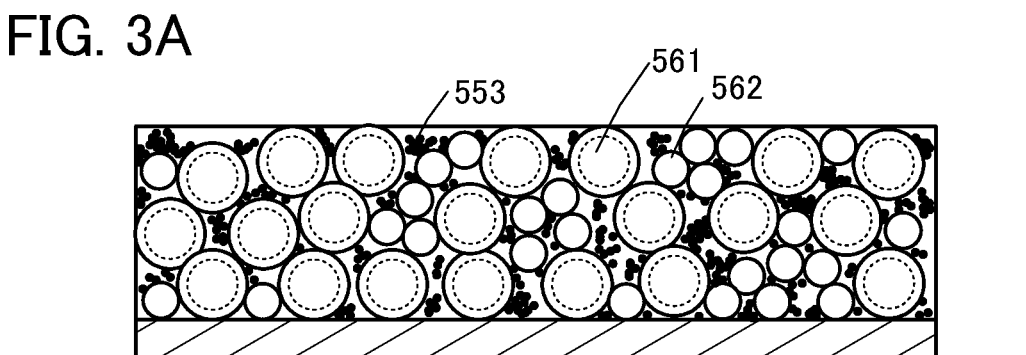
FIG. 3A to FIG. 3D are cross-sectional views showing examples of a positive electrode of a secondary battery.

FIG. 3A shows an example of a schematic cross-sectional view of the positive electrode.

A current collector 550 is metal foil, and the positive electrode is formed by applying slurry onto the metal foil and drying the slurry. Pressing may be performed after drying. The positive electrode is a component obtained by forming an active material layer over the current collector 550.

Slurry refers to a material solution that is used to form an active material layer over the current collector 550 and includes at least an active material, a binder, and a solvent, preferably also a conductive material mixed therewith. Slurry may also be referred to as slurry for an electrode or active material slurry; in some cases, slurry for forming a positive electrode active material layer is referred to as slurry for a positive electrode, and slurry for forming a negative electrode active material layer is referred to as slurry for a negative electrode.

A conductive material is also referred to as a conductivity-imparting agent and a conductive additive, and a carbon material is used as the conductive material. A conductive material is attached between a plurality of active materials, whereby the plurality of active materials are electrically connected to each other, and the conductivity increases. Note that the term "attach" refers not only to a state where an active material and a conductive material are physically in close contact with each other, and includes, for example, the following concepts: the case where covalent bonding occurs, the case where bonding with the Van der Waals force occurs, the case where a conductive material covers part of the surface of an active material, the case where a conductive material is embedded in surface roughness of an active material, and the case where an active material and a conductive material are electrically connected to each other without being in contact with each other.

Typical examples of the carbon material used as the conductive material include carbon black (e.g., furnace black, acetylene black, and graphite).

In FIG. 3A, acetylene black 553 is shown as the conductive material. FIG. 3A shows an example in which second active materials 562 with a smaller particle diameter than the particle 190 obtained in Embodiment 1 are mixed. The positive electrode in which particles with different particle sizes are mixed can have high density. Note that the particle 190 obtained in Embodiment 1 corresponds to an active material 561 in FIG. 3A.

In the positive electrode of the secondary battery, a binder (a resin) is mixed in order to fix the current collector 550 such as metal foil and the active material. The binder is also referred to as a binding agent. Since the binder is a high molecular material, a large amount of binder lowers the proportion of the active material in the positive electrode, thereby reducing the discharge capacity of the secondary battery. Therefore, the amount of binder mixed is reduced to a minimum. In FIG. 3A, regions not filled with the active material 561, the second active material 562, or the acetylene black 553 indicate spaces or binders.

In FIG. 3A, the boundary between the core region and the shell region of the active material 561 is indicated by a dotted line in the active material 561. Although FIG. 3A shows an example in which the active material 561 has a spherical shape, there is no particular limitation and other various shapes can be employed. The cross-sectional shape of the active material 561 may be an ellipse, a rectangle, a trapezoid, a pyramid, a quadrilateral with rounded corners, or an asymmetrical shape.

Figure 3B:
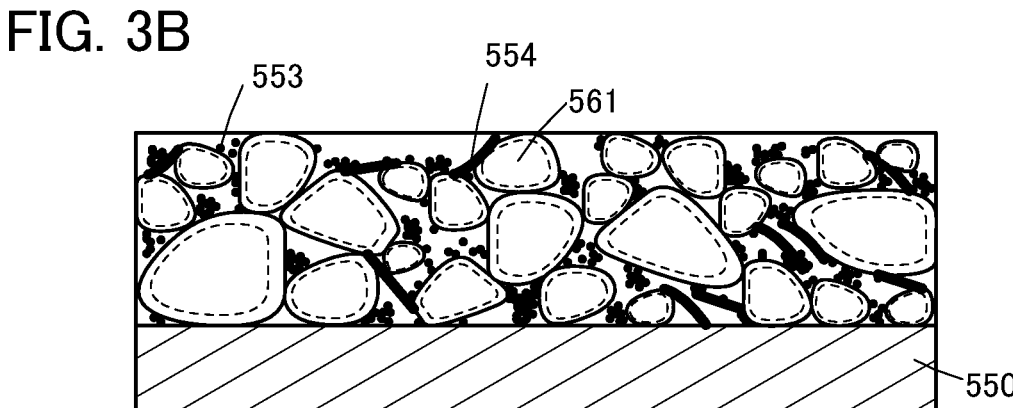

FIG. 3B shows an example in which the active materials 561 have various shapes. FIG. 3B shows the example different from that in FIG. 3A.

In the positive electrode in FIG. 3B, graphene 554 is used as a carbon material used as the conductive material.

Graphene, which has electrically, mechanically, or chemically remarkable characteristics, is a carbon material that is expected to be applied to a variety of fields, such as field-effect transistors and solar batteries.

In FIG. 3B, a positive electrode active material layer containing the active material 561, the graphene 554, and the acetylene black 553 is formed over the current collector 550.

In the step of mixing the graphene 554 and the acetylene black 553 to obtain an electrode slurry, the weight of mixed carbon black is preferably 1.5 times to 20 times, further preferably 2 times to 9.5 times the weight of graphene.

When the graphene 554 and the acetylene black 553 are mixed in the above ratio range, the acetylene black 553 can be dispersed uniformly and less likely to be aggregated at the time of preparing the slurry. Furthermore, when the graphene 554 and the acetylene black 553 are mixed in the above ratio range, the electrode density can be higher than that of an electrode using only the acetylene black 553 as a conductive material. As the electrode density is higher, the capacity per unit weight can be higher. Specifically, the density of the positive electrode active material layer measured by gravimetry can be higher than 3.5 g/cc. In addition, it is preferable that the particle 190 obtained in Embodiment 1 be used for the positive electrode and the graphene 554 and the acetylene black 553 be mixed in the above ratio range, in which case synergy for higher capacity of the secondary battery can be expected.

The electrode density is lower than that of a positive electrode containing only graphene as a conductive material, but when a first carbon material (graphene) and a second carbon material (acetylene black) are mixed in the above ratio range, fast charging can be achieved. In addition, it is preferable that the particle 190 obtained in Embodiment 1 be used for the positive electrode and the graphene 554 and the acetylene black 553 be mixed in the above ratio range, in which case synergy for higher stability and compatibility with faster charging of the secondary battery can be expected.

The above features are advantageous for secondary batteries for vehicles.

When a vehicle becomes heavier with increasing number of secondary batteries, more energy is consumed to move the vehicle, which shortens the driving range. With the use of a high-density secondary battery, the driving range of the vehicle can be maintained with almost no change in the total weight of a vehicle including a secondary battery having the same weight.

Since power is needed to charge the secondary battery with higher capacity in the vehicle, it is desirable to end charging fast. What is called a regenerative charging, in which electric power is temporarily generated when the vehicle is braked and the electric power is used for charging, is performed under high rate charging conditions; thus, a secondary battery for a vehicle is desired to have favorable rate characteristics.

Using the particle 190 obtained in Embodiment 1 for the positive electrode and mixing acetylene black and graphene within an optimal range enable both higher electrode density and formation of an appropriate space needed for ion conduction, whereby a secondary battery for a vehicle which has high energy density and favorable output characteristics can be obtained.

This structure is also effective in a portable information terminal, and using the particle 190 obtained in Embodiment 1 for the positive electrode and mixing acetylene black and graphene within an optimal range enable a small secondary battery with high capacity. Mixing acetylene black and graphene within an optimal range also enables fast charging of a portable information terminal.

In FIG. 3B, the boundary between the core region and the shell region of the active material 561 is indicated by a dotted line in the active material 561. In FIG. 3B, a region that is not filled with the active material 561, the graphene 554, or the acetylene black 553 represents a space or the binder. A space is required for the electrolyte solution to penetrate the positive electrode; too many spaces lower the electrode density, too few spaces do not allow the electrolyte solution to penetrate the positive electrode, and a space that remains after the secondary battery is completed lowers the efficiency.

Using the particle 190 obtained in Embodiment 1 for the positive electrode and mixing acetylene black and graphene within an optimal range enable both higher electrode density and formation of an appropriate space needed for ion conduction, whereby a secondary battery which has high energy density and favorable output characteristics can be obtained.

Figure 3C:
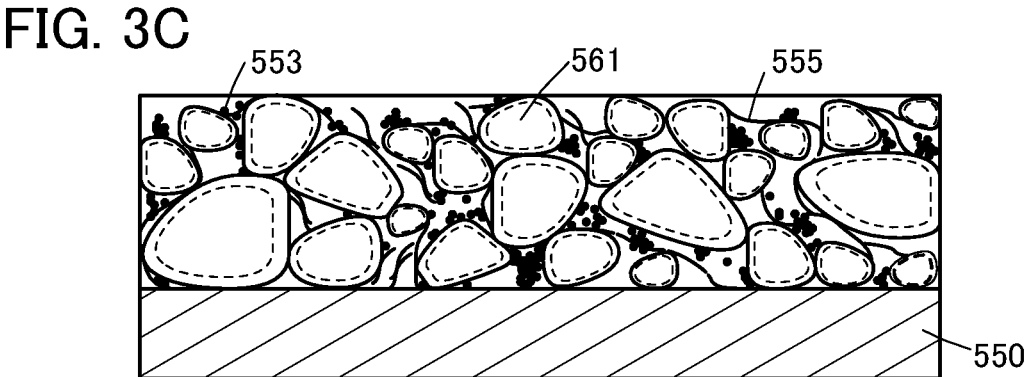

FIG. 3C shows an example of a positive electrode in which a carbon nanotube 555 is used instead of graphene. FIG. 3C shows the example different from that in FIG. 3B. With the use of the carbon nanotube 555, aggregation of carbon black such as the acetylene black 553 can be prevented and the dispersibility can be increased.

In FIG. 3C, a region that is not filled with the active material 561, the carbon nanotube 555, or the acetylene black 553 represents a space or the binder.

Figure 3D:
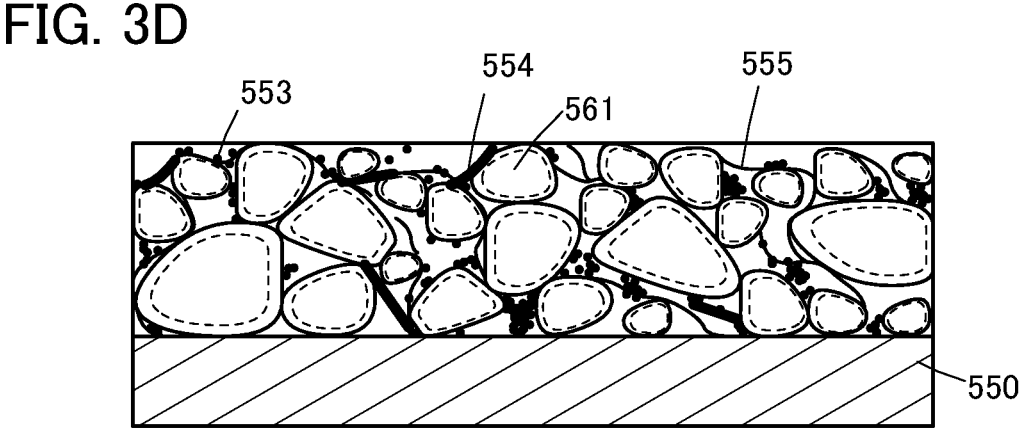

FIG. 3D shows another example of a positive electrode. In the example shown in FIG. 3D, the carbon nanotube 555 is used in addition to the graphene 554. With the use of both the graphene 554 and the carbon nanotube 555, aggregation of carbon black such as the acetylene black 553 can be prevented and the dispersibility can be further increased.

In FIG. 3D, a region that is not filled with the active material 561, the carbon nanotube 555, the graphene 554, or the acetylene black 553 represents a space or the binder.

The positive electrode in any one of FIG. 3A to FIG. 3D is used, a separator is provided over the positive electrode, and a negative electrode is provided over the separator, whereby a stack is fabricated. The stack is set in a container (e.g., an exterior body or a metal can) and the container is filled with an electrolyte solution, whereby a secondary battery can be fabricated.

Although the above structure is an example of a secondary battery using an electrolyte solution, one embodiment of the present invention is not limited thereto.

For example, a semi-solid-state battery or an all-solid-state battery can be fabricated using the particle 190 obtained in Embodiment 1.

In this specification and the like, a semi-solid-state battery refers to a battery in which at least one of an electrolyte layer, a positive electrode, and a negative electrode includes a semi-solid-state material. The term "semi-solid-state" here does not mean that the proportion of a solid-state material is 50%. The term "semi-solid-state" means having properties of a solid, such as a small volume change, and also having some of properties close to those of a liquid, such as flexibility. A single material or a plurality of materials can be used to satisfy the above properties. For example, a porous solid-state material infiltrated with a liquid material may be used.

In this specification and the like, a polymer electrolyte secondary battery refers to a secondary battery in which an electrolyte layer between a positive electrode and a negative electrode includes a polymer. Polymer electrolyte secondary batteries include a dry (or true) polymer electrolyte battery and a polymer gel electrolyte battery. A polymer electrolyte secondary battery may be referred to as a semi-solid-state battery.

A semi-solid-state battery fabricated using the particle 190 obtained in Embodiment 1 is a secondary battery having high charge and discharge capacity. The semi-solid-state battery can have high charge and discharge voltage. Alternatively, a highly safe or highly reliable semi-solid-state battery can be achieved.

The particle 190 obtained in Embodiment 1 and another positive electrode active material may be mixed to be used.

Examples of another positive electrode active material include composite oxides having an olivine crystal structure, a layered rock-salt crystal structure, and a spinel crystal structure. Examples include compounds such as $LiFePO_4$, $LiFeO_2$, $LiNiO_2$, $LiMn_2O_4$, $V_2O_5$, $Cr_2O_5$, and $MnO_2$.

As another positive electrode active material, it is preferable to mix lithium nickel oxide ($LiNiO_2$ or $LiNi_{1-x}M_xO_2$ ($0<x<1$) (M=Co, Al, or the like)) with a lithium-containing material that has a spinel crystal structure and contains manganese, such as $LiMn_2O_4$. This composition can improve the characteristics of the secondary battery.

As another positive electrode active material, a lithium-manganese composite oxide that can be represented by a composition formula $Li_aMn_bM_cO_d$ can be used. Here, the element M is preferably silicon, phosphorus, or a metal element other than lithium and manganese, and further preferably nickel. When the whole particle of a lithium-manganese composite oxide is measured, it is preferable to satisfy $0<a/(b+c)<2$; $c>0$; and $0.26≤(b+c)/d<0.5$ at the time of discharging. Note that the proportions of metals, silicon, phosphorus, and the like in the whole particle of a lithium-manganese composite oxide can be measured with, for example, an ICP-MS (inductively coupled plasma-mass spectrometer). The proportion of oxygen in the whole particle of a lithium-manganese composite oxide can be measured by, for example, EDX (energy dispersive X-ray spectroscopy). Moreover, the proportion of oxygen can be measured using fusion gas analysis and valence evaluation with XAFS (X-ray absorption fine structure) spectroscopy in combination with ICPMS analysis. Note that a lithium-manganese composite oxide is an oxide containing at least lithium and manganese, and may contain at least one element selected from a group consisting of chromium, cobalt, aluminum, nickel, iron, magnesium, molybdenum, zinc, indium, gallium, copper, titanium, niobium, silicon, phosphorus, and the like.

<Binder>

As the binder, a rubber material such as styrene-butadiene rubber (SBR), styrene-isoprene-styrene rubber, acrylonitrile-butadiene rubber, butadiene rubber, or ethylene-propylene-diene copolymer is preferably used, for example. Alternatively, fluororubber can be used as the binder.

As the binder, for example, water-soluble polymers are preferably used. As the water-soluble polymers, a polysaccharide can be used, for example. As the polysaccharide, starch, a cellulose derivative such as carboxymethyl cellulose (CMC), methyl cellulose, ethyl cellulose, hydroxypropyl cellulose, diacetyl cellulose, or regenerated cellulose, and/or the like can be used. It is further preferable that such water-soluble polymers be used in combination with any of the above rubber materials.

Alternatively, as the binder, a material such as polystyrene, poly(methyl acrylate), poly(methyl methacrylate) (PMMA), sodium polyacrylate, polyvinyl alcohol (PVA), polyethylene oxide (PEO), polypropylene oxide, polyimide, polyvinyl chloride, polytetrafluoroethylene, polyethylene, polypropylene, polyisobutylene, polyethylene terephthalate, nylon, polyvinylidene fluoride (PVDF), polyacrylonitrile (PAN), ethylene-propylene-diene polymer, polyvinyl acetate, or nitrocellulose is preferably used.

At least two of the above materials may be used in combination for the binder.

For example, a material having a significant viscosity modifying effect and another material may be used in combination. For example, a rubber material or the like has high adhesion and high elasticity but may have difficulty in viscosity modification when mixed in a solvent. In such a case, a rubber material or the like is preferably mixed with a material having a significant viscosity modifying effect, for example. As a material having a significant viscosity modifying effect, for instance, a water-soluble polymer is preferably used. An example of a water-soluble polymer having a significant viscosity modifying effect is the above-mentioned polysaccharide; for instance, a cellulose derivative such as carboxymethyl cellulose (CMC), methyl cellulose, ethyl cellulose, hydroxypropyl cellulose, diacetyl cellulose, or regenerated cellulose, and/or starch can be used.

Note that a cellulose derivative such as carboxymethyl cellulose obtains a higher solubility when converted into a salt such as a sodium salt or an ammonium salt of carboxymethyl cellulose, and thus easily exerts an effect as a viscosity modifier. A high solubility can also increase the dispersibility of an active material and other components in the formation of slurry for an electrode. In this specification, cellulose and a cellulose derivative used as a binder of an electrode include salts thereof.

A water-soluble polymer stabilizes the viscosity by being dissolved in water and allows stable dispersion of the active material and another material combined as a binder, such as styrene-butadiene rubber, in an aqueous solution. Furthermore, a water-soluble polymer is expected to be easily and stably adsorbed onto an active material surface because it has a functional group. Many cellulose derivatives, such as carboxymethyl cellulose, have a functional group such as a hydroxyl group and/or a carboxyl group. Because of functional groups, polymers are expected to interact with each other and cover an active material surface in a large area.

In the case where the binder that covers the active material surface or is in contact with the surface forms a film, the film is expected to serve also as a passivation film to suppress the decomposition of the electrolyte solution. Here, a passivation film refers to a film without electric conductivity or a film with extremely low electric conductivity, and can inhibit the decomposition of an electrolyte solution at a potential at which a battery reaction occurs when the passivation film is formed on the active material surface, for example. It is preferred that the passivation film can conduct lithium ions while suppressing electrical conduction.

<Positive Electrode Current Collector>

The current collector can be formed using a material that has high conductivity, such as a metal like stainless steel, gold, platinum, aluminum, or titanium, or an alloy thereof. It is preferred that a material used for the positive electrode current collector not dissolve at the potential of the positive electrode. It is also possible to use an aluminum alloy to which an element that improves heat resistance, such as silicon, titanium, neodymium, scandium, or molybdenum, is added. A metal element that forms silicide by reacting with silicon may be used. Examples of the metal element that forms silicide by reacting with silicon include zirconium, titanium, hafnium, vanadium, niobium, tantalum, chromium, molybdenum, tungsten, cobalt, and nickel. The current collector can have a foil-like shape, a plate-like shape, a sheet-like shape, a net-like shape, a punching-metal shape, an expanded-metal shape, or the like as appropriate. The current collector preferably has a thickness greater than or equal to 5 μm and less than or equal to 30 μm.

[Negative Electrode]

The negative electrode includes a negative electrode active material layer and a negative electrode current collector. The negative electrode active material layer may include a conductive material and a binding agent.

<Negative Electrode Active Material>

As the negative electrode active material, an alloy-based material and/or a carbon-based material can be used, for example.

As the negative electrode active material, an element that enables charge and discharge reactions by alloying and dealloying reactions with lithium can be used. For example, a material containing at least one of silicon, tin, gallium, aluminum, germanium, lead, antimony, bismuth, silver, zinc, cadmium, indium, and the like can be used. Such elements have higher capacity than carbon. In particular, silicon has a high theoretical capacity of 4200 mAh/g. For this reason, silicon is preferably used as the negative electrode active material. Alternatively, a compound containing any of the above elements may be used. For example, SiO, $Mg_2Si$, $Mg_2Ge$, SnO, $SnO_2$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, and SbSn are given. Here, an element that enables charge and discharge reactions by alloying and dealloying reactions with lithium, a compound containing the element, and the like may be referred to as an alloy-based material.

In this specification and the like, SiO refers to silicon monoxide, for example. Note that SiO can alternatively be expressed as $SiO_x$. Here, it is preferred that x be 1 or have an approximate value of 1. For example, x is preferably more than or equal to 0.2 and less than or equal to 1.5, and preferably more than or equal to 0.3 and less than or equal to 1.2.

As the carbon-based material, graphite, graphitizing carbon (soft carbon), non-graphitizing carbon (hard carbon), carbon nanotube, graphene, carbon black, or the like can be used.

Examples of graphite include artificial graphite and natural graphite. Examples of artificial graphite include mesocarbon microbeads (MCMB), coke-based artificial graphite, and pitch-based artificial graphite. Here, as artificial graphite, spherical graphite having a spherical shape can be used. For example, MCMB is preferable because it may have a spherical shape. Moreover, MCMB may be preferable because it can relatively easily have a small surface area. Examples of natural graphite include flake graphite and spherical natural graphite.

Graphite has a low potential substantially equal to that of a lithium metal (higher than or equal to 0.05 V and lower than or equal to 0.3 V vs. Li/Li$^+$) when lithium ions are intercalated into the graphite (while a lithium-graphite intercalation compound is generated). For this reason, a lithium-ion secondary battery can have a high operating voltage. In addition, graphite is preferred because of its advantages such as a relatively high capacity per unit volume, relatively small volume expansion, low cost, and higher level of safety than that of a lithium metal.

As the negative electrode active material, an oxide such as titanium dioxide ($TiO_2$), lithium titanium oxide ($Li_4Ti_5O_{12}$), a lithium-graphite intercalation compound ($Li_xC_6$), niobium pentoxide ($Nb_2O_5$), tungsten oxide ($WO_2$), or molybdenum oxide ($MoO_2$) can be used.

Alternatively, as the negative electrode active material, $Li_{3-x}M_xN$ (M is Co, Ni, or Cu) with a $Li_3N$ structure, which is a composite nitride containing lithium and a transition metal, can be used. For example, $Li_{2.6}Co_{0.4}N_3$ is preferable because of high charge and discharge capacity (900 mAh/g and 1890 mAh/cm³).

A composite nitride containing lithium and a transition metal is preferably used, in which case lithium ions are contained in the negative electrode active material and thus the negative electrode active material can be used in combination with a positive electrode active material that does not contain lithium ions, such as $V_2O_5$ or $Cr_3O_8$. Note that in the case of using a material containing lithium ions as a positive electrode active material, the composite nitride containing lithium and a transition metal can be used as the negative electrode active material by extracting the lithium ions contained in the positive electrode active material in advance.

Alternatively, a material that causes a conversion reaction can be used as the negative electrode active material. For example, a transition metal oxide that does not form an alloy with lithium, such as cobalt oxide (CoO), nickel oxide (NiO), and iron oxide (FeO), may be used as the negative electrode active material. Other examples of the material that causes a conversion reaction include oxides such as $Fe_2O_3$, CuO, $Cu_2O$, $RuO_2$, and $Cr_2O_3$, sulfides such as $CoS_{0.89}$, NiS, and CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$.

For the conductive material and the binder that can be included in the negative electrode active material layer, materials similar to those for the conductive material and the binder that can be included in the positive electrode active material layer can be used.

<Negative Electrode Current Collector>

For the negative electrode current collector, copper or the like can be used in addition to a material similar to that for the positive electrode current collector. Note that a material that is not alloyed with carrier ions of lithium or the like is preferably used for the negative electrode current collector.

[Separator]

The separator is positioned between the positive electrode and the negative electrode. The separator can be formed using, for example, a fiber containing cellulose, such as paper, nonwoven fabric, glass fiber, ceramics, or synthetic fiber containing nylon (polyamide), vinylon (polyvinyl alcohol-based fiber), polyester, acrylic, polyolefin, or polyurethane. The separator is preferably processed into a bag-like shape to enclose one of the positive electrode and the negative electrode.

The separator may have a multilayer structure. For example, an organic material film of polypropylene, polyethylene, or the like can be coated with a ceramic-based material, a fluorine-based material, a polyamide-based material, or a mixture thereof, or the like. Examples of the ceramic-based material include aluminum oxide particles and silicon oxide particles. Examples of the fluorine-based material include PVDF and polytetrafluoroethylene. Examples of the polyamide-based material include nylon and aramid (meta-based aramid and para-based aramid).

When the separator is coated with the ceramic-based material, the oxidation resistance is improved; hence, deterioration of the separator in charging and discharging at high voltage can be suppressed and thus the reliability of the secondary battery can be improved. When the separator is coated with the fluorine-based material, the separator is easily brought into close contact with an electrode, resulting in high output characteristics. When the separator is coated with the polyamide-based material, in particular, aramid, the safety of the secondary battery is improved because heat resistance is improved.

For example, both surfaces of a polypropylene film may be coated with a mixed material of aluminum oxide and aramid. Alternatively, a surface of a polypropylene film that is in contact with the positive electrode may be coated with a mixed material of aluminum oxide and aramid, and a surface of the polypropylene film that is in contact with the negative electrode may be coated with the fluorine-based material.

With the use of a separator having a multilayer structure, the capacity per volume of the secondary battery can be increased because the safety of the secondary battery can be maintained even when the total thickness of the separator is small.

[Electrolyte Solution]

The electrolyte solution contains a solvent and an electrolyte. As the solvent of the electrolyte solution, an aprotic organic solvent is preferably used. For example, one of ethylene carbonate (EC), propylene carbonate (PC), butylene carbonate, chloroethylene carbonate, vinylene carbonate, γ-butyrolactone, γ-valerolactone, dimethyl carbonate (DMC), diethyl carbonate (DEC), ethyl methyl carbonate (EMC), methyl formate, methyl acetate, ethyl acetate, methyl propionate, ethyl propionate, propyl propionate, methyl butyrate, 1,3-dioxane, 1,4-dioxane, dimethoxyethane (DME), dimethyl sulfoxide, diethyl ether, methyl diglyme, acetonitrile, benzonitrile, tetrahydrofuran, sulfolane, and sultone can be used, or two or more of these solvents can be used in an appropriate combination in an appropriate ratio.

Alternatively, the use of one or more kinds of ionic liquids (room temperature molten salts) which have features of non-flammability and non-volatility as the solvent of the electrolyte solution can prevent a power storage device from exploding and catching fire even when the power storage device internally shorts out and the internal temperature increases owing to overcharging or the like. An ionic liquid contains a cation and an anion, specifically, an organic cation and an anion. Examples of the organic cation used for the electrolyte solution include aliphatic onium cations such as a quaternary ammonium cation, a tertiary sulfonium cation, and a quaternary phosphonium cation, and aromatic cations such as an imidazolium cation and a pyridinium cation. Examples of the anion used for the electrolyte solution include a monovalent amide-based anion, a monovalent methide-based anion, a fluorosulfonate anion, a perfluoroalkylsulfonate anion, a tetrafluoroborate anion, a perfluoroalkylborate anion, a hexafluorophosphate anion, and a perfluoroalkylphosphate anion.

As the electrolyte dissolved in the above-described solvent, one of lithium salts such as $LiPF_6$, $LiClO_4$, $LiAsF_6$, $LiBF_4$, $LiAlCl_4$, LiSCN, LiBr, LiI, $Li_2SO_4$, $Li_2B_{10}Cl_{10}$, $Li_2Bi_2Cl_{12}$, $LiCF_3SO_3$, $LiC_4F_9SO_3$, $LiC(CF_3SO_2)_3$, $LiC(C_2F_5SO_2)_3$, $LiN(CF_3SO_2)_2$, $LiN(C_4F_9SO_2)(CF_3SO_2)$, $LiN(C_2F_5SO_2)_2$, and lithium bis(oxalate)borate ($Li(C_2O_4)_2$, LiBOB) can be used, or two or more of these lithium salts can be used in an appropriate combination in an appropriate ratio.

The electrolyte solution used for the power storage device is preferably highly purified and contains a small amount of dust particles and elements other than the constituent elements of the electrolyte solution (hereinafter also simply referred to as "impurities"). Specifically, the weight ratio of impurities to the electrolyte solution is preferably less than or equal to 1%, further preferably less than or equal to 0.1%, still further preferably less than or equal to 0.01%.

Furthermore, an additive agent such as vinylene carbonate, propane sultone (PS), tert-butylbenzene (TBB), fluoroethylene carbonate (FEC), lithium bis(oxalate)borate (LiBOB), or a dinitrile compound like succinonitrile or adiponitrile may be added to the electrolyte solution. The concentration of such an additive agent in the whole solvent is, for example, higher than or equal to 0.1 wt % and lower than or equal to 5 wt %.

Alternatively, a polymer gel electrolyte obtained in such a manner that a polymer is swelled with an electrolyte solution may be used.

When a polymer gel electrolyte is used, safety against liquid leakage and the like is improved. Moreover, the secondary battery can be thinner and more lightweight.

As a polymer that undergoes gelation, a silicone gel, an acrylic gel, an acrylonitrile gel, a polyethylene oxide-based gel, a polypropylene oxide-based gel, a fluorine-based polymer gel, or the like can be used. For example, a polymer having a polyalkylene oxide structure, such as polyethylene oxide (PEO), PVDF, polyacrylonitrile, or a copolymer containing any of them can be used. For example, PVDF-HFP, which is a copolymer of PVDF and hexafluoropropylene (HFP), can be used. The formed polymer may be porous.

Instead of the electrolyte solution, a solid electrolyte including an inorganic material such as a sulfide-based and/or oxide-based inorganic material, and a solid electrolyte including a polymer material such as a PEO (polyethylene oxide)-based polymer material may alternatively be used. When the solid electrolyte is used, a separator or a spacer is not necessary. Furthermore, the battery can be entirely solidified; therefore, there is no possibility of liquid leakage and thus the safety is dramatically improved.

Accordingly, the particle 190 obtained in Embodiment 1 can also be applied to all-solid-state batteries. By using the positive electrode slurry or the electrode in an all-solid-state battery, an all-solid-state battery with a high degree of safety and favorable characteristics can be obtained.

[Exterior Body]

For the exterior body included in the secondary battery, a metal material such as aluminum and/or a resin material can be used, for example. A film-like exterior body can also be used. As the film, for example, it is possible to use a film having a three-layer structure in which a highly flexible metal thin film of aluminum, stainless steel, copper, nickel, or the like is provided over a film formed of polyethylene, polypropylene, polycarbonate, ionomer, polyamide, or the like and an insulating synthetic resin film of a polyamide-based resin, a polyester-based resin, or the like is provided over the metal thin film as the outer surface of the exterior body.

This embodiment can be used in combination with the other embodiments.

Embodiment 3

This embodiment will describe examples of shapes of several types of secondary batteries including a positive electrode or a negative electrode formed by the manufacturing method described in the foregoing embodiment.

[Coin-Type Secondary Battery]

Figure 4A:
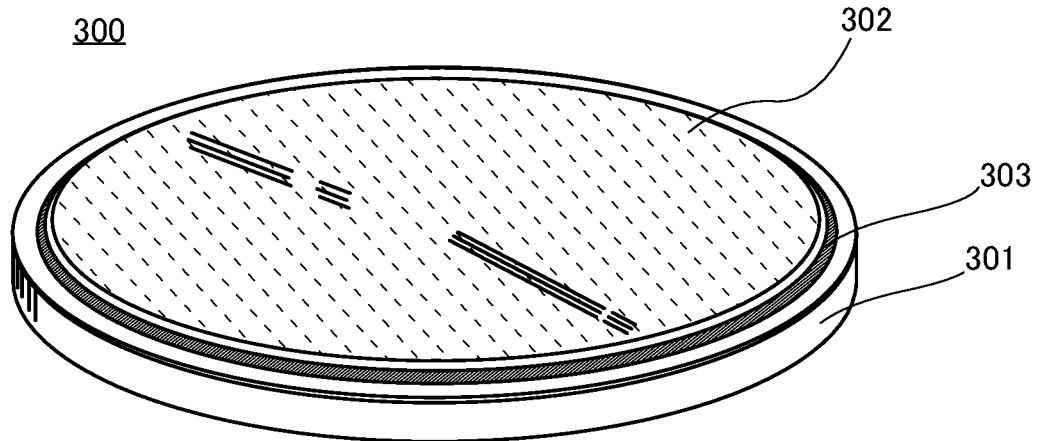
FIG. 4A is a perspective view of a coin-type secondary battery.
Figure 4B:
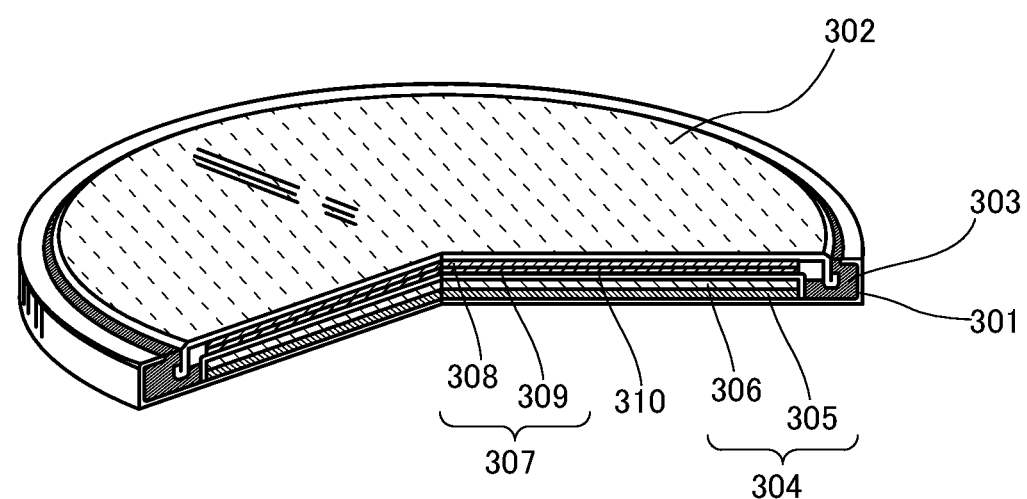
FIG. 4B is a cross-sectional perspective view thereof.

An example of a coin-type secondary battery is described. FIG. 4A is an external view of a coin-type (single-layer flat type) secondary battery, and FIG. 4B is a cross-sectional view thereof.

In a coin-type secondary battery 300, a positive electrode can 301 doubling as a positive electrode terminal and a negative electrode can 302 doubling as a negative electrode terminal are insulated from each other and sealed by a gasket 303 made of polypropylene or the like. A positive electrode 304 includes a positive electrode current collector 305 and a positive electrode active material layer 306 provided in contact with the positive electrode current collector 305. A negative electrode 307 includes a negative electrode current collector 308 and a negative electrode active material layer 309 provided in contact with the negative electrode current collector 308.

Note that only one surface of each of the positive electrode 304 and the negative electrode 307 used for the coin-type secondary battery 300 is provided with an active material layer.

For the positive electrode can 301 and the negative electrode can 302, a metal having corrosion resistance to an electrolyte solution, such as nickel, aluminum, or titanium, an alloy of such a metal, and/or an alloy of such a metal and another metal (e.g., stainless steel) can be used. The positive electrode can 301 and the negative electrode can 302 are preferably covered with nickel, aluminum, and/or the like in order to prevent corrosion due to the electrolyte solution. The positive electrode can 301 and the negative electrode can 302 are electrically connected to the positive electrode 304 and the negative electrode 307, respectively.

The coin-type secondary battery 300 is manufactured in the following manner: the negative electrode 307, the positive electrode 304, and a separator 310 are immersed in the electrolyte; as illustrated in FIG. 4B, the positive electrode 304, the separator 310, the negative electrode 307, and the negative electrode can 302 are stacked in this order with the positive electrode can 301 positioned at the bottom; and then the positive electrode can 301 and the negative electrode can 302 are subjected to pressure bonding with the gasket 303 therebetween.

The particle 190 obtained in Embodiment 1 is used in the positive electrode 304, whereby the coin-type secondary battery 300 can have high charge and discharge capacity and excellent cycle performance.

Here, a current flow in charging a secondary battery is described with reference to FIG. 4C. When a secondary battery using lithium is regarded as a closed circuit, lithium ions transfer and a current flows in the same direction. Note that in a secondary battery using lithium, the anode and the cathode are interchanged in charging and discharging, and the oxidation reaction and the reduction reaction are interchanged; thus, an electrode with a high reaction potential is called the positive electrode and an electrode with a low reaction potential is called the negative electrode. For this reason, in this specification, the positive electrode is referred to as a "positive electrode" or a "plus electrode" and the negative electrode is referred to as a "negative electrode" or a "minus electrode" in all the cases where charging is performed, discharging is performed, a reverse pulse current is supplied, and a charge current is supplied. The use of terms anode and cathode related to oxidation reaction and reduction reaction might cause confusion because the anode and the cathode are reversed in charging and in discharging.

Thus, the terms anode and cathode are not used in this specification. If the term anode or cathode is used, whether it is at the time of charging or discharging is noted and whether it corresponds to a positive electrode or a negative electrode is also noted.

Figure 4C:
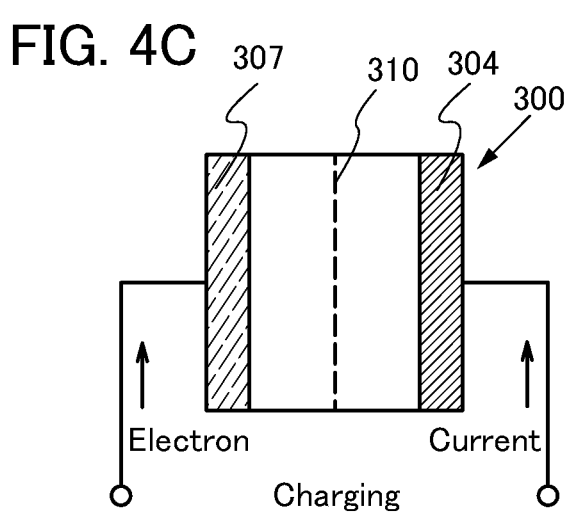
FIG. 4C is a schematic cross-sectional view in charging.

Two terminals illustrated in FIG. 4C are connected to a charger, and the secondary battery 300 is charged. As the charging of the secondary battery 300 proceeds, a potential difference between electrodes increases.

[Cylindrical Secondary Battery]

Figures 5A, 5B, 5C, 5D:
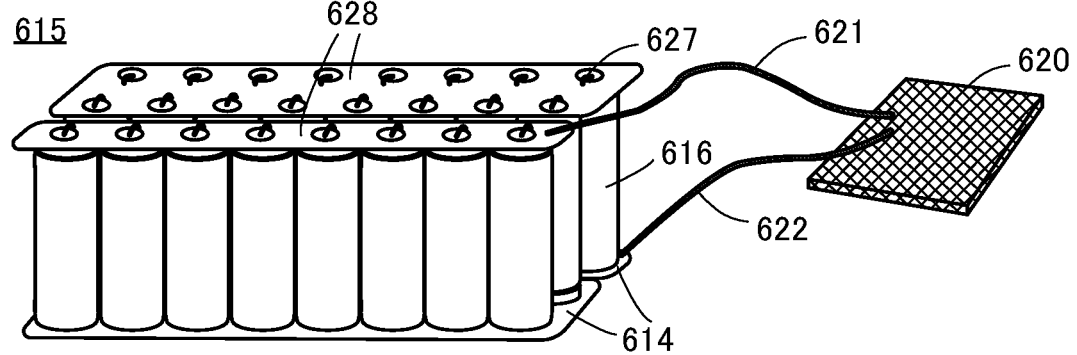
FIG. 5A shows an example of a cylindrical secondary battery.
FIG. 5B shows an example of a cylindrical secondary battery.
FIG. 5C shows an example of a plurality of cylindrical secondary batteries.
FIG. 5D shows an example of a power storage system including a plurality of cylindrical secondary batteries.

An example of a cylindrical secondary battery is described with reference to FIG. 5A. As illustrated in FIG. 5A, a cylindrical secondary battery 616 includes a positive electrode cap (battery cap) 601 on the top surface and a battery can (outer can) 602 on the side surface and bottom surface. The positive electrode cap 601 and the battery can (outer can) 602 are insulated from each other by a gasket (insulating gasket) 610.

FIG. 5B schematically illustrates a cross section of a cylindrical secondary battery. The cylindrical secondary battery illustrated in FIG. 5B includes the positive electrode cap (battery cap) 601 on the top surface and the battery can (outer can) 602 on the side and bottom surfaces. The positive electrode cap and the battery can (outer can) 602 are insulated from each other by the gasket (insulating gasket) 610.

Inside the battery can 602 having a hollow cylindrical shape, a battery element in which a strip-like positive electrode 604 and a strip-like negative electrode 606 are wound with a strip-like separator 605 located therebetween is provided. Although not illustrated, the battery element is wound around a center pin. One end of the battery can 602 is close and the other end thereof is open. For the battery can 602, a metal having corrosion resistance to an electrolyte solution, such as nickel, aluminum, or titanium, an alloy of such a metal, and/or an alloy of such a metal and another metal (e.g., stainless steel) can be used. The battery can 602 is preferably covered with nickel, aluminum, and/or the like in order to prevent corrosion due to the electrolyte solution. Inside the battery can 602, the battery element in which the positive electrode, the negative electrode, and the separator are wound is provided between a pair of insulating plates 608 and 609 that face each other. The inside of the battery can 602 provided with the battery element is filled with a nonaqueous electrolyte solution (not illustrated). As the nonaqueous electrolyte solution, an electrolyte solution similar to that for the coin-type secondary battery can be used.

Since a positive electrode and a negative electrode that are used for a cylindrical storage battery are wound, active materials are preferably formed on both surfaces of a current collector.

The particle 190 obtained in Embodiment 1 is used in the positive electrode 604, whereby the cylindrical secondary battery 616 can have high charge and discharge capacity and excellent cycle performance.

A positive electrode terminal (positive electrode current collecting lead) 603 is connected to the positive electrode 604, and a negative electrode terminal (negative electrode current collecting lead) 607 is connected to the negative electrode 606. Both the positive electrode terminal 603 and the negative electrode terminal 607 can be formed using a metal material such as aluminum. The positive electrode terminal 603 and the negative electrode terminal 607 are resistance-welded to a safety valve mechanism 613 and the bottom of the battery can 602, respectively. The safety valve mechanism 613 is electrically connected to the positive electrode cap 601 through a PTC element (Positive Temperature Coefficient) 611. The safety valve mechanism 613 cuts off electrical connection between the positive electrode cap 601 and the positive electrode 604 when the internal pressure of the battery exceeds a predetermined threshold. The PTC element 611, which is a thermally sensitive resistor whose resistance increases as temperature rises, limits the amount of current by increasing the resistance, in order to prevent abnormal heat generation. Barium titanate (Ba-TiO₃)-based semiconductor ceramic or the like can be used for the PTC element.

FIG. 5C shows an example of a power storage system 615. The power storage system 615 includes a plurality of secondary batteries 616. The positive electrodes of the secondary batteries are in contact with and electrically connected to conductors 624 isolated by an insulator 625. The conductor 624 is electrically connected to a control circuit 620 through a wiring 623. The negative electrodes of the secondary batteries are electrically connected to the control circuit 620 through a wiring 626. As the control circuit 620, a charging and discharging control circuit for performing charging, discharging, and the like and/or a protection circuit for preventing overcharging or overdischarging can be used.

FIG. 5D shows an example of the power storage system 615. The power storage system 615 includes a plurality of secondary batteries 616, and the plurality of secondary batteries 616 are sandwiched between a conductive plate 628 and a conductive plate 614. The plurality of secondary batteries 616 are electrically connected to the conductive plate 628 and the conductive plate 614 through a wiring 627. The plurality of secondary batteries 616 may be connected in parallel, connected in series, or connected in series after being connected in parallel. With the power storage system 615 including the plurality of secondary batteries 616, large electric power can be extracted.

The plurality of secondary batteries 616 may be connected in series after being connected in parallel.

A temperature control device may be provided between the plurality of secondary batteries 616. The secondary batteries 616 can be cooled with the temperature control device when overheated, whereas the secondary batteries 616 can be heated with the temperature control device when cooled too much. Thus, the performance of the power storage system 615 is less likely to be influenced by the outside temperature.

In FIG. 5D, the power storage system 615 is electrically connected to the control circuit 620 through a wiring 621 and a wiring 622. The wiring 621 is electrically connected to the positive electrodes of the plurality of secondary batteries 616 through the conductive plate 628. The wiring 622 is electrically connected to the negative electrodes of the plurality of secondary batteries 616 through the conductive plate 614.

[Other Structure Examples of Secondary Battery]

Structure examples of secondary batteries are described with reference to FIG. 6A to FIG. 7C.

Figures 6A, 6B, 6C:
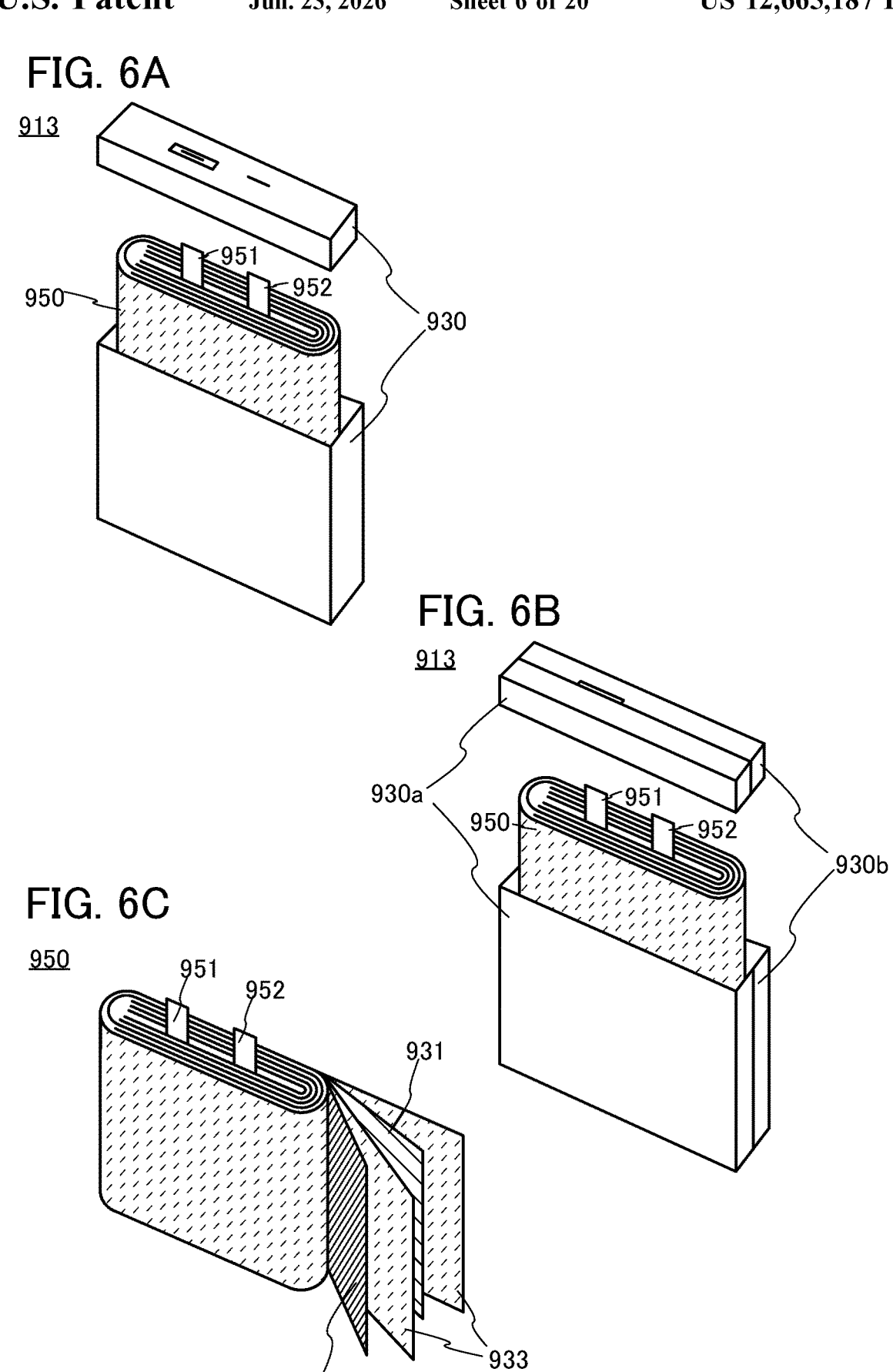
FIG. 6A and FIG. 6B show examples of a secondary battery.
FIG. 6C is a diagram illustrating the internal state of a secondary battery.

A secondary battery 913 illustrated in FIG. 6A includes a wound body 950 provided with a terminal 951 and a terminal 952 inside a housing 930. The wound body 950 is immersed in an electrolyte solution inside the housing 930. The terminal 952 is in contact with the housing 930. The use of an insulator or the like inhibits contact between the terminal 951 and the housing 930. Note that in FIG. 6A, the housing 930 divided into pieces is illustrated for convenience; however, in the actual structure, the wound body 950 is covered with the housing 930, and the terminal 951 and the terminal 952 extend to the outside of the housing 930. For the housing 930, a metal material (e.g., aluminum) or a resin material can be used.

Note that as illustrated in FIG. 6B, the housing 930 in FIG. 6A may be formed using a plurality of materials. For example, in the secondary battery 913 illustrated in FIG. 6B, a housing 930a and a housing 930b are attached to each other, and the wound body 950 is provided in a region surrounded by the housing 930a and the housing 930b.

For the housing 930a, an insulating material such as an organic resin can be used. In particular, when a material such as an organic resin is used for the side on which an antenna is formed, blocking of an electric field by the secondary battery 913 can be inhibited. When an electric field is not significantly blocked by the housing 930a, an antenna may be provided inside the housing 930a. For the housing 930b, a metal material can be used, for example.

FIG. 6C illustrates the structure of the wound body 950. The wound body 950 includes a negative electrode 931, a positive electrode 932, and separators 933. The wound body 950 is obtained by winding a sheet of a stack in which the negative electrode 931 and the positive electrode 932 overlap with the separator 933 therebetween. Note that a plurality of stacks each including the negative electrode 931, the positive electrode 932, and the separators 933 may be further stacked.

As illustrated in FIG. 7A to FIG. 7C, the secondary battery 913 may include a wound body 950a. The wound body 950a illustrated in FIG. 7A includes the negative electrode 931, the positive electrode 932, and the separators 933. The negative electrode 931 includes a negative electrode active material layer 931a. The positive electrode 932 includes a positive electrode active material layer 932a.

The particle 190 obtained in Embodiment 1 is used in the positive electrode 932, whereby the secondary battery 913 can have high charge and discharge capacity and excellent cycle performance.

The separator 933 has a larger width than the negative electrode active material layer 931a and the positive electrode active material layer 932a, and is wound to overlap the negative electrode active material layer 931a and the positive electrode active material layer 932a. In terms of safety, the width of the negative electrode active material layer 931a is preferably larger than that of the positive electrode active material layer 932a. The wound body 950a having such a shape is preferable because of its high degree of safety and high productivity.

As illustrated in FIG. 7B, the negative electrode 931 is electrically connected to the terminal 951. The terminal 951 is electrically connected to a terminal 911a. The positive electrode 932 is electrically connected to the terminal 952. The terminal 952 is electrically connected to a terminal 911b.

As illustrated in FIG. 7C, the wound body 950a and an electrolyte solution are covered with the housing 930, whereby the secondary battery 913 is completed. The housing 930 is preferably provided with a safety valve, an overcurrent protection element, and the like. A safety valve is a valve to be released by a predetermined internal pressure of the housing 930 in order to prevent the battery from exploding.

As illustrated in FIG. 7B, the secondary battery 913 may include a plurality of wound bodies 950a. The use of the plurality of wound bodies 950a enables the secondary battery 913 to have higher charge and discharge capacity. The description of the secondary battery 913 illustrated in FIG. 6A to FIG. 6C can be referred to for the other components of the secondary battery 913 illustrated in FIG. 7A and FIG. 7B.

<Laminated Secondary Battery>

Figure 8A:
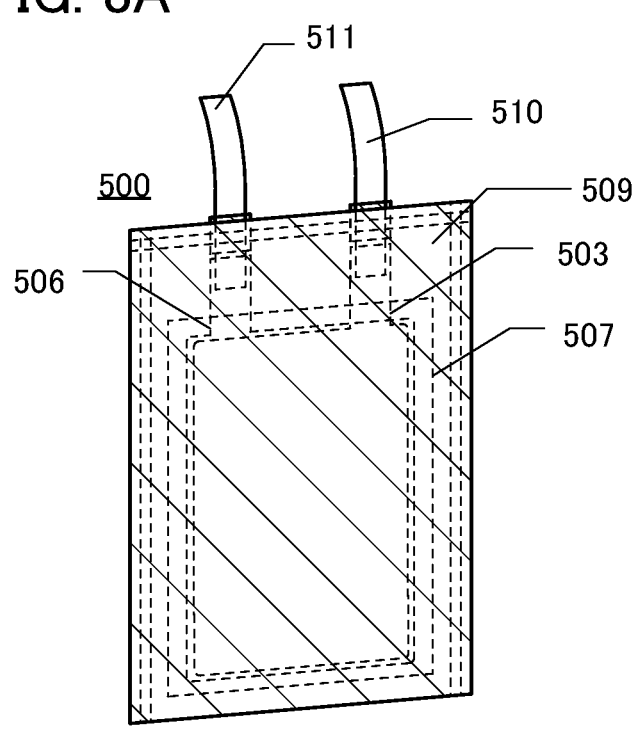
FIG. 8A and FIG. 8B are diagrams showing examples of an external appearance of a secondary battery.
Figure 8B:
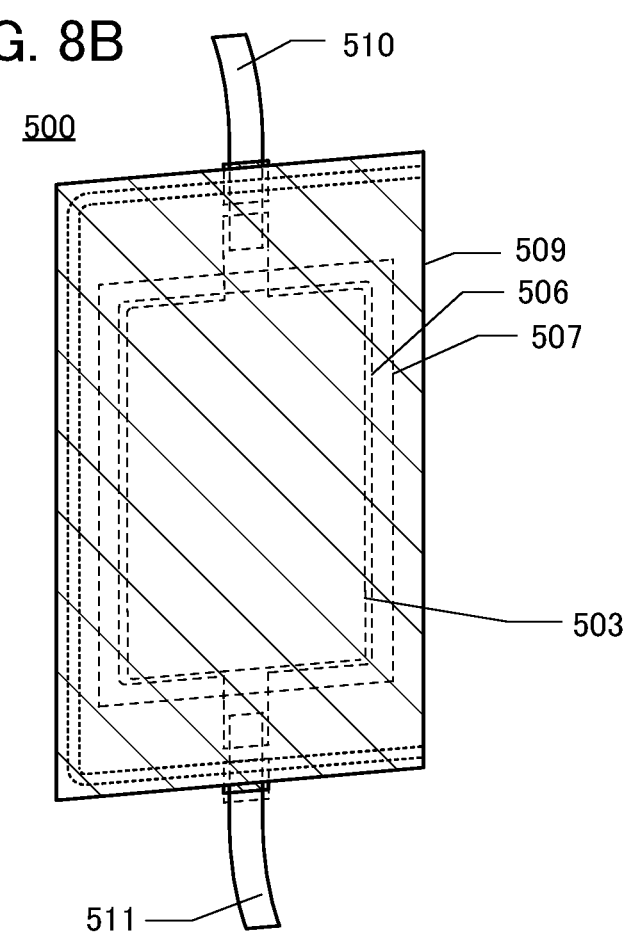

Next, examples of the appearance of a laminated secondary battery are shown in FIG. 8A and FIG. 8B. Secondary batteries 500 in FIG. 8A and FIG. 8B each include a positive electrode 503, a negative electrode 506, a separator 507, an exterior body 509, a positive electrode lead electrode 510, and a negative electrode lead electrode 511.

Figure 9A:
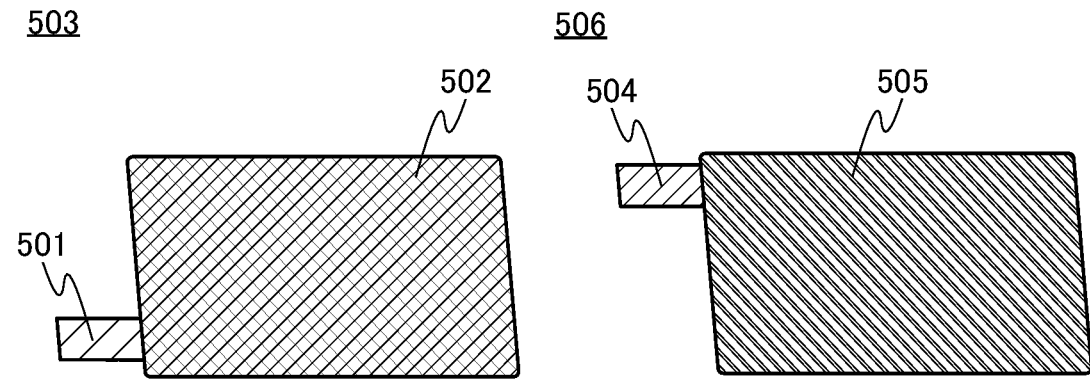
FIG. 9A to FIG. 9C are diagrams showing an example of a method for manufacturing a secondary battery.

FIG. 9A illustrates the appearance of the positive electrode 503 and the negative electrode 506. The positive electrode 503 includes a positive electrode current collector 501, and a positive electrode active material layer 502 is formed on a surface of the positive electrode current collector 501. The positive electrode 503 also includes a region where the positive electrode current collector 501 is partly exposed (hereinafter referred to as a tab region). The negative electrode 506 includes a negative electrode current collector 504, and a negative electrode active material layer 505 is formed on a surface of the negative electrode current collector 504. The negative electrode 506 also includes a region where the negative electrode current collector 504 is partly exposed, that is, a tab region. The areas and the shapes of the tab regions included in the positive electrode and the negative electrode are not limited to the examples shown in FIG. 9A.

<Method for Manufacturing Laminated Secondary Battery>

Figure 9B:
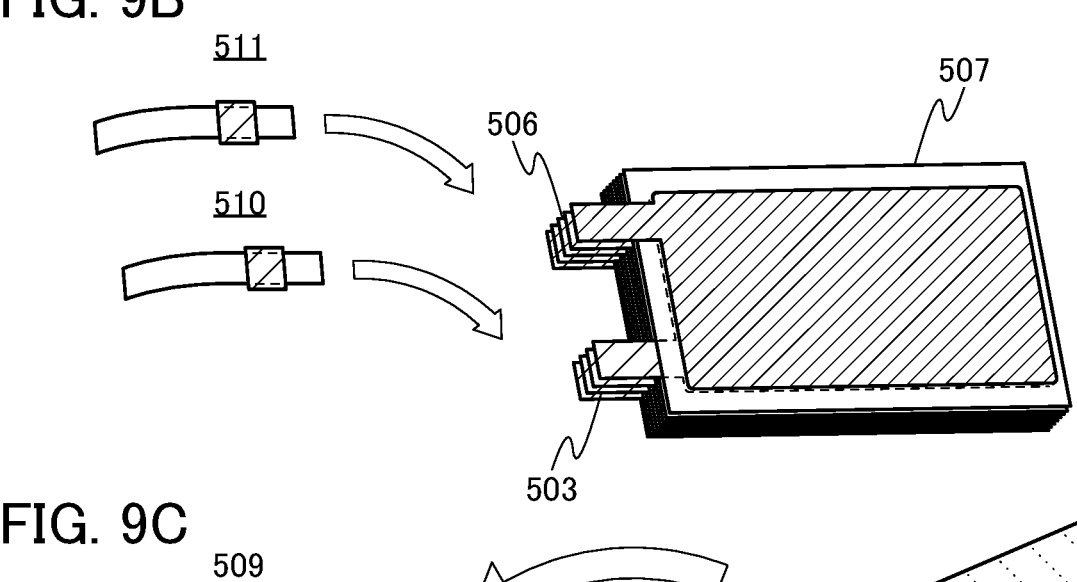

Here, an example of a method for manufacturing the laminated secondary battery whose external view is shown in FIG. 8A will be described with reference to FIG. 9B and FIG. 9C.

First, the negative electrode 506, the separator 507, and the positive electrode 503 are stacked. FIG. 9B illustrates the negative electrodes 506, the separators 507, and the positive electrodes 503 that are stacked. Here, an example in which five negative electrodes and four positive electrodes are used is shown. The component can also be referred to as a stack including the negative electrodes, the separators, and the positive electrodes. Next, the tab regions of the positive electrodes 503 are bonded to each other, and the positive electrode lead electrode 510 is bonded to the tab region of the positive electrode on the outermost surface. The bonding can be performed by ultrasonic welding, for example. In a similar manner, the tab regions of the negative electrodes 506 are bonded to each other, and the negative electrode lead electrode 511 is bonded to the tab region of the negative electrode on the outermost surface.

Then, the negative electrodes 506, the separators 507, and the positive electrodes 503 are placed over the exterior body 509.

Figure 9C:
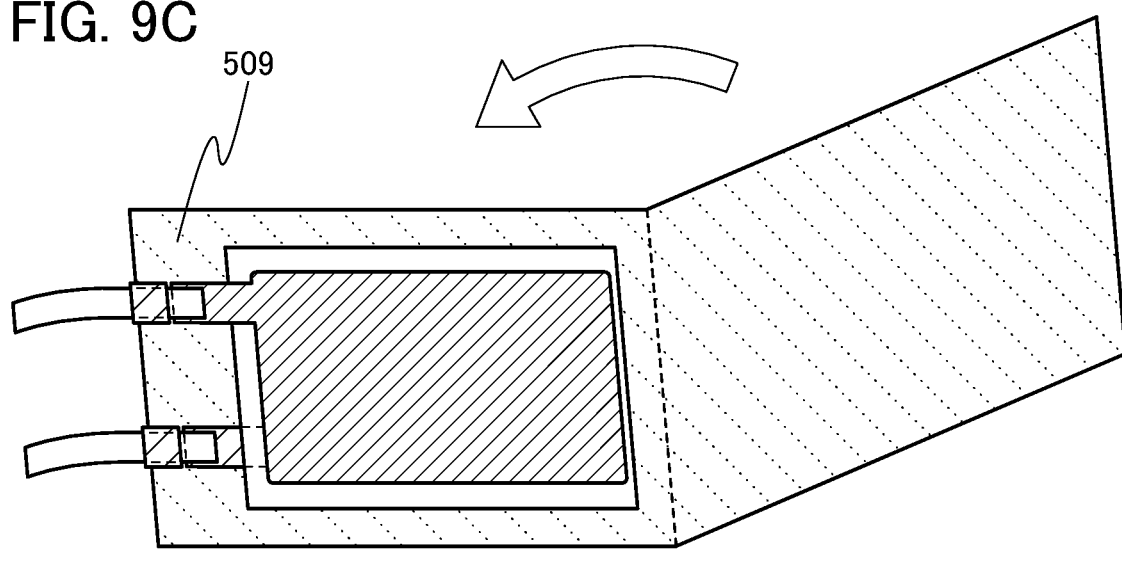

Subsequently, the exterior body 509 is folded along a portion shown by a dashed line, as illustrated in FIG. 9C. Then, the outer edges of the exterior body 509 are bonded to each other. The bonding can be performed by thermocompression, for example. At this time, an unbonded region (hereinafter referred to as an inlet) is provided for part (or one side) of the exterior body 509 so that an electrolyte solution 508 can be introduced later.

Next, the electrolyte solution 508 (not illustrated) is introduced into the exterior body 509 from the inlet of the exterior body 509. The electrolyte solution 508 is preferably introduced in a reduced pressure atmosphere or in an inert atmosphere. Lastly, the inlet is sealed by bonding. In this manner, the laminated secondary battery 500 can be manufactured.

The particle 190 obtained in Embodiment 1 is used in the positive electrodes 503, whereby the secondary battery 500 can have high charge and discharge capacity and excellent cycle performance.

[Examples of Battery Pack]

Examples of a secondary battery pack of one embodiment of the present invention that is capable of wireless charging using an antenna will be described with reference to FIG. 10A to FIG. 10C.

Figure 10A:
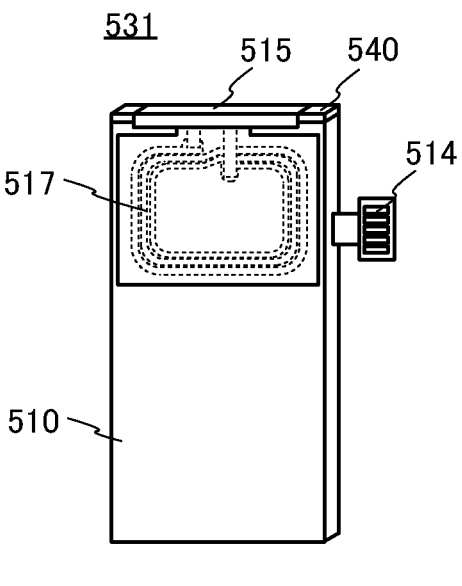
FIG. 10A shows a structure example of a battery pack.

FIG. 10A is a diagram showing the appearance of a secondary battery pack 531 that has a rectangular solid shape with a small thickness (also referred to as a flat plate shape with a certain thickness). FIG. 10B is a diagram illustrating the structure of the secondary battery pack 531. The secondary battery pack 531 includes a circuit board 540 and a secondary battery 513. A label 529 is attached to the secondary battery 513. The circuit board 540 is fixed by a sealant 515. The secondary battery pack 531 also includes an antenna 517.

A wound body or a stack may be included inside the secondary battery 513.

Figure 10B:
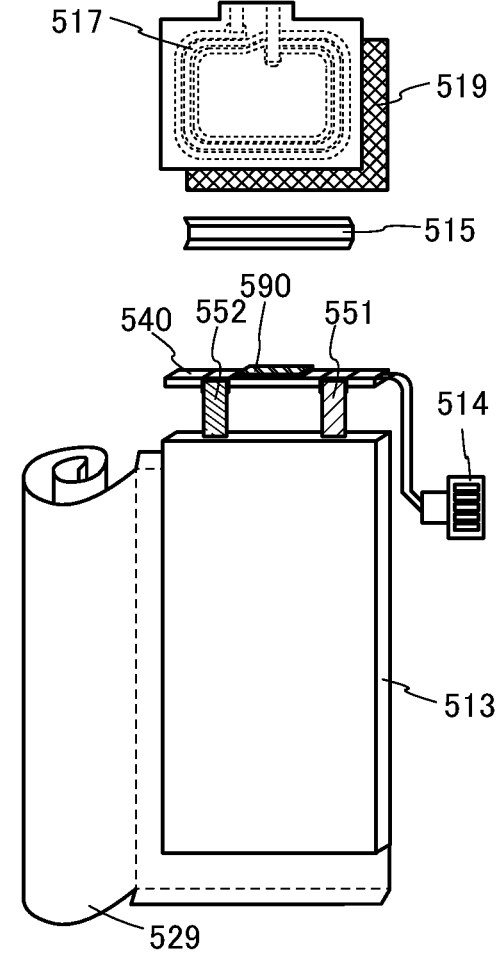
FIG. 10B shows a structure example of the battery pack.

In the secondary battery pack 531, a control circuit 590 is provided over the circuit board 540 as illustrated in FIG. 10B, for example. The circuit board 540 is electrically connected to a terminal 514. The circuit board 540 is electrically connected to the antenna 517, one 551 of a positive electrode lead and a negative electrode lead of the secondary battery 513, and the other 552 of the positive electrode lead and the negative electrode lead.

Figure 10C:
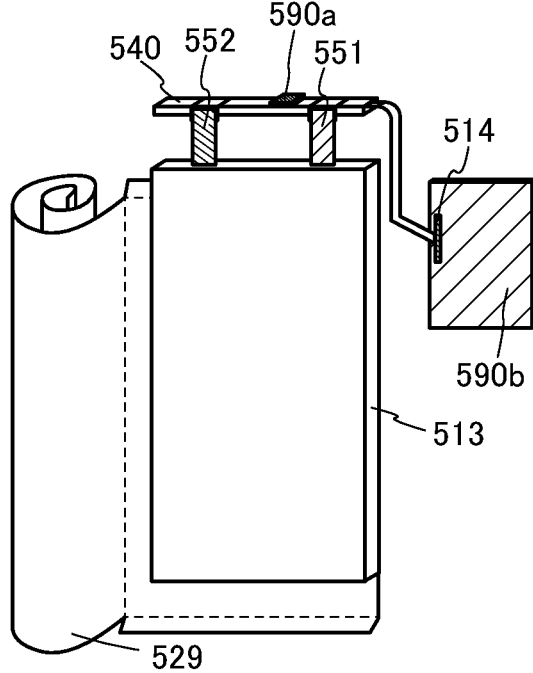
FIG. 10C shows a structure example of the battery pack.

Alternatively, as illustrated in FIG. 10C, a circuit system 590a provided over the circuit board 540 and a circuit system 590b electrically connected to the circuit board 540 through the terminal 514 may be included.

Note that the shape of the antenna 517 is not limited to a coil shape and may be a linear shape or a plate shape, for example. Furthermore, a planar antenna, an aperture antenna, a traveling-wave antenna, an EH antenna, a magnetic-field antenna, a dielectric antenna, or the like may be used. Alternatively, the antenna 517 may be a flat-plate conductor. The flat-plate conductor can serve as one of conductors for electric field coupling. That is, the antenna 517 can function as one of two conductors of a capacitor. Thus, electric power can be transmitted and received not only by an electromagnetic field or a magnetic field but also by an electric field.

The secondary battery pack 531 includes a layer 519 between the antenna 517 and the secondary battery 513. The layer 519 has a function of blocking an electromagnetic field from the secondary battery 513, for example. As the layer 519, a magnetic material can be used, for example.

This embodiment can be freely combined with any of the other embodiments.

Embodiment 4

This embodiment will describe an example in which an all-solid-state battery is manufactured using the particle 190 obtained in Embodiment 1.

Figures 11A, 11B:
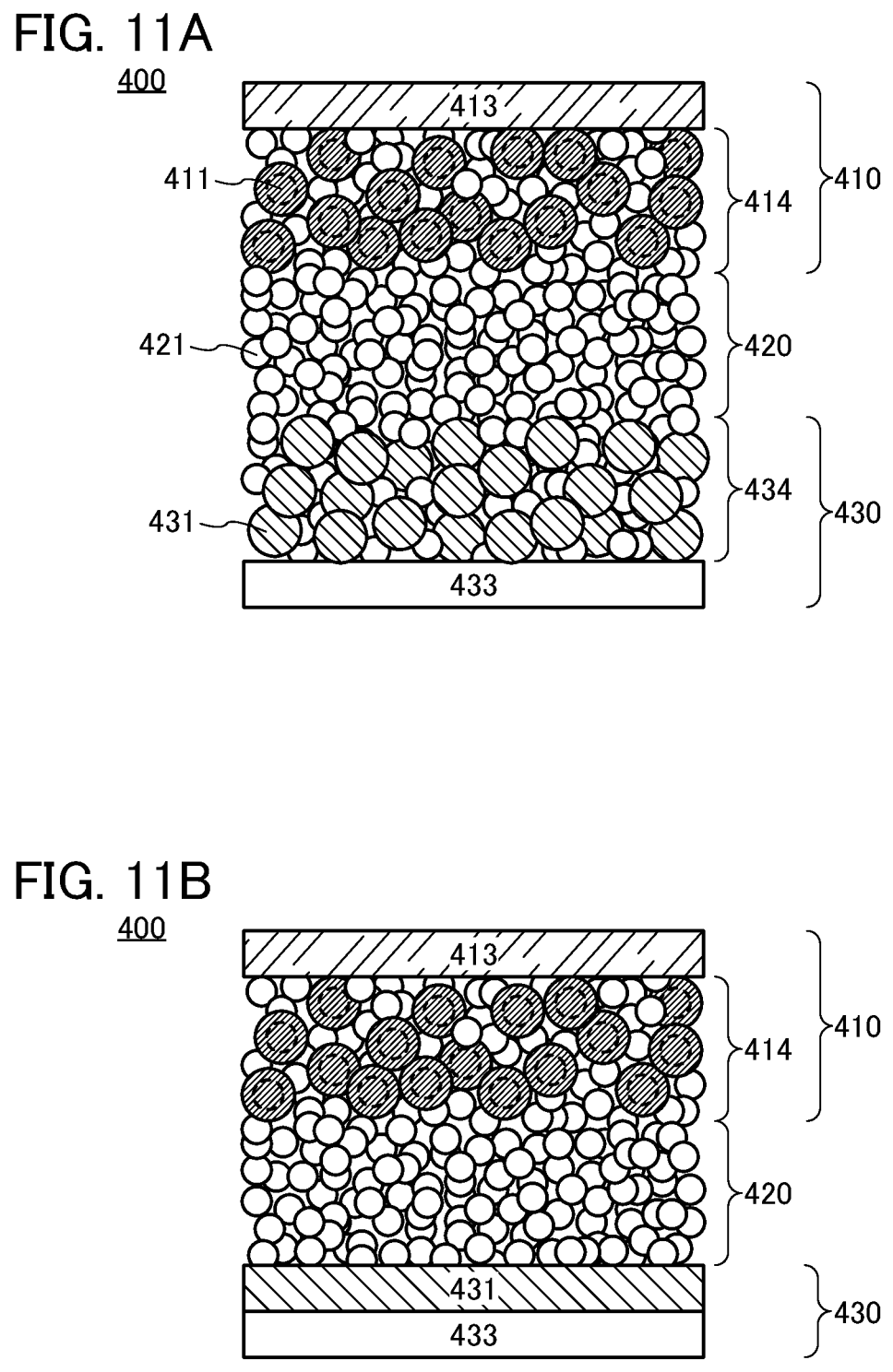

As illustrated in FIG. 11A, a secondary battery 400 of one embodiment of the present invention includes a positive electrode 410, a solid electrolyte layer 420, and a negative electrode 430.

The positive electrode 410 includes a positive electrode current collector 413 and a positive electrode active material layer 414. The positive electrode active material layer 414 includes a positive electrode active material 411 and a solid electrolyte 421. The particle 190 obtained in Embodiment 1 is used as the positive electrode active material 411, and the boundary between the core region and the shell region is indicated by a dotted line. The positive electrode active material layer 414 may also include a conductive material and a binder.

The solid electrolyte layer 420 includes the solid electrolyte 421. The solid electrolyte layer 420 is positioned between the positive electrode 410 and the negative electrode 430 and is a region that includes neither the positive electrode active material 411 nor a negative electrode active material 431.

The negative electrode 430 includes a negative electrode current collector 433 and a negative electrode active material layer 434. The negative electrode active material layer 434 includes the negative electrode active material 431 and the solid electrolyte 421. The negative electrode active material layer 434 may also include a conductive material and a binder. Note that when metal lithium is used for the negative electrode 430, the negative electrode 430 that does not include the solid electrolyte 421 can be formed, as illustrated in FIG. 11B. The use of metal lithium for the negative electrode 430 is preferable, in which case the energy density of the secondary battery 400 can be increased.

As the solid electrolyte 421 included in the solid electrolyte layer 420, a sulfide-based solid electrolyte, an oxide-based solid electrolyte, or a halide-based solid electrolyte can be used, for example.

Examples of the sulfide-based solid electrolyte include a thio-silicon-based material (e.g., $Li_{10}GeP_2S_{12}$ and $Li_{3.25}Ge_{0.25}P_{0.75}S_4$), sulfide glass (e.g., $70Li_2S·30P_2S_5$, $30Li_2S·26B_2S_3·44LiI$, $63Li_2S·38SiS_2·1Li_3PO_4$, $57Li_2S·38SiS_2·5Li_4SiO_4$, and $50Li_2S·50GeS_2$), and sulfide-based crystallized glass (e.g., $Li_7P_3S_{11}$ and $Li_{3.25}P_{0.95}S_4$). The sulfide-based solid electrolyte has advantages such as high conductivity of some materials, low-temperature synthesis, and ease of maintaining a path for electrical conduction after charging and discharging because of its relative softness.

Examples of the oxide-based solid electrolyte include a material with a perovskite crystal structure (e.g., $La_{2/3-x}Li_{3x}TiO_3$), a material with a NASICON crystal structure (e.g., $Li_{1-Y}Al_YTi_{2-Y}(PO_4)_3$), a material with a garnet crystal structure (e.g., $Li_7La_3Zr_2O_{12}$), a material with a LISICON crystal structure (e.g., $Li_{14}ZnGe_4O_{16}$), LLZO ($Li_7La_3Zr_2O_{12}$), oxide glass (e.g., $Li_3PO_4$—$Li_4SiO_4$ and $50Li_4SiO_4·50Li_3BO_3$), and oxide-based crystallized glass (e.g., $Li_{1.07}Al_{0.69}Ti_{1.46}(PO_4)_3$ and $Li_{1.5}Al_{0.5}Ge_{1.5}(PO_4)_3$). The oxide-based solid electrolyte has an advantage of stability in the air.

Examples of the halide-based solid electrolyte include $LiAlCl_4$, $Li_3InBr_6$, LiF, LiCl, LiBr, and LiI. Moreover, a composite material in which pores of porous aluminum oxide or porous silica are filled with such a halide-based solid electrolyte can be used as the solid electrolyte.

Alternatively, different solid electrolytes may be mixed and used.

In particular, $Li_{1+x}Al_xTi_{2-x}(PO_4)_3$ ($0<x<1$) having a NASICON crystal structure (hereinafter LATP) is preferable because LATP contains aluminum and titanium, each of which is the element the positive electrode active material used in the secondary battery 400 of one embodiment of the present invention is allowed to contain, and thus a synergistic effect of improving the cycle performance is expected. Moreover, higher productivity due to the reduction in the number of steps is expected. Note that in this specification and the like, a material having a NASICON crystal structure refers to a compound that is represented by $M_2(XO_4)_3$ (M: transition metal; X: S, P, As, Mo, W, or the like) and has a structure in which $MO_6$ octahedra and $XO_4$ tetrahedra that share common corners are arranged three-dimensionally.

[Exterior Body and Shape of Secondary Battery]

An exterior body of the secondary battery 400 of one embodiment of the present invention can employ a variety of materials and have a variety of shapes, and preferably has a function of applying pressure to the positive electrode, the solid electrolyte layer, and the negative electrode.

Figure 12A:
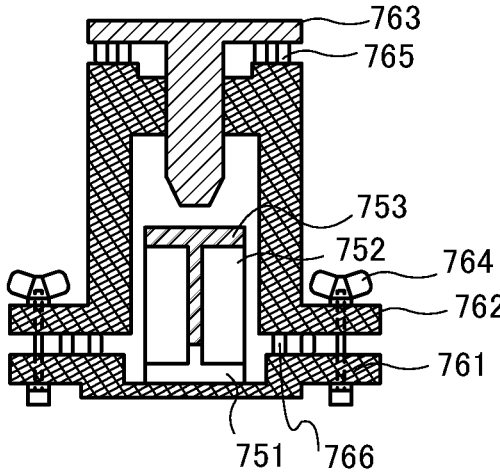
FIG. 12A to FIG. 12C are diagrams showing examples of a secondary battery.
Figure 12B:
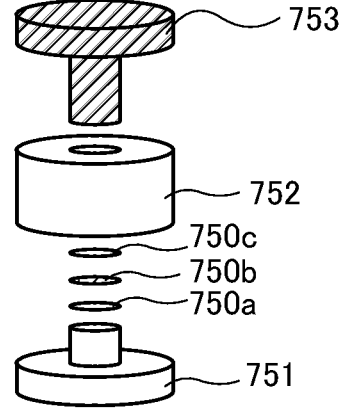
Figure 12C:
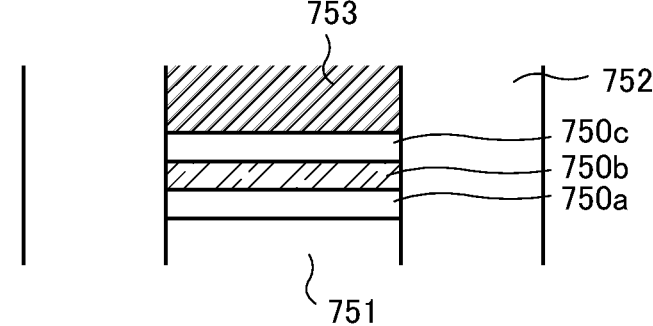

FIG. 12A to FIG. 12C show an example of a cell for evaluating materials of an all-solid-state battery.

FIG. 12A is a schematic cross-sectional view of the evaluation cell. The evaluation cell includes a lower component 761, an upper component 762, and a fixation screw or a butterfly nut 764 for fixing these components. By rotating a pressure screw 763, an electrode plate 753 is pressed to fix an evaluation material. An insulator 766 is provided between the lower component 761 and the upper component 762 that are made of a stainless steel material. An 0 ring 765 for hermetic sealing is provided between the upper component 762 and the pressure screw 763.

The evaluation material is placed on an electrode plate 751, surrounded by an insulating tube 752, and pressed from above by the electrode plate 753. FIG. 12B is an enlarged perspective view of the evaluation material and its vicinity.

A stack of a positive electrode 750a, a solid electrolyte layer 750b, and a negative electrode 750c is shown here as an example of the evaluation material, and its cross section is shown in FIG. 12C. Note that the same portions in FIG. 12A to FIG. 12C are denoted by the same reference numerals.

The electrode plate 751 and the lower component 761 that are electrically connected to the positive electrode 750a correspond to a positive electrode terminal. The electrode plate 753 and the upper component 762 that are electrically connected to the negative electrode 750c correspond to a negative electrode terminal. The electric resistance or the like can be measured while pressure is applied to the evaluation material through the electrode plate 751 and the electrode plate 753.

The exterior body of the secondary battery of one embodiment of the present invention is preferably a package having excellent airtightness. For example, a ceramic package and/or a resin package can be used. The exterior body is sealed preferably in a closed atmosphere where the outside air is blocked, for example, in a glove box.

Figure 13A:
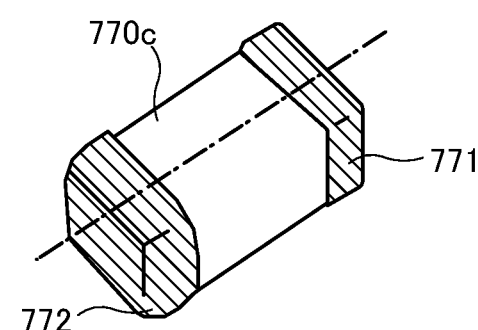
FIG. 13A and FIG. 13B are diagrams showing examples of a secondary battery.

FIG. 13A is a perspective view of a secondary battery of one embodiment of the present invention that has an exterior body and a shape different from those in FIG. 12A. The secondary battery in FIG. 13A includes an external electrode 771 and an external electrode 772 and is sealed with an exterior body including a plurality of package components.

Figure 13B:
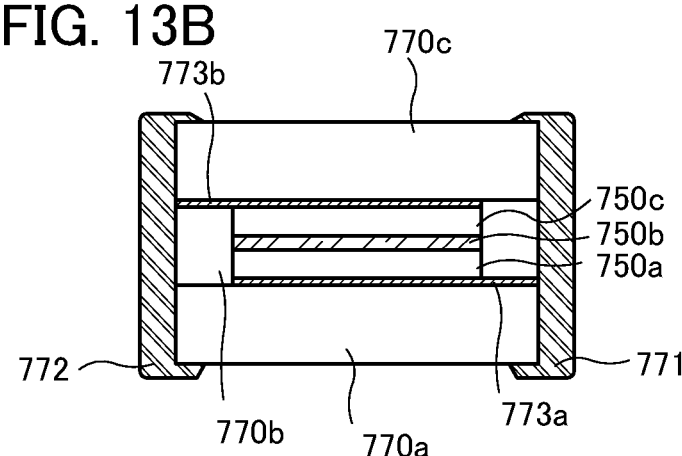

FIG. 13B shows an example of a cross section along the dashed-dotted line in FIG. 13A. A stack including the positive electrode 750a, the solid electrolyte layer 750b, and the negative electrode 750c is surrounded and sealed by a package component 770a including an electrode layer 773a on a flat plate, a frame-like package component 770b, and a package component 770c including an electrode layer 773b on a flat plate. For the package components 770a, 770b, and 770c, an insulating material such as a resin material and/or ceramic can be used.

The external electrode 771 is electrically connected to the positive electrode 750a through the electrode layer 773a and functions as a positive electrode terminal. The external electrode 772 is electrically connected to the negative electrode 750c through the electrode layer 773b and functions as a negative electrode terminal.

The use of the particle 190 obtained in Embodiment 1 achieves an all-solid-state secondary battery having high energy density and favorable output characteristics.

This embodiment can be implemented in appropriate combination with any of the other embodiments.

Embodiment 5

In this embodiment, an example of application to an electric vehicle (EV) will be described with reference to FIG. 14C which is an example different from the cylindrical secondary battery in FIG. 5D.

The electric vehicle is provided with a first battery 1301a and a first battery 1301b as main secondary batteries for driving and a second battery 1311 that supplies electric power to an inverter 1312 for starting a motor 1304. The second battery 1311 is also referred to as a cranking battery (also referred to as a starter battery). The second battery 1311 needs high output and high capacity is not so necessary, and the capacity of the second battery 1311 is lower than that of the first battery 1301a and the first battery 1301b.

The internal structure of the first battery 1301a may be the wound structure illustrated in FIG. 6A or FIG. 7C or the stacked structure illustrated in FIG. 8A or FIG. 8B. Alternatively, the first battery 1301a may be the all-solid-state battery in Embodiment 4. Using the all-solid-state battery in Embodiment 4 as the first battery 1301a achieves high capacity, a high degree of safety, reduction in size, and reduction in weight.

Although this embodiment describes an example in which two first batteries 1301a and 1301b are connected in parallel, three or more first batteries may be connected in parallel. When the first battery 1301a is capable of storing sufficient electric power, the first battery 1301b may be omitted. With a battery pack including a plurality of secondary batteries, large electric power can be extracted. The plurality of secondary batteries may be connected in parallel, connected in series, or connected in series after being connected in parallel. The plurality of secondary batteries can also be referred to as an assembled battery.

An in-vehicle secondary battery includes a service plug or a circuit breaker that can cut off high voltage without the use of equipment in order to cut off electric power from a plurality of secondary batteries. The first battery 1301a is provided with such a service plug or a circuit breaker.

Electric power from the first battery 1301a and the first battery 1301b is mainly used to rotate the motor 1304 and is also supplied to in-vehicle parts for 42 V (such as an electric power steering 1307, a heater 1308, and a defogger 1309) through a DC-DC circuit 1306. In the case where there is a rear motor 1317 for the rear wheels, the first battery 1301a is used to rotate the rear motor 1317.

The second battery 1311 supplies electric power to in-vehicle parts for 14 V (such as an audio 1313, power windows 1314, and lamps 1315) through a DC-DC circuit 1310.

The first battery 1301a will be described with reference to FIG. 14A.

Figures 14A, 14B, 14C:
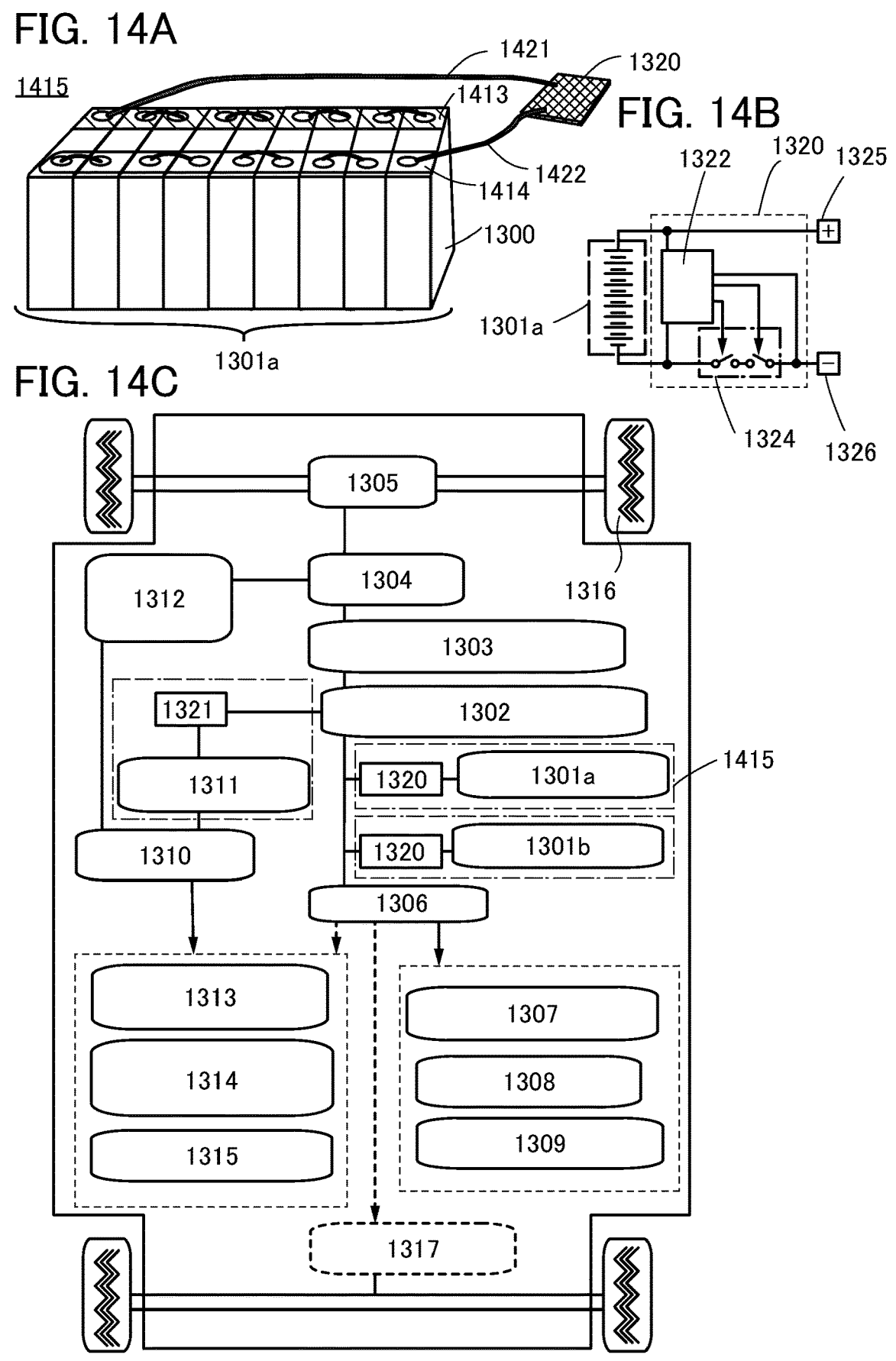
FIG. 14A is a perspective view of a battery pack.
FIG. 14B is an example of a block diagram of the battery pack.
FIG. 14C is an example of a block diagram of a vehicle including a motor.

FIG. 14A shows an example in which nine rectangular secondary batteries 1300 form one battery pack 1415. The nine rectangular secondary batteries 1300 are connected in series; one electrode of each battery is fixed by a fixing portion 1413 made of an insulator, and the other electrode of each battery is fixed by a fixing portion 1414 made of an insulator. Although this embodiment shows the example in which the secondary batteries are fixed by the fixing portion 1413 and the fixing portion 1414, they may be stored in a battery container box (also referred to as a housing). Since a vibration or a jolt is assumed to be given to the vehicle from the outside (e.g., a road surface), the plurality of secondary batteries are preferably fixed by the fixing portion 1413 and the fixing portion 1414 and a battery container box, for example. Furthermore, the one electrode of each battery is electrically connected to a control circuit portion 1320 through a wiring 1421. The other electrode of each battery is electrically connected to the control circuit portion 1320 through a wiring 1422.

The control circuit portion 1320 may include a memory circuit including a transistor using an oxide semiconductor. A charge control circuit or a battery control system that includes a memory circuit including a transistor using an oxide semiconductor may be referred to as a BTOS (Battery operating system or Battery oxide semiconductor).

A metal oxide functioning as an oxide semiconductor is preferably used. For example, as the oxide, a metal oxide such as an In-M-Zn oxide (the element M is one or more selected from aluminum, gallium, yttrium, copper, vanadium, beryllium, boron, titanium, iron, nickel, germanium, zirconium, molybdenum, lanthanum, cerium, neodymium, hafnium, tantalum, tungsten, magnesium, and the like) is preferably used. In particular, the In-M-Zn oxide that can be used as the metal oxide is preferably a CAAC-OS (C-Axis Aligned Crystal Oxide Semiconductor) or a CAC-OS (Cloud-Aligned Composite Oxide Semiconductor). Alternatively, an In—Ga oxide or an In—Zn oxide may be used as the oxide. The CAAC-OS is an oxide semiconductor that has a plurality of crystal regions each of which has c-axis alignment in a particular direction. Note that the particular direction refers to the thickness direction of a CAAC-OS film, the normal direction of the surface where the CAAC-OS film is formed, or the normal direction of the surface of the CAAC-OS film. The crystal region refers to a region having a periodic atomic arrangement. When an atomic arrangement is regarded as a lattice arrangement, the crystal region also refers to a region with a uniform lattice arrangement. The CAAC-OS has a region where a plurality of crystal regions are connected in the a-b plane direction, and the region has distortion in some cases. Note that distortion refers to a portion where the direction of a lattice arrangement changes between a region with a uniform lattice arrangement and another region with a uniform lattice arrangement in a region where a plurality of crystal regions are connected. That is, the CAAC-OS is an oxide semiconductor having c-axis alignment and having no clear alignment in the a-b plane direction. In addition, the CAC-OS refers to one composition of a material in which elements constituting a metal oxide are unevenly distributed with a size greater than or equal to 0.5 nm and less than or equal to 10 nm, preferably greater than or equal to 1 nm and less than or equal to 3 nm, or a similar size, for example. Note that a state in which one or more metal elements are unevenly distributed and regions including the metal element(s) are mixed with a size greater than or equal to 0.5 nm and less than or equal to 10 nm, preferably greater than or equal to 1 nm and less than or equal to 3 nm, or a similar size in a metal oxide is hereinafter referred to as a mosaic pattern or a patch-like pattern.

In addition, the CAC-OS has a composition in which materials are separated into a first region and a second region to form a mosaic pattern, and the first regions are distributed in the film (this composition is hereinafter also referred to as a cloud-like composition). That is, the CAC-OS is a composite metal oxide having a composition in which the first regions and the second regions are mixed.

Here, the atomic ratios of In, Ga, and Zn to the metal elements contained in the CAC-OS in an In—Ga—Zn oxide are denoted by [In], [Ga], and [Zn], respectively. For example, the first region in the CAC-OS in the In—Ga—Zn oxide has [In] higher than [In] in the composition of the CAC-OS film. Moreover, the second region has [Ga] higher than [Ga] in the composition of the CAC-OS film. Alternatively, for example, the first region has [In] higher than [In] in the second region and [Ga] lower than [Ga] in the second region. Moreover, the second region has [Ga] higher than [Ga] in the first region and [In] lower than [In] in the first region.

Specifically, the first region is a region including indium oxide, indium zinc oxide, or the like as its main component. The second region is a region including gallium oxide, gallium zinc oxide, or the like as its main component. That is, the first region can be referred to as a region containing In as its main component. The second region can be referred to as a region containing Ga as its main component.

Note that a clear boundary between the first region and the second region cannot be observed in some cases.

For example, in EDX mapping obtained by energy dispersive X-ray spectroscopy (EDX), it is confirmed that the CAC-OS in the In—Ga—Zn oxide has a structure in which the region containing In as its main component (the first region) and the region containing Ga as its main component (the second region) are unevenly distributed and mixed.

In the case where the CAC-OS is used for a transistor, a switching function (on/off switching function) can be given to the CAC-OS owing to the complementary action of the conductivity derived from the first region and the insulating property derived from the second region. That is, the CAC-OS has a conducting function in part of the material and has an insulating function in another part of the material; as a whole, the CAC-OS has a function of a semiconductor. Separation of the conducting function and the insulating function can maximize each function. Thus, when the CAC-OS is used for a transistor, high on-state current (Ion), high field-effect mobility ($\mu$), and favorable switching operation can be achieved.

An oxide semiconductor has various structures with different properties. Two or more kinds among the amorphous oxide semiconductor, the polycrystalline oxide semiconductor, the a-like OS, the CAC-OS, the nc-OS, and the CAAC-OS may be included in an oxide semiconductor of one embodiment of the present invention.

The control circuit portion 1320 preferably uses a transistor using an oxide semiconductor because the transistor using an oxide semiconductor can be used in a high-temperature environment. For the process simplicity, the control circuit portion 1320 may be formed using transistors of the same conductivity type. A transistor using an oxide semiconductor in its semiconductor layer has an operating ambient temperature range of −40° C. to 150° C., which is wider than that of a single crystal Si transistor, and thus shows a smaller change in characteristics than the single crystal Si transistor when the secondary battery is heated. The off-state current of the transistor using an oxide semiconductor is lower than or equal to the lower measurement limit even at 150° C. regardless of the temperature. On the other hand, the off-state current characteristics of the single crystal Si transistor largely depend on the temperature. For example, at 150° C., the off-state current of the single crystal Si transistor increases, and a sufficiently high current on/off ratio cannot be obtained. The control circuit portion 1320 can improve the degree of safety. When the control circuit portion 1320 is used in combination with a secondary battery including a positive electrode using the particle 190 obtained in Embodiment 1, the synergy on safety can be obtained. The secondary battery including the positive electrode using the particle 190 obtained in Embodiment 1 and the control circuit portion 1320 can contribute greatly to elimination of accidents due to secondary batteries, such as fires.

The control circuit portion 1320 that uses a memory circuit including a transistor using an oxide semiconductor can also function as an automatic control device for the secondary battery to resolve ten items of causes of instability, such as a micro-short circuit. Examples of functions of resolving the ten items of causes of instability include prevention of overcharging, prevention of overcurrent, control of overheating during charging, maintenance of cell balance of an assembled battery, prevention of overdischarging, a battery indicator, automatic control of charge voltage and current amount according to temperature, control of the amount of charge current according to the degree of deterioration, abnormal behavior detection for a micro-short circuit, and anomaly prediction regarding a micro-short circuit. The control circuit portion 1320 has at least one of these functions. Furthermore, the automatic control device for the secondary battery can be extremely small in size.

A micro-short circuit refers to a minute short circuit caused in a secondary battery. A micro-short circuit refers to not a state where the positive electrode and the negative electrode of a secondary battery are short-circuited so that charging and discharging are impossible, but a phenomenon in which a slight short-circuit current flows through a minute short-circuit portion. Since a large voltage change is caused even when a micro-short circuit occurs in a relatively short time in a minute area, the abnormal voltage value might adversely affect estimation to be performed subsequently.

A cause of a micro-short circuit is a plurality of charging and discharging; an uneven distribution of positive electrode active materials leads to local concentration of current in part of the positive electrode and the negative electrode; and then part of a separator stops functioning or a by-product is generated by a side reaction, which is thought to generate a micro short-circuit.

It can be said that the control circuit portion 1320 not only detects a micro-short circuit but also senses a terminal voltage of the secondary battery and controls the charge and discharge state of the secondary battery. For example, to prevent overcharging, the control circuit portion 1320 can turn off an output transistor of a charging circuit and an interruption switch substantially at the same time.

FIG. 14B is an example of a block diagram of the battery pack 1415 illustrated in FIG. 14A.

The control circuit portion 1320 includes a switch portion 1324 that includes at least a switch for preventing overcharging and a switch for preventing overdischarging, a control circuit 1322 for controlling the switch portion 1324, and a portion for measuring the voltage of the first battery 1301a. The control circuit portion 1320 is set to have the upper limit voltage and the lower limit voltage of the secondary battery used, and controls the upper limit of current from the outside, the upper limit of output current to the outside, or the like. The range from the lower limit voltage to the upper limit voltage of the secondary battery is a recommended voltage range, and when a voltage is out of the range, the switch portion 1324 operates and functions as a protection circuit. The control circuit portion 1320 can also be referred to as a protection circuit because it controls the switch portion 1324 to prevent overdischarging and overcharging. For example, when the control circuit 1322 detects a voltage that is likely to cause overcharging, current is interrupted by turning off the switch in the switch portion 1324. Furthermore, a function of interrupting current in accordance with a temperature rise may be set by providing a PTC element in the charge and discharge path. The control circuit portion 1320 includes an external terminal 1325 (+IN) and an external terminal 1326 (−IN).

The switch portion 1324 can be formed by a combination of an n-channel transistor and/or a p-channel transistor. The switch portion 1324 is not limited to including a switch having a Si transistor using single crystal silicon; the switch portion 1324 may be formed using a power transistor containing Ge (germanium), SiGe (silicon germanium), GaAs (gallium arsenide), GaAlAs (gallium aluminum arsenide), InP (indium phosphide), SiC (silicon carbide), ZnSe (zinc selenide), GaN (gallium nitride), GaO$_x$ (gallium oxide; x is a real number greater than 0), or the like. A memory element using an OS transistor can be freely placed by being stacked over a circuit using a Si transistor, for example; hence, integration can be easy. Furthermore, an OS transistor can be manufactured with a manufacturing apparatus similar to that for a Si transistor and thus can be manufactured at low cost. That is, the control circuit portion 1320 using OS transistors can be stacked over the switch portion 1324 so that they can be integrated into one chip. Since the area occupied by the control circuit portion 1320 can be reduced, a reduction in size is possible.

FIG. 14C is a block diagram of a vehicle including a motor. The first battery 1301a and the first battery 1301b mainly supply electric power to in-vehicle parts for 42 V (for a high-voltage system), and the second battery 1311 supplies electric power to in-vehicle parts for 14 V (for a low-voltage system). Lead batteries are usually used for the second battery 1311 due to cost advantage. Lead batteries have disadvantages compared with lithium-ion secondary batteries in that they have a larger amount of self-discharge and are more likely to degrade due to a phenomenon called sulfation. There is an advantage that the second battery 1311 can be maintenance-free when it uses a lithium-ion secondary battery; however, in the case of long-term use, for example three years or more, anomaly that cannot be determined at the time of manufacturing might occur. In particular, when the second battery 1311 that starts the inverter becomes inoperative, the motor cannot be started even when the first battery 1301a and the first battery 1301b have remaining capacity; thus, in order to prevent this, in the case where the second battery 1311 is a lead storage battery, the second battery is supplied with electric power from the first battery to constantly maintain a fully-charged state.

In this embodiment, an example in which a lithium-ion secondary battery is used as each of the first battery 1301a and the second battery 1311 is described. As the second battery 1311, a lead storage battery, an all-solid-state battery, or an electric double layer capacitor may alternatively be used. For example, the all-solid-state battery in Embodiment 4 may be used. Using the all-solid-state battery in Embodiment 4 as the second battery 1311 achieves high capacity, a high degree of safety, reduction in size, and reduction in weight.

Regenerative energy generated by rolling of tires 1316 is transmitted to the motor 1304 through a gear 1305, and is stored in the second battery 1311 from a motor controller 1303 and a battery controller 1302 through a control circuit portion 1321. Alternatively, the regenerative energy is stored in the first battery 1301*a* from the battery controller 1302 through the control circuit portion 1320. Alternatively, the regenerative energy is stored in the first battery 1301*b* from the battery controller 1302 through the control circuit portion 1320. For efficient charging with regenerative energy, the first batteries 1301*a* and 1301*b* are preferably capable of fast charging.

The battery controller 1302 can set the charge voltage, charge current, and the like of the first battery 1301*a* and the first battery 1301*b*. The battery controller 1302 can set charge conditions in accordance with charge characteristics of a secondary battery used, so that fast charging can be performed.

Although not illustrated, when the electric vehicle is connected to an external charger, a plug of the charger or a connection cable of the charger is electrically connected to the battery controller 1302. Electric power supplied from the external charger is stored in the first battery 1301*a* and the first battery 1301*b* through the battery controller 1302. Some chargers are provided with a control circuit, in which case the function of the battery controller 1302 is not used; to prevent overcharging, the first battery 1301*a* and the first battery 1301*b* are preferably charged through the control circuit portion 1320. In addition, a connection cable or a connection cable of the charger is sometimes provided with a control circuit. The control circuit portion 1320 is also referred to as an ECU (Electronic Control Unit). The ECU is connected to a CAN (Controller Area Network) provided in the electric vehicle. The CAN is a type of a serial communication standard used as an in-vehicle LAN. The ECU includes a microcomputer. Moreover, the ECU uses a CPU and/or a GPU.

External chargers installed at charging stations and the like have a 100 V outlet, a 200 V outlet, or a three-phase 200V outlet with 50 kW, for example. Furthermore, charging can be performed with electric power supplied from external charging equipment by a contactless power feeding system or the like.

For fast charging, secondary batteries that can withstand high-voltage charging have been desired to perform charging in a short time.

The above-described secondary battery in this embodiment includes a high-density positive electrode with use of the particle 190 obtained in Embodiment 1. Moreover, graphene is used as a conductive material, and the electrode layer is formed thick, so that a reduction in capacity can be suppressed while increasing the loading amount. Furthermore, it is possible to achieve a secondary battery in which the electrical characteristics are significantly improved in synergy with maintenance of high capacity. This secondary battery is particularly effectively used in a vehicle and can achieve a vehicle that has a long range, specifically a driving range per charge of 500 km or longer, without increasing the proportion of the weight of the secondary battery to the weight of the entire vehicle.

Specifically, in the above-described secondary battery in this embodiment, the use of the particle 190 described in Embodiment 1 can increase the operating voltage of the secondary battery, and the increase in charging voltage can increase the available capacity. Moreover, using the particle 190 described in Embodiment 1 in the positive electrode can provide an automotive secondary battery having excellent cycle performance.

Next, examples in which the secondary battery of one embodiment of the present invention is mounted on a vehicle, typically a transport vehicle, will be described.

Mounting the secondary battery illustrated in any of FIG. 5D, FIG. 7C, and FIG. 14A on vehicles can achieve next-generation clean energy vehicles such as hybrid vehicles (HVs), electric vehicles (EVs), and plug-in hybrid vehicles (PHVs). The secondary battery can also be mounted on transport vehicles such as agricultural machines, motorized bicycles including motor-assisted bicycles, motorcycles, electric wheelchairs, electric carts, boats and ships, submarines, aircraft such as fixed-wing aircraft and rotary-wing aircraft, rockets, artificial satellites, space probes, planetary probes, and spacecraft. The secondary battery of one embodiment of the present invention can be a secondary battery with high capacity. Thus, the secondary battery of one embodiment of the present invention is suitable for reduction in size and reduction in weight and is preferably used in transport vehicles.

Figure 15A:
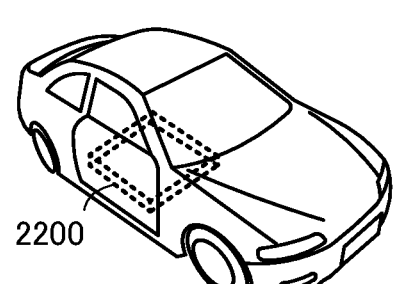
FIG. 15A to FIG. 15D are diagrams showing examples of transport vehicles.

FIG. 15A to FIG. 15D show examples of transport vehicles using one embodiment of the present invention. An automobile 2001 illustrated in FIG. 15A is an electric vehicle that runs on an electric motor as a power source. Alternatively, the automobile 2001 is a hybrid electric vehicle that can appropriately select an electric motor or an engine as a driving power source. In the case where the secondary battery is mounted on the vehicle, an example of the secondary battery described in Embodiment 3 is provided at one position or several positions. The automobile 2001 illustrated in FIG. 15A includes a battery pack 2200, and the battery pack includes a secondary battery module in which a plurality of secondary batteries are connected to each other. Moreover, the battery pack preferably includes a charge control device that is electrically connected to the secondary battery module.

The automobile 2001 can be charged when the secondary battery of the automobile 2001 receives electric power from an external charging equipment through a plug-in system, a contactless charging system, and/or the like. In charging, a given method such as CHAdeMO (registered trademark) or Combined Charging System may be employed as a charging method, the standard of a connector, and the like as appropriate. The secondary battery may be a charging station provided in a commerce facility or a household power supply. For example, a plug-in technique enables an exterior power supply to charge a power storage device incorporated in the automobile 2001. Charging can be performed by converting AC power into DC power through a converter such as an ACDC converter.

Although not illustrated, the vehicle can include a power receiving device so as to be charged by being supplied with electric power from an above-ground power transmitting device in a contactless manner. For the contactless power feeding system, by fitting a power transmitting device in a road and/or an exterior wall, charging can be performed not only when the vehicle is stopped but also when driven. In addition, the contactless power feeding system may be utilized to perform transmission and reception of electric power between two vehicles. Furthermore, a solar cell may be provided in the exterior of the vehicle to charge the secondary battery when the vehicle stops and/or moves. To supply electric power in such a contactless manner, an electromagnetic induction method and/or a magnetic resonance method can be used.

Figure 15B:
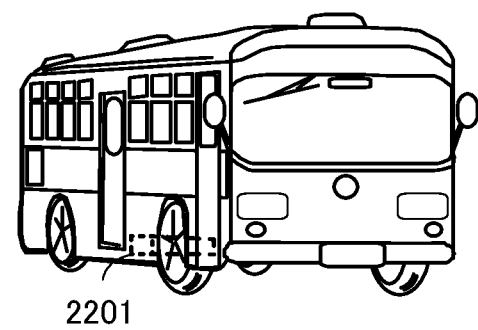

FIG. 15B shows a large transporter 2002 having a motor controlled by electric power, as an example of a transport vehicle. The secondary battery module of the transporter 2002 has a cell unit of four secondary batteries with a nominal voltage of 3.0 V or higher and 5.0 V or lower, and 48 cells are connected in series to have 170 V as the maximum voltage. A battery pack 2201 has a function similar to that in FIG. 15A except that the number of secondary batteries forming the secondary battery module of the battery pack 2201 or the like is different; thus the description is omitted.

Figure 15C:
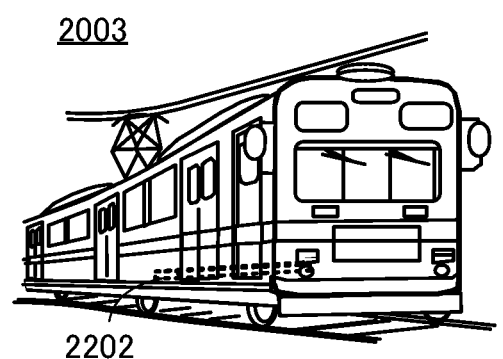

FIG. 15C shows a large transport vehicle 2003 having a motor controlled by electricity as an example. The secondary battery module of the transport vehicle 2003 has more than 100 secondary batteries with a nominal voltage of 3.0 V or higher and 5.0 V or lower connected in series, and the maximum voltage is 600 V, for example. Thus, the secondary batteries are required to have few variations in the characteristics. A secondary battery using the particle 190 described in Embodiment 1 for a positive electrode is suitable for reduction in size and reduction in weight and is suitably used in the transport vehicle. A battery pack 2202 has a function similar to that in FIG. 15A except that the number of secondary batteries forming the secondary battery module of the battery pack 2202 or the like is different; thus the detailed description is omitted.

Figure 15D:
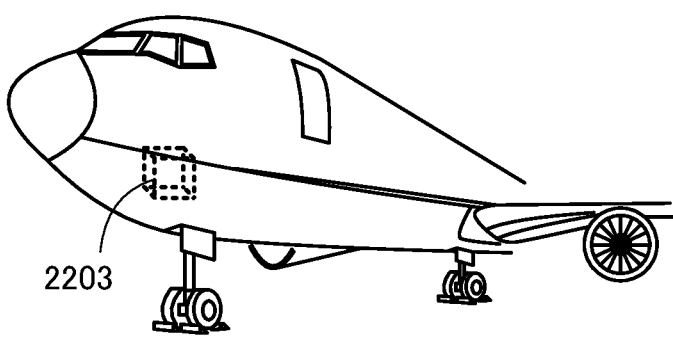

FIG. 15D shows an aircraft 2004 having a combustion engine as an example. The aircraft 2004 shown in FIG. 15D can be regarded as a portion of a transport vehicle since it is provided with wheels for takeoff and landing, and has a battery pack 2203 including a secondary battery module and a charging control device; the secondary battery module includes a plurality of connected secondary batteries.

The secondary battery module of the aircraft 2004 has eight 4 V secondary batteries connected in series, which has the maximum voltage of 32 V, for example. A battery pack 2203 has a function similar to that in FIG. 15A except, for example, the number of secondary batteries forming the secondary battery module of the battery pack 2203; thus the detailed description is omitted.

This embodiment can be implemented in appropriate combination with any of the other embodiments.

Embodiment 6

In this embodiment, examples in which the secondary battery of one embodiment of the present invention is mounted on a building will be described with reference to FIG. 16A and FIG. 16B.

Figure 16A:
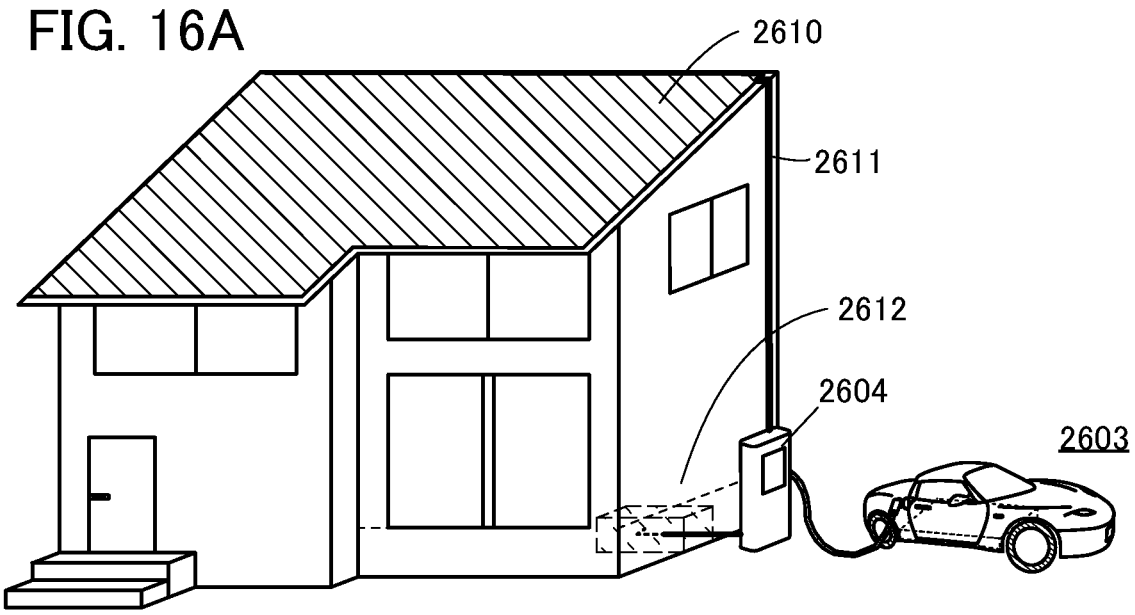
FIG. 16A and FIG. 16B are diagrams showing an example of a power storage.

A house illustrated in FIG. 16A includes a power storage device 2612 including the secondary battery which is one embodiment of the present invention and a solar panel 2610. The power storage device 2612 is electrically connected to the solar panel 2610 through a wiring 2611 or the like. The power storage device 2612 may be electrically connected to a ground-based charging equipment 2604. The power storage device 2612 can be charged with electric power generated by the solar panel 2610. The secondary battery included in the vehicle 2603 can be charged with the electric power stored in the power storage device 2612 through the charging equipment 2604. The power storage device 2612 is preferably provided in an underfloor space. The power storage device 2612 is provided in the underfloor space, in which case the space on the floor can be effectively used. Alternatively, the power storage device 2612 may be provided on the floor.

The electric power stored in the power storage device 2612 can also be supplied to other electronic devices in the house. Thus, with the use of the power storage device 2612 of one embodiment of the present invention as an uninterruptible power source, electronic devices can be used even when electric power cannot be supplied from a commercial power source due to power failure or the like.

Figure 16B:
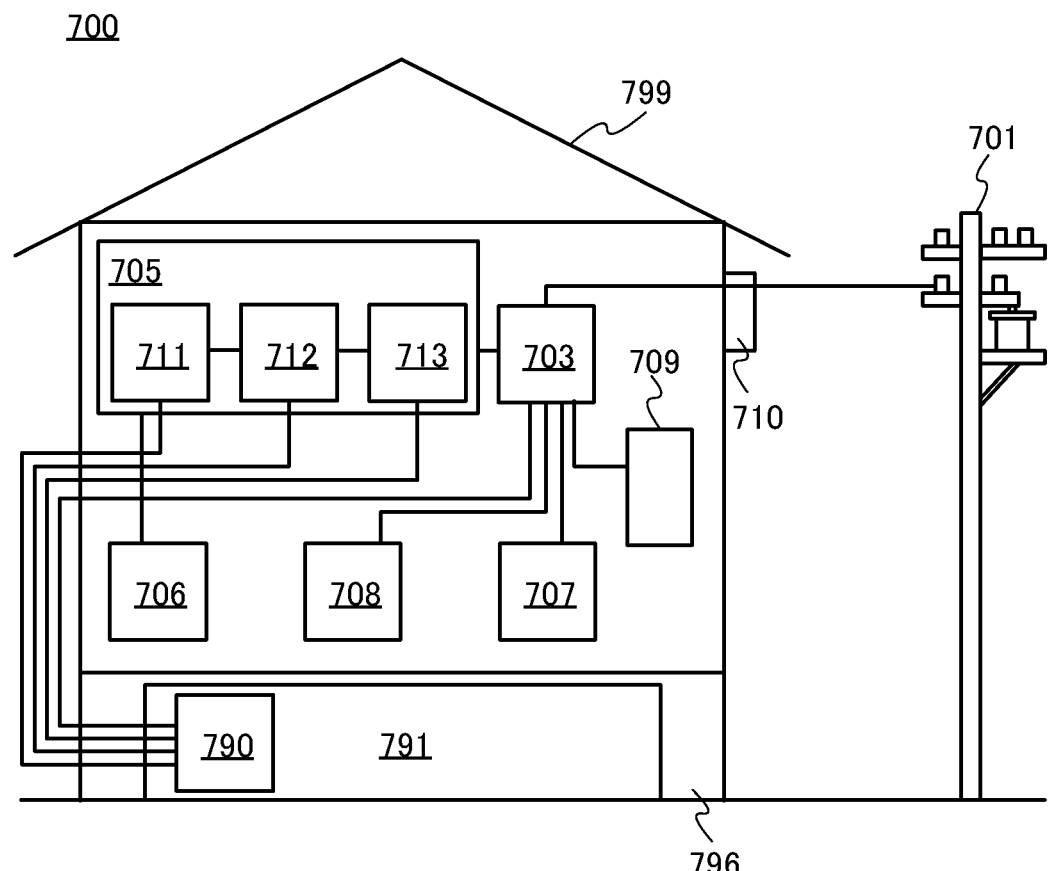

FIG. 16B shows an example of a power storage device 700 of one embodiment of the present invention. As illustrated in FIG. 16B, a power storage device 791 of one embodiment of the present invention is provided in an underfloor space 796 of a building 799. The power storage device 791 may be provided with the control circuit described in Embodiment 5, and when a secondary battery including a positive electrode using the particle 190 obtained in Embodiment 1 is used for the power storage device 791, the synergy on safety can be obtained. The secondary battery including the control circuit described in Embodiment 5 and the positive electrode using the particle 190 described in Embodiment 1 can contribute greatly to elimination of accidents due to the power storage device 791 including secondary batteries, such as fires.

The power storage device 791 is provided with a control device 790, and the control device 790 is electrically connected to a distribution board 703, a power storage controller (also referred to as control device) 705, an indicator 706, and a router 709 through wirings.

Electric power is transmitted from a commercial power source 701 to the distribution board 703 through a service wire mounting portion 710. Moreover, electric power is transmitted to the distribution board 703 from the power storage device 791 and the commercial power source 701, and the distribution board 703 supplies the transmitted electric power to a general load 707 and a power storage load 708 through outlets (not illustrated).

The general load 707 is, for example, an electronic device such as a TV or a personal computer. The power storage load 708 is, for example, an electronic device such as a microwave, a refrigerator, or an air conditioner.

The power storage controller 705 includes a measuring portion 711, a predicting portion 712, and a planning portion 713. The measuring portion 711 has a function of measuring the amount of electric power consumed by the general load 707 and the power storage load 708 during a day (e.g., from midnight to midnight). The measuring portion 711 may have a function of measuring the amount of electric power of the power storage device 791 and the amount of electric power supplied from the commercial power source 701. The predicting portion 712 has a function of predicting, on the basis of the amount of electric power consumed by the general load 707 and the power storage load 708 during a given day, the demand for electric power consumed by the general load 707 and the power storage load 708 during the next day. The planning portion 713 has a function of making a charge and discharge plan of the power storage device 791 on the basis of the demand for electric power predicted by the predicting portion 712.

The amount of electric power consumed by the general load 707 and the power storage load 708 and measured by the measuring portion 711 can be checked with the indicator 706. It can be checked with an electronic device such as a TV or a personal computer through the router 709. Furthermore, it can be checked with a portable electronic terminal such as a smartphone or a tablet through the router 709. With the indicator 706, the electronic device, or the portable electronic terminal, for example, the demand for electric power depending on a time period (or per hour) that is predicted by the predicting portion 712 can be checked.

This embodiment can be implemented in appropriate combination with any of the other embodiments.

Embodiment 7

This embodiment will describe examples in which the power storage device of one embodiment of the present invention is mounted on a motorcycle and a bicycle.

Figure 17A:
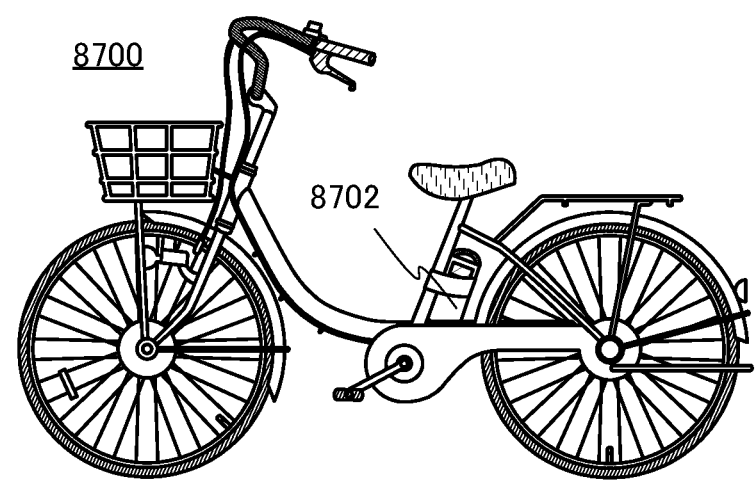
FIG. 17A shows an example of an electric bicycle.

FIG. 17A shows an example of an electric bicycle using the power storage device of one embodiment of the present invention. The power storage device of one embodiment of the present invention can be used for an electric bicycle 8700 illustrated in FIG. 17A. The power storage device of one embodiment of the present invention includes a plurality of storage batteries and a protection circuit, for example.

Figure 17B:
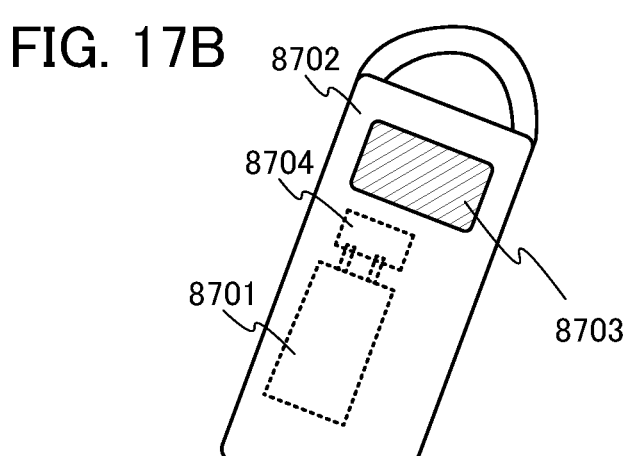
FIG. 17B shows an example of a secondary battery of the electric bicycle.

The electric bicycle 8700 includes a power storage device 8702. The power storage device 8702 can supply electricity to a motor that assists a rider. The power storage device 8702 is portable, and FIG. 17B illustrates the state where the power storage device 8702 is detached from the bicycle. A plurality of storage batteries 8701 included in the power storage device of one embodiment of the present invention are incorporated in the power storage device 8702, and the remaining battery capacity and the like can be displayed on a display portion 8703. The power storage device 8702 includes a control circuit 8704 capable of charge control or anomaly detection for the secondary battery, which is exemplified in Embodiment 5. The control circuit 8704 is electrically connected to a positive electrode and a negative electrode of the storage battery 8701. The control circuit 8704 may include the small solid-state secondary battery illustrated in FIG. 13A and FIG. 13B. When the small solid-state secondary battery illustrated in FIG. 13A and FIG. 13B is provided in the control circuit 8704, electric power can be supplied to store data in a memory circuit included in the control circuit 8704 for a long time. When the control circuit 8704 is used in combination with a secondary battery including a positive electrode using the particle 190 obtained in Embodiment 1, the synergy on safety can be obtained. The secondary battery including the positive electrode using the particle 190 obtained in Embodiment 1 and the control circuit 8704 can contribute greatly to elimination of accidents due to secondary batteries, such as fires.

Figure 17C:
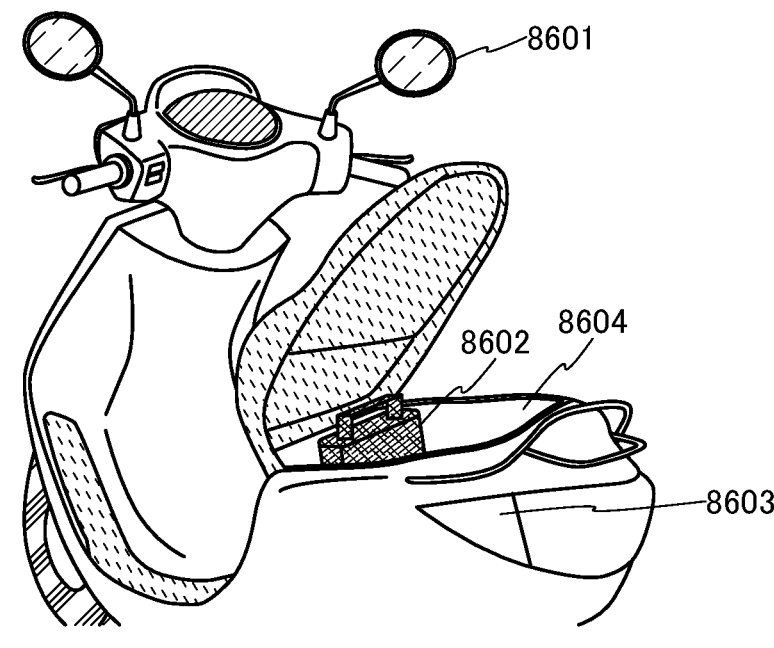
FIG. 17C shows an example of an electric motorcycle.

FIG. 17C shows an example of a motorcycle using the power storage device of one embodiment of the present invention. A motor scooter 8600 illustrated in FIG. 17C includes a power storage device 8602, side mirrors 8601, and indicator lights 8603. The power storage device 8602 can supply electricity to the indicator lights 8603. The power storage device 8602 including a plurality of secondary batteries including a positive electrode using the particle 190 obtained in Embodiment 1 can have high capacity and contribute to a reduction in size.

In the motor scooter 8600 illustrated in FIG. 17C, the power storage device 8602 can be stored in an under-seat storage unit 8604. The power storage device 8602 can be stored in the under-seat storage unit 8604 even with a small size.

Embodiment 8

In this embodiment, examples of electronic devices each including the secondary battery of one embodiment of the present invention will be described. Examples of the electronic device including the secondary battery include a television device (also referred to as a television or a television receiver), a monitor of a computer and the like, a digital camera, a digital video camera, a digital photo frame, a mobile phone (also referred to as a cellular phone or a mobile phone device), a portable game console, a portable information terminal, an audio reproducing device, and a large-sized game machine such as a pachinko machine.

Examples of the portable information terminal include a laptop personal computer, a tablet terminal, an e-book reader, and a mobile phone.

Figures 18A, 18B, 18C:
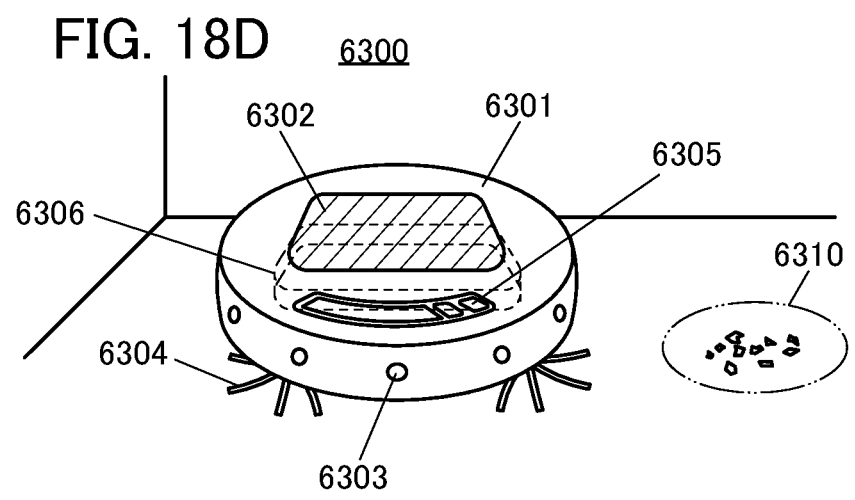

FIG. 18A shows an example of a mobile phone. A mobile phone 2100 includes a housing 2101 in which a display portion 2102 is incorporated, an operation button 2103, an external connection port 2104, a speaker 2105, a microphone 2106, and the like. The mobile phone 2100 includes a secondary battery 2107. The use of the secondary battery 2107 having a positive electrode using the particle 190 described in Embodiment 1 achieves high capacity and a structure that accommodates space saving due to a reduction in size of the housing.

The mobile phone 2100 is capable of executing a variety of applications such as mobile phone calls, e-mailing, viewing and editing texts, music reproduction, Internet communication, and a computer game.

With the operation button 2103, a variety of functions such as time setting, power on/off, on/off of wireless communication, setting and cancellation of a silent mode, and setting and cancellation of a power saving mode can be performed. For example, the functions of the operation button 2103 can be set freely by the operating system incorporated in the mobile phone 2100.

The mobile phone 2100 can employ near field communication based on an existing communication standard. For example, mutual communication between the mobile phone 2100 and a headset capable of wireless communication can be performed, and thus hands-free calling is possible.

Moreover, the mobile phone 2100 includes the external connection port 2104, and data can be directly transmitted to and received from another information terminal via a connector. In addition, charging can be performed via the external connection port 2104. Note that the charging operation may be performed by wireless power feeding without using the external connection port 2104.

The mobile phone 2100 preferably includes a sensor. As the sensor, a human body sensor such as a fingerprint sensor, a pulse sensor, or a temperature sensor, a touch sensor, a pressure sensitive sensor, or an acceleration sensor is preferably mounted, for example.

FIG. 18B illustrates an unmanned aircraft 2300 including a plurality of rotors 2302. The unmanned aircraft 2300 is also referred to as a drone. The unmanned aircraft 2300 includes a secondary battery 2301 of one embodiment of the present invention, a camera 2303, and an antenna (not illustrated). The unmanned aircraft 2300 can be remotely controlled through the antenna. A secondary battery including a positive electrode using the particle 190 obtained in Embodiment 1 has high energy density and a high degree of safety, and thus can be used safely for a long time over a long period of time and is preferable as the secondary battery included in the unmanned aircraft 2300.

FIG. 18C shows an example of a robot. A robot 6400 illustrated in FIG. 18C includes a secondary battery 6409, an illuminance sensor 6401, a microphone 6402, an upper camera 6403, a speaker 6404, a display portion 6405, a lower camera 6406, an obstacle sensor 6407, a moving mechanism 6408, an arithmetic device, and the like.

The microphone 6402 has a function of detecting a speaking voice of a user, an environmental sound, and the like. The speaker 6404 has a function of outputting sound. The robot 6400 can communicate with the user using the microphone 6402 and the speaker 6404.

The display portion 6405 has a function of displaying various kinds of information. The robot 6400 can display information desired by the user on the display portion 6405.

The display portion 6405 may be provided with a touch panel. Moreover, the display portion 6405 may be a detachable information terminal, in which case charging and data communication can be performed when the display portion 6405 is set at the home position of the robot 6400.

The upper camera 6403 and the lower camera 6406 each have a function of taking an image of the surroundings of the robot 6400. The obstacle sensor 6407 can detect an obstacle in the direction where the robot 6400 advances with the moving mechanism 6408. The robot 6400 can move safely by recognizing the surroundings with the upper camera 6403, the lower camera 6406, and the obstacle sensor 6407.

The robot 6400 further includes, in its inner region, the secondary battery 6409 of one embodiment of the present invention and a semiconductor device or an electronic component. A secondary battery including a positive electrode using the particle 190 obtained in Embodiment 1 has high energy density and a high degree of safety, and thus can be used safely for a long time over a long period of time and is preferable as the secondary battery 6409 included in the robot 6400.

FIG. 18D shows an example of a cleaning robot. A cleaning robot 6300 includes a display portion 6302 placed on the top surface of a housing 6301, a plurality of cameras 6303 placed on the side surface of the housing 6301, a brush 6304, operation buttons 6305, a secondary battery 6306, a variety of sensors, and the like. Although not illustrated, the cleaning robot 6300 is provided with a tire, an inlet, and the like. The cleaning robot 6300 is self-propelled, detects dust 6310, and sucks up the dust through the inlet provided on the bottom surface.

For example, the cleaning robot 6300 can determine whether there is an obstacle such as a wall, furniture, or a step by analyzing images taken by the cameras 6303. In the case where the cleaning robot 6300 detects an object, such as a wire, that is likely to be caught in the brush 6304 by image analysis, the rotation of the brush 6304 can be stopped. The cleaning robot 6300 includes, in its inner region, the secondary battery 6306 of one embodiment of the present invention and a semiconductor device or an electronic component. A secondary battery including a positive electrode using the particle 190 obtained in Embodiment 1 has high energy density and a high degree of safety, and thus can be used safely for a long time over a long period of time and is preferable as the secondary battery 6306 included in the cleaning robot 6300.

Figure 19A:
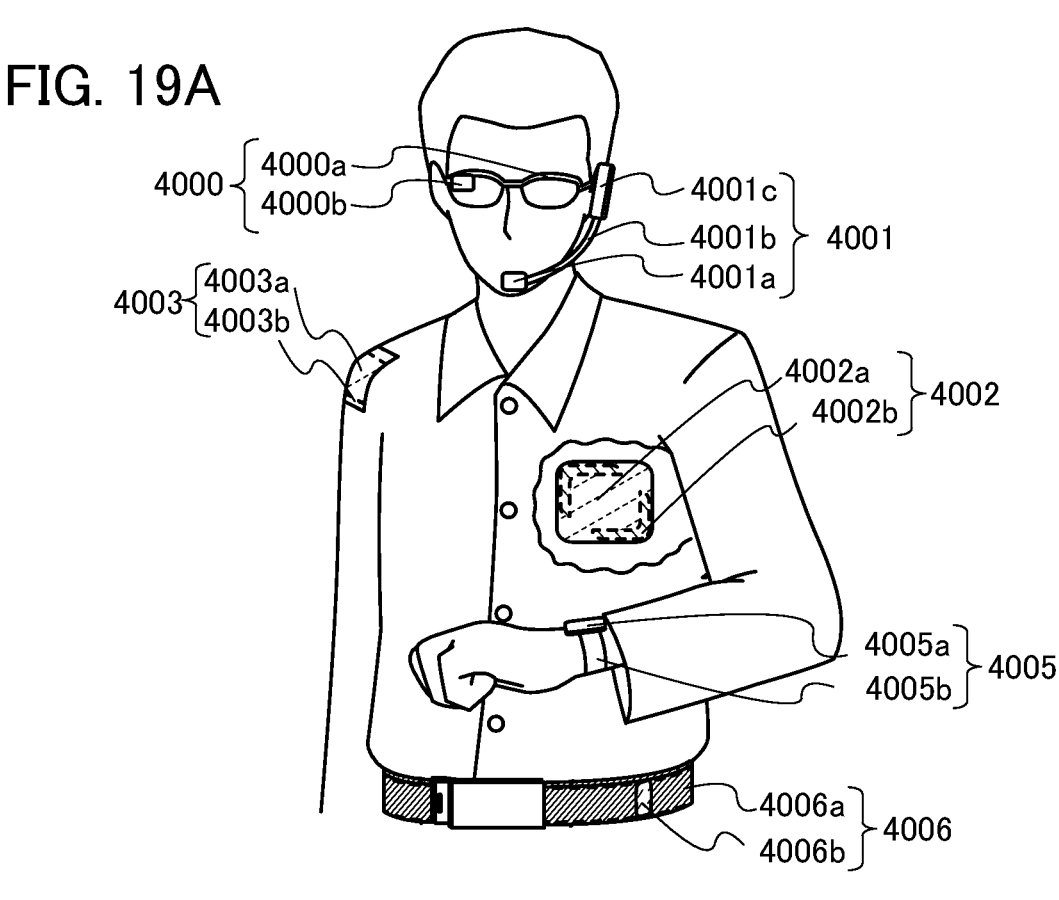
FIG. 19A shows an example of a wearable device.

FIG. 19A shows examples of wearable devices. A secondary battery is used as a power source of a wearable device. To have improved splash resistance, water resistance, or dust resistance in daily use or outdoor use by a user, a wearable device is desirably capable of being charged with and without a wire whose connector portion for connection is exposed.

For example, the secondary battery of one embodiment of the present invention can be provided in a glasses-type device 4000 illustrated in FIG. 19A. The glasses-type device 4000 includes a frame 4000a and a display portion 4000b. The secondary battery is provided in a temple of the frame 4000a having a curved shape, whereby the glasses-type device 4000 can be lightweight, can have a well-balanced weight, and can be used continuously for a long time. A secondary battery including a positive electrode using the particle 190 obtained in Embodiment 1 has high energy density and achieves a structure that accommodates space saving due to a reduction in size of the housing.

The secondary battery of one embodiment of the present invention can be provided in a headset-type device 4001.

The headset-type device 4001 includes at least a microphone part 4001a, a flexible pipe 4001b, and an earphone portion 4001c. The secondary battery can be provided in the flexible pipe 4001b and/or the earphone portion 4001c. A secondary battery including a positive electrode using the particle 190 obtained in Embodiment 1 has high energy density and achieves a structure that accommodates space saving due to a reduction in size of the housing.

The secondary battery of one embodiment of the present invention can be provided in a device 4002 that can be attached directly to a body. A secondary battery 4002b can be provided in a thin housing 4002a of the device 4002. A secondary battery including a positive electrode using the particle 190 obtained in Embodiment 1 has high energy density and achieves a structure that accommodates space saving due to a reduction in size of the housing.

The secondary battery of one embodiment of the present invention can be provided in a device 4003 that can be attached to clothes. A secondary battery 4003b can be provided in a thin housing 4003a of the device 4003. A secondary battery including a positive electrode using the particle 190 obtained in Embodiment 1 has high energy density and achieves a structure that accommodates space saving due to a reduction in size of the housing.

The secondary battery of one embodiment of the present invention can be provided in a belt-type device 4006. The belt-type device 4006 includes a belt portion 4006a and a wireless power feeding and receiving portion 4006b, and the secondary battery can be provided in the inner region of the belt portion 4006a. A secondary battery including a positive electrode using the particle 190 obtained in Embodiment 1 has high energy density and achieves a structure that accommodates space saving due to a reduction in size of the housing.

The secondary battery of one embodiment of the present invention can be provided in a watch-type device 4005. The watch-type device 4005 includes a display portion 4005a and a belt portion 4005b, and the secondary battery can be provided in the display portion 4005a or the belt portion 4005b. A secondary battery including a positive electrode using the particle 190 obtained in Embodiment 1 has high energy density and achieves a structure that accommodates space saving due to a reduction in size of the housing.

The display portion 4005a can display various kinds of information such as time and reception information of an e-mail and an incoming call.

The watch-type device 4005 is a wearable device that is wound around an arm directly; thus, a sensor that measures the pulse, the blood pressure, or the like of the user may be incorporated therein. Data on the exercise quantity and health of the user can be stored to be used for health maintenance.

Figure 19B:
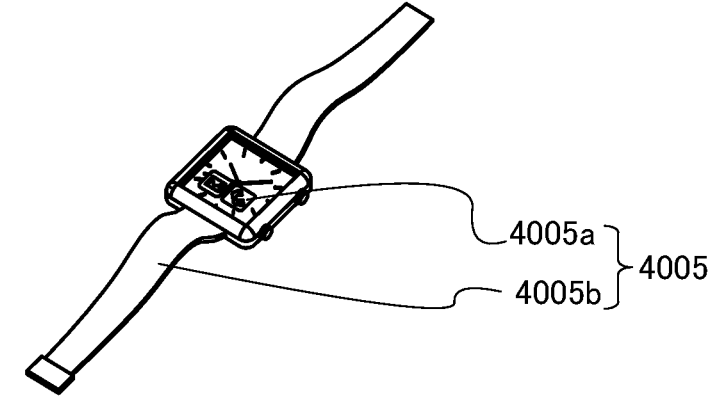
FIG. 19B is a perspective view of an example of a watch-type device.

FIG. 19B is a perspective view of the watch-type device 4005 that is detached from an arm.

Figure 19C:
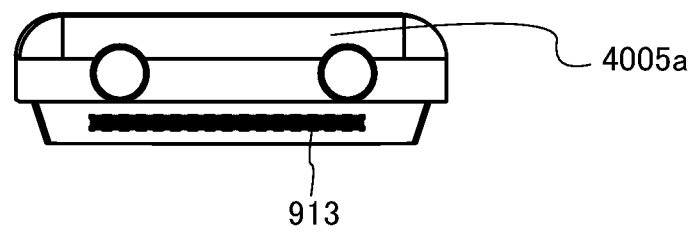
FIG. 19C is a diagram showing an example of a side surface of a watch-type device.

FIG. 19C is a side view. FIG. 19C illustrates a state where the secondary battery 913 is incorporated in the inner region. The secondary battery 913 is the secondary battery described in Embodiment 3. The secondary battery 913 is provided to overlap the display portion 4005a, can have high density and high capacity, and is small and lightweight.

Since the secondary battery in the watch-type device 4005 is required to be small and lightweight, the use of the particle 190 obtained in Embodiment 1 in the positive electrode of the secondary battery 913 enables the secondary battery 913 to have high energy density and a small size.

This embodiment can be implemented in appropriate combination with the other embodiments.

Example 1

In this example, the results of differential scanning calorimetry measurement (DSC) of melting points of composite oxides that can be used for the region 191 and the region 193 are described.

Three kinds of composite oxides were subjected to the measurement: $LiCoO_2$, $LiCo_{0.8}Ni_{0.2}O_2$, and $LiCo_{0.5}Ni_{0.5}O_2$ that have a layered rock-salt crystal structure and have different nickel and cobalt concentrations.

As a differential scanning calorimeter, Thermo plus EV02 DSC8271 manufactured by Rigaku Corporation was used. The measurement was performed at a temperature rising rate of 20° C./min in an air atmosphere.

Figure 20A:
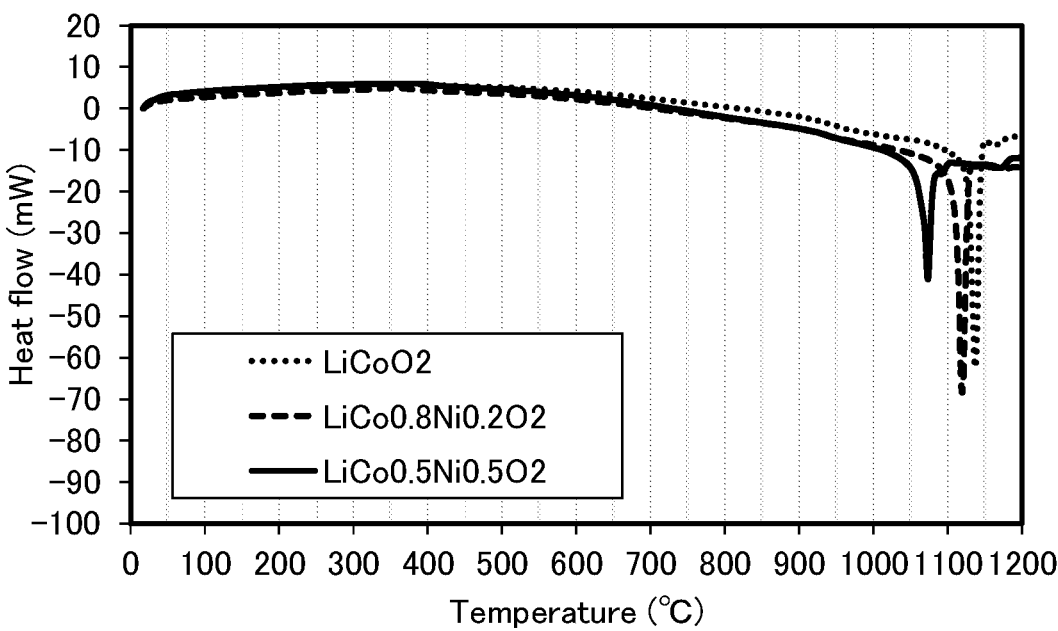
FIG. 20A and FIG. 20B are graphs showing DSC measurement results of the measurement results.
Figure 20B:
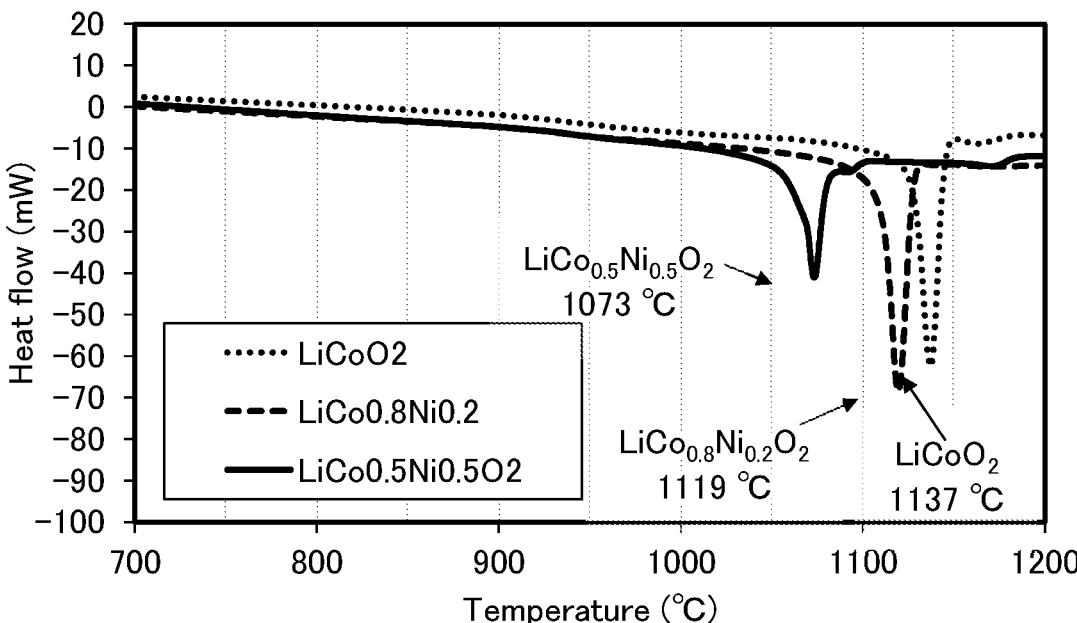

FIG. 20A shows the DSC measurement results of $LiCoO_2$, $LiCo_{0.8}Ni_{0.2}O_2$, and $LiCo_{0.5}Ni_{0.5}O_2$, and FIG. 20B is an enlarged view of part of FIG. 20A.

As shown in FIG. 20B, the endothermic peak of $LiCoO_2$ was 1137° C., the endothermic peak of $LiCo_{0.8}Ni_{0.2}O_2$ was 1119° C., and the endothermic peak of $LiCo_{0.5}Ni_{0.5}O_2$ was 1073° C. These endothermic reactions accompany melting, and these endothermic peaks correspond to melting peak temperatures. In this example and the like, a melting peak temperature is regarded as a melting point.

As described above, it was found that in the case of a composite oxide having a layered rock-salt crystal structure and having different nickel and cobalt concentrations in a transition metal, as the nickel concentration in the transition metal increases, a melting point is lowered.

REFERENCE NUMERALS

190: particle, 191: region, 192: region, 193: region, 193*a*: region, 193*b*: region, 194: region

The invention claimed is:

1. A method for manufacturing a secondary battery comprising a positive electrode active material, the method comprising steps of:

forming a first mixture by mixing a first lithium source and a first transition metal source;

heating the first mixture to form a first composite oxide, wherein the heating of the first mixture is performed at a temperature higher than or equal to 900° C. and lower than or equal to 1100° C.;

forming a second mixture by mixing the first composite oxide and a first impurity source;

heating the second mixture to form the first composite oxide in which a first impurity layer is provided, wherein the heating of the second mixture is performed at a temperature higher than or equal to 830° C. and lower than or equal to 950° C.;

forming a third mixture by mixing the first composite oxide in which the first impurity layer is provided, a second lithium source, and a second transition metal source; and heating the third mixture to form a second composite oxide over the first impurity layer, wherein the heating of the third mixture is performed at a temperature higher than or equal to 700° C. and lower than or equal to 900° C., wherein the first transition metal source and the second transition metal source are each at least one of a cobalt source, a nickel source, a manganese source, and an iron source.

2. The method of manufacturing a secondary battery according to claim 1, wherein a melting point of the first composite oxide is higher than a melting point of the second composite oxide, and wherein the temperature of the heating of the third mixture is lower than the temperature of the heating of the first mixture by 100° C. or more.

3. A method for manufacturing a secondary battery comprising a positive electrode active material, the method comprising steps of:

forming a first mixture by mixing a first lithium source and a first transition metal source;

heating the first mixture to form a first composite oxide, wherein the heating of the first mixture is performed at a temperature higher than or equal to 900° C. and lower than or equal to 1100° C.;

forming a second mixture by mixing the first composite oxide and a first impurity source;

heating the second mixture to form the first composite oxide in which a first impurity layer is provided, wherein the heating of the second mixture is performed at a temperature higher than or equal to 830° C. and lower than or equal to 950° C.;

forming a third mixture by mixing the first composite oxide in which the first impurity layer is provided, a second lithium source, and a second transition metal source;

heating the third mixture to form a second composite oxide over the first impurity layer, wherein the heating of the third mixture is performed at a temperature higher than or equal to 700° C. and lower than or equal to 900° C.;

forming a fourth mixture by mixing a second impurity source and the first composite oxide in which the first impurity layer and the second composite oxide are provided; and heating the fourth mixture to form a second impurity layer over the second composite oxide, wherein the first transition metal source and the second transition metal source are each at least one of a cobalt source, a nickel source, a manganese source, and an iron source, wherein the first impurity source and the second impurity source are each at least one of a titanium source, a magnesium source, and a fluorine source, and wherein the second impurity layer is positioned outside of the first impurity layer.

4. The method of manufacturing a secondary battery according to claim 3, wherein a melting point of the first composite oxide is higher than a melting point of the second composite oxide, and wherein the temperature of the heating of the third mixture is lower than the temperature of the heating of the first mixture by 100° C. or more.

* * * * *